DATA TRANSMISSION SYSTEM FOR OPERATION IN SIGNAL ENVIRONMENT WITH A HIGH NOISE LEVEL

Filed Sept. 25, 1961 33 Sheets-Sheet 1

INVENTORS F. S. FARKAS
C. W. FARROW
W. W. FRITSCHI
O. F. GERKENSMEIER
O. J. MURPHY
G. A. PULLIS
R. O. SOFFEL
E. G. SPACK

BY Charles Scott Phelan
ATTORNEY

April 26, 1966 F. S. FARKAS ETAL 3,248,693

DATA TRANSMISSION SYSTEM FOR OPERATION IN SIGNAL ENVIRONMENT WITH A HIGH NOISE LEVEL

Filed Sept. 25, 1961 33 Sheets-Sheet 7

April 26, 1966 F. S. FARKAS ET AL 3,248,693

DATA TRANSMISSION SYSTEM FOR OPERATION IN SIGNAL ENVIRONMENT WITH A HIGH NOISE LEVEL

Filed Sept. 25, 1961 33 Sheets-Sheet 9

TRANSMITTER TIP WORD GENERATOR

RECEIVER ERROR CONTROL LOGIC

VOTER

FREQUENCY SHIFT MODULATOR

DEMODULATOR

RECEIVER STORAGE & ERROR CONTROL

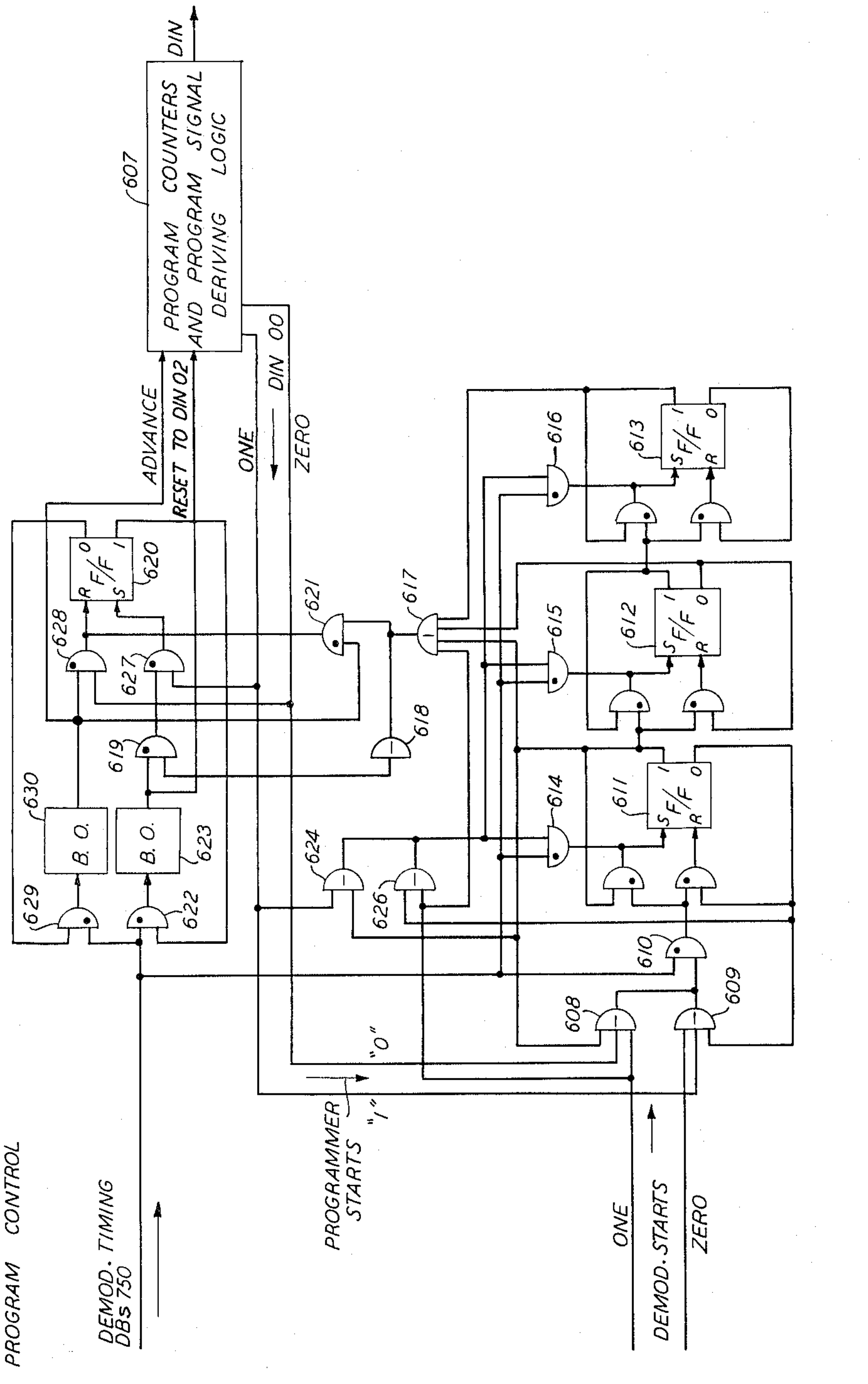
FIG. 24 RECEIVER READ-IN PROGRAM CONTROL

RECEIVER COMMUTATOR

RECEIVER INDIVIDUAL STORE STATUS

FIG. 32
SIGNAL CONVERTER
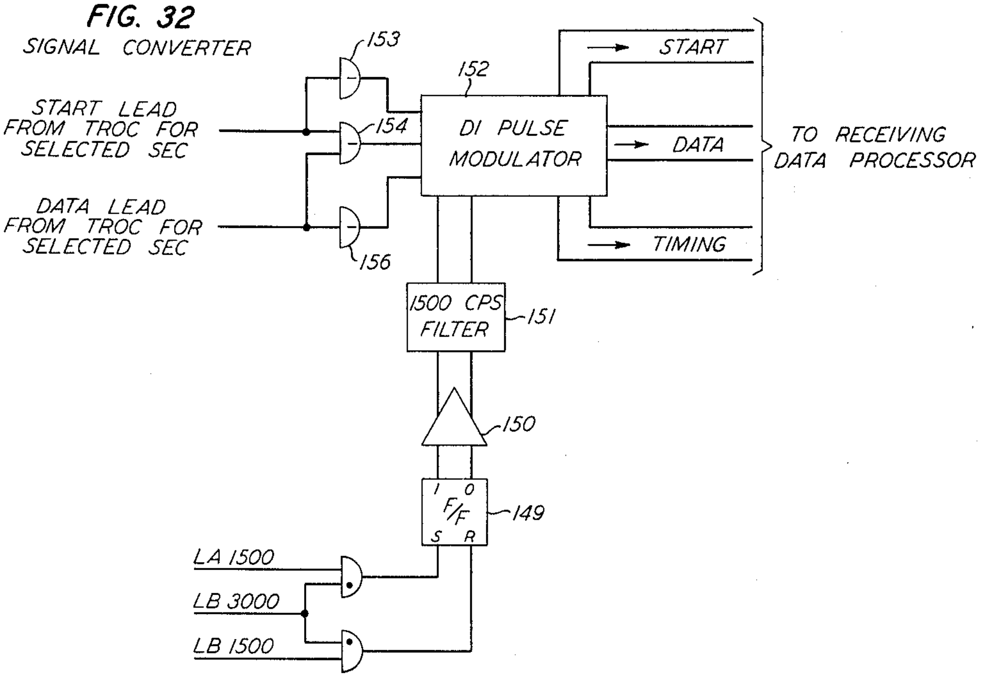
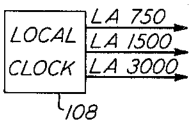
FIG. 28
READOUT PROGRAMMER AND CONTROL
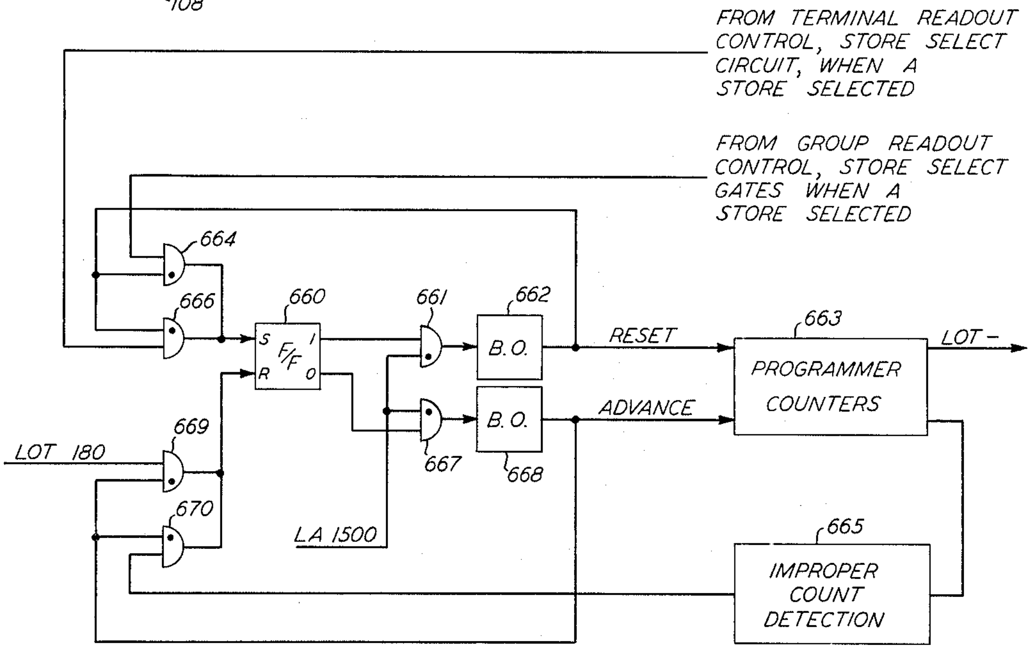

RECEIVER OUTPUT EQUIPMENT PARITY CHECK

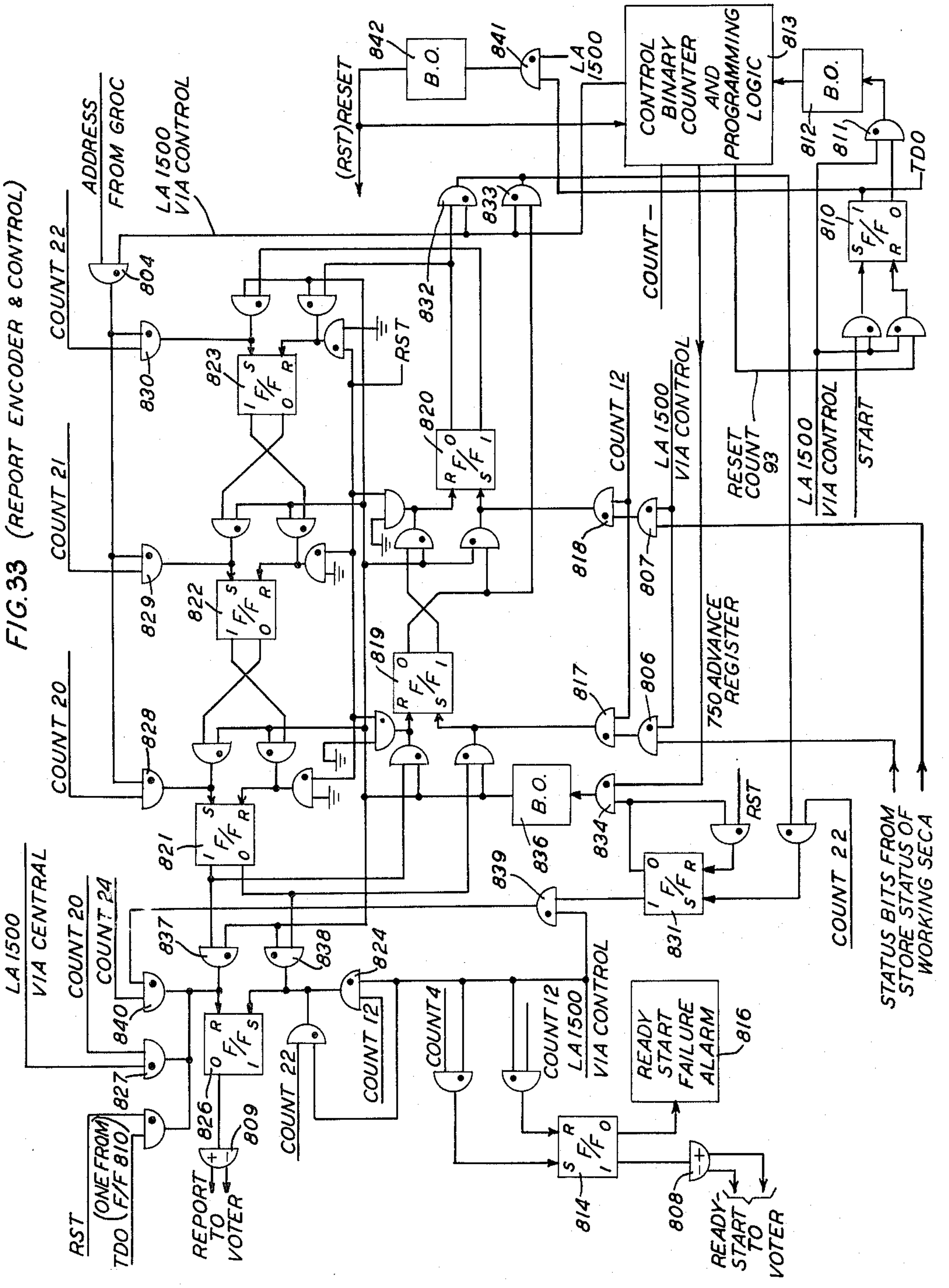
FIG. 33 (REPORT ENCODER & CONTROL)

IDLE-BUSY UNIT

United States Patent Office 3,248,693
Patented Apr. 26, 1966

3,248,693

DATA TRANSMISSION SYSTEM FOR OPERATION IN SIGNAL ENVIRONMENT WITH A HIGH NOISE LEVEL

Francis S. Farkas, Glen Head, N.Y., Cecil W. Farrow, Monmouth Hills, N.J., Walter W. Fritschi, Bayside, and Otto F. Gerkensmeier and Orlando J. Murphy, New York, N.Y., George A. Pullis, Middletown Township, Monmouth County, N.J., and Robert O. Soffel, Hastings on Hudson, and Edward G. Spack, Ardsley, N.Y., assignors to Bell Telephone Laboratories, Incorporated, New York, N.Y., a corporation of New York Filed Sept. 25, 1961, Ser. No. 141,246
51 Claims. (Cl. 340—146.1)

This invention relates to a data transmission system and it involves, in particular, such systems which must operate in connection with transmisison circuits that are subject to a high level of noise.

Certain systems for processing data, and for communicating the processed data to different geographical locations, require extreme accuracy and a high degree of reliability of operation. This type of requirement falls heavily upon transmission equipment since common carriers usually do not attempt to guarantee message accuracy for customers. Such carriers normally concern themselves with message accuracy only to the extent necessary to maintain transmission facilities in topnotch operating condition. Any errors that may appear in a message during transmission are normally detected by equipment at the customer location, and the customer then decides whether he should tolerate the error or request retransmission from the sending party. Thus, data transmission systems which require the high degree of accuracy and reliability mentioned tend to inject a new element of responsibility for the common carrier and thus demand a new type of equipment to fulfill this responsibility. It is, therefore, one object of the present invention to transmit data information in such a manner that data transmission accuracy and transmission system reliability may be assured to the customer insofar as transmission facilities are concerned.

Another characteristic of present-day data communication equipment is that if, for some reason, retransmission of a portion of a message is required the transmitting party must be so advised and he must then retrace his transmission to the last portion which was correctly received. This retracing operation, sometimes called channel reversing, requires a certain amount of time and ties up the transmission facilities for a time interval which is not profitably utilized. It is, therefore, another object of the invention to facilitate the retransmission of erroneously received message portions without the necessity for interrupting useful transmission to reverse the channel.

Data processing equipment has developed rapidly and in many different directions in recent years. This development, which has been carried out independently by many different individuals and organizations, has resulted in the production of many types of data processing equipment which have no common data bit rate. For this reason it has become an accepted practice to transmit a timing signal in one form or another along with data information. This timing signal enables sending and receiving processors to operate in synchronism with one another.

In order to meet the previously mentioned new responsibility for data transmission system operators, it is necessary that the transmission system utilize some form of timing in order to make appropriate checks on the data being transmitted. However, if the system is designed to accommodate the bit rate of one pair of data processors it may then be restricted in its operations to use with systems which are utilizing the same data bit rate. It is, of course, undesirable for such a restriction to be imposed upon expensive transmission equipment in any communication system. Accordingly, a further object of the present invention is to transmit data with virtually guaranteed message accuracy by means which are essentially independent of the instantaneous, or short-time average, bit rate employed by customer data processors. The long-time average bit rate will be the same in systems operating between only two customers.

Still another object of the invention is to utilize diversity transmission techniques in such a way that a new high in transmission circuit reliability may be realized. An additional object is to reduce to a minimum the need for retransmitting data in order to correct errors that may occur during transmission.

The above mentioned objects as well as others are realized in a data transmission system which employs plural data-block stores in transmitting and receiving stations of the system for communicating between data processing terminals. Timing signals which are received from a sending data processor control a programmer for routing successive blocks of incoming data to different stores in the transmitting station. These data blocks are held in their respective stores, together with a store address code, until readout is required.

Readout from the store is accomplished under the control of a second programmer which is driven by locally generated timing signals having no required frequency or phase dependence on the transmitting processor timing. During each readout operation the data block is also simultaneously restored in the same store with the store address to await a report from the receiving station as to whether or not the data block was satisfactorily received.

In the transmitting station each data block which is about to be transmitted is examined by parity checking equipment that generates a first error-detecting code word which is transmitted along with the data block to the receiving station. A second error-detecting code word of the same type is generated by similar equipment in the receiving station and compared with the first word to detect errors that may have been injected in the intervening transmission circuit. Decision logic in the receiving station considers the results of the code word comparison along with the results of other data block checks which are made at the receiver to decide whether or not the block contains enough correct information to warrant transmission to a receiving data processing terminal. If the data is not forwarded to the receiving processor it is automatically discarded. In either event a report is sent back to the transmitter directing an appropriate disposition of the recycled version of the data which is still held in the same transmitting station store.

The illustrative embodiment of the transmission system in accordance with the invention is further characterized by unique structure for providing diversity transmission to yield a high degree of reliability when two different transmission routes are utilized for sending the same data. The receiving station operates two sets of receiving equipment for performing all storing, demodulation, and checking functions for the two routes. Each set of receiving equipment includes plural stores for holding data blocks for whatever time interval is necessary to equalize differential route delay and to permit the aforementioned decision logic to determine the quality status indications of the data received in the various equipments, and to compare status indications with one another. After such comparison, the best version of the data may be selected for use by the receiving data processor.

It is one feature of the invention that data may be accurately transmitted on ordinary telephone circuits which may, when in trouble, be subject to noise in excess of that which would be permissible for intelligible voice communication.

It is another feature of the invention that the transmission circuits are continuously utilized for the transmission of data in some form so that fault detecting equipment can initiate correction procedures with a minimum loss of time and data.

Another feature is that data blocks are stored separately in the transmitting station and each block is reentered in its store at the same time that it is read out so that no time delay is required for channel reversal if subsequent retransmission should be required.

Another related feature is that each store in the transmitting station may be caused to read in during part of the readout interval of the store containing the previous incoming data block.

A further feature of the invention is that the aforementioned data storage facilities in the transmitting station are provided without using buffer storage involving moving parts or analog control means.

Another charactristic feature of the invention is that readin to a data transmission system station is controlled generally by timing signals derived from the source of data, but readout is controlled by timing signals independently generated in the data transmission system station with frequency and phase that may be unrelated to the data source timing signals.

Still another feature of the invention is that spare equipment is provided for each data transmission system station, but such spare equipment is arranged so that it operates in parallel with at least one set of working equipment, and its operation is compared with the operation of the working equipment to provide constant surveillance of equipment operation.

A supplemental feature of the invention is that when at least two diverse transmission routes are used for conveying the same information between transmitting and receiving stations, receiver station logic examines data received on each route and selects the better version for utilization by the receiving data processing terminal.

A complete understanding of the present invention and its various objects, features, and advantages may be obtained from a consideration of the following detailed description, including the appended claims, taken together with the accompanying drawing in which:

FIGS. 1 and 2 comprise a simplified block and line diagram of transmitting and receiving stations of a transmission system in accordance with the invention;

FIG. 3 is a simplified block and line diagram of a transmitter station storage and error control cabinet;

FIGS. 4A through E are schematic diagrams of well known basic circuit blocks used throughout the transmission system described;

FIGS. 5A through E are simplified schematic representations used in the following figures of the drawing for the circuits of FIGS. 4A through E, respectively;

Figure 1:
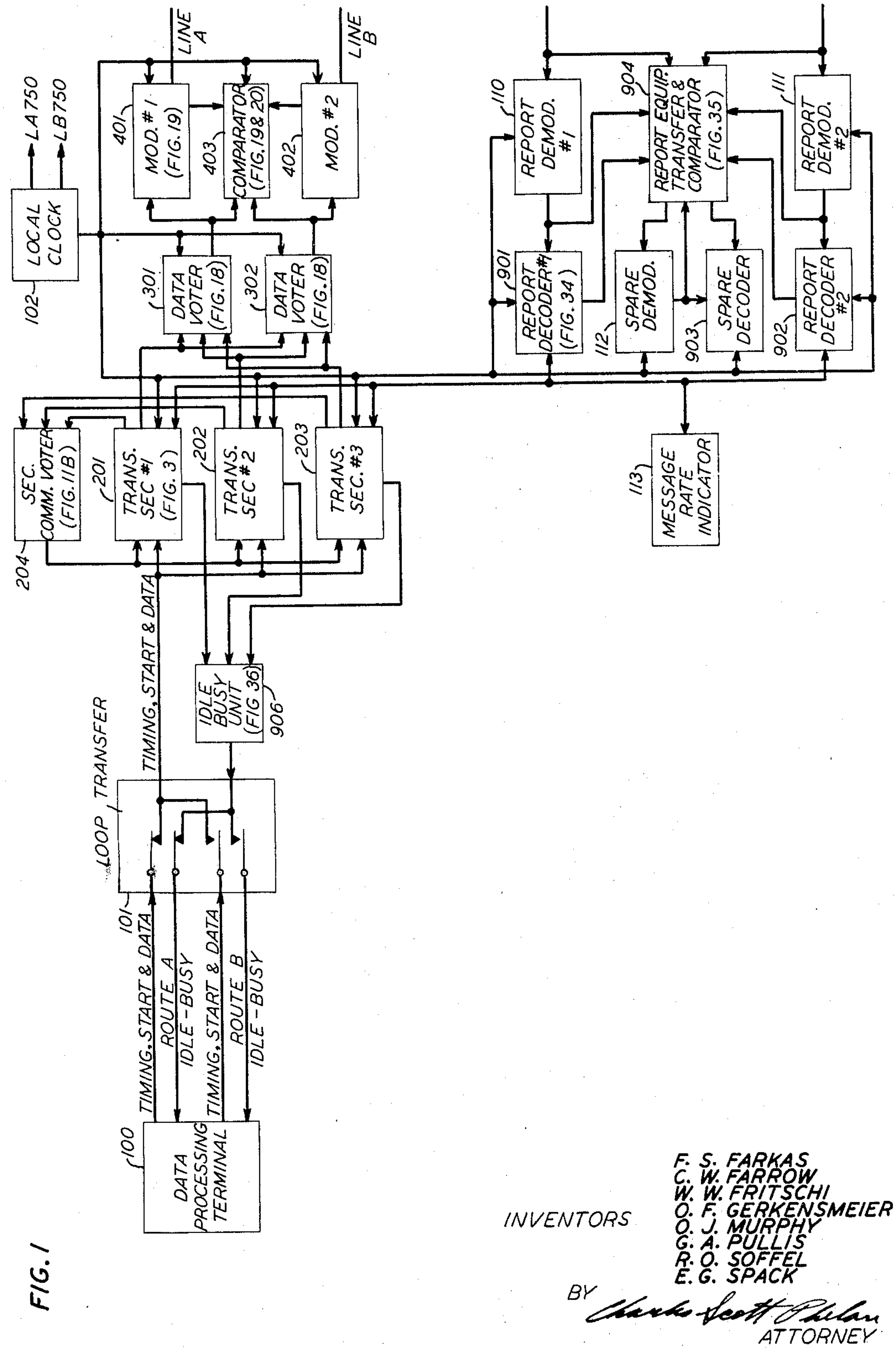
Figure 2:
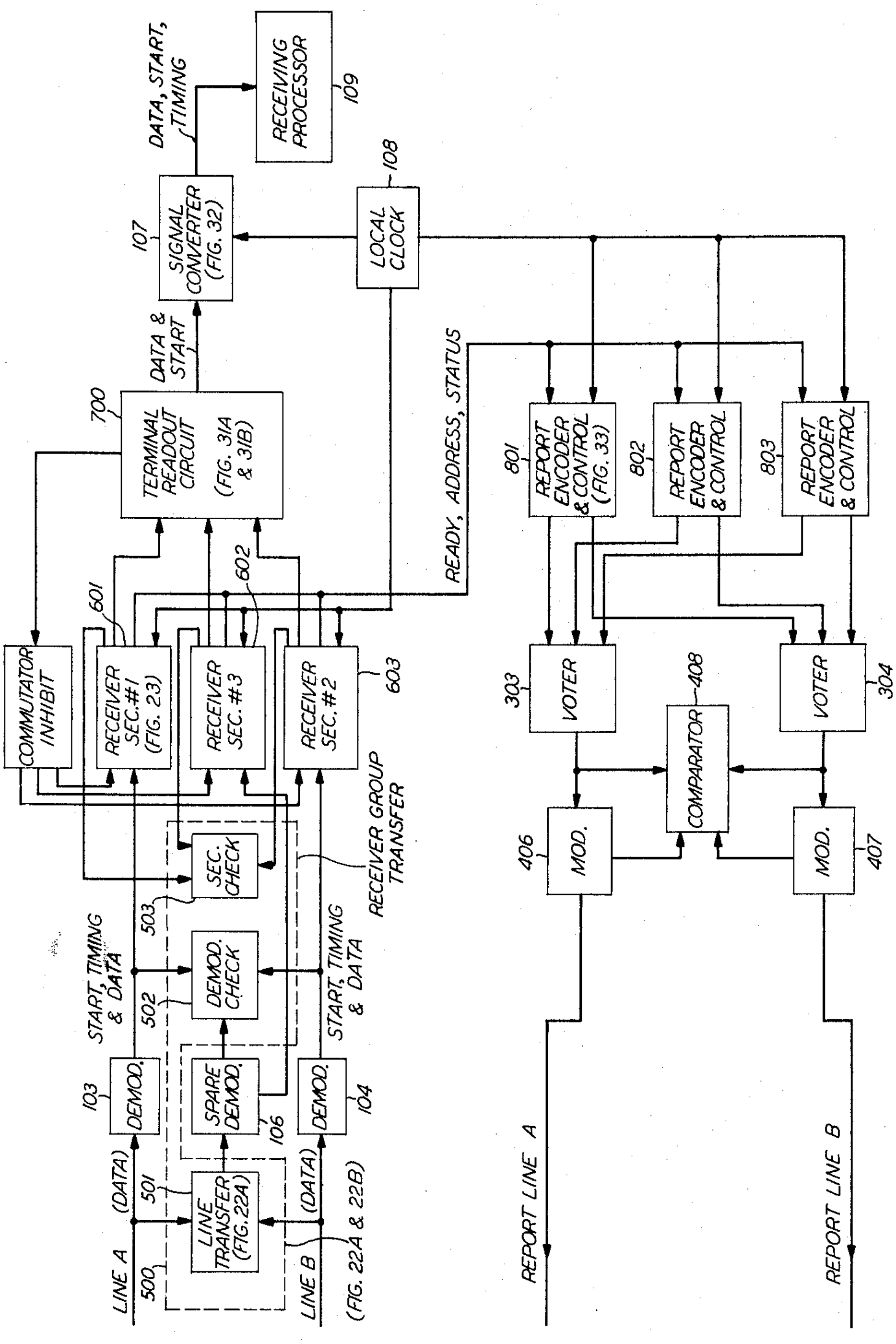
Figure 3:
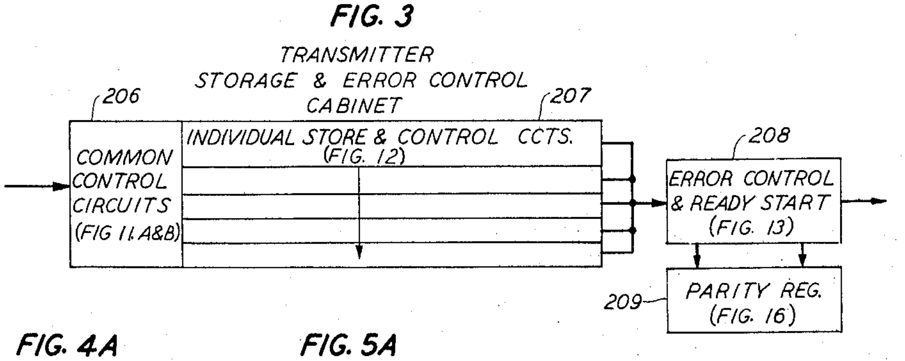
Figures 11A, 11C:
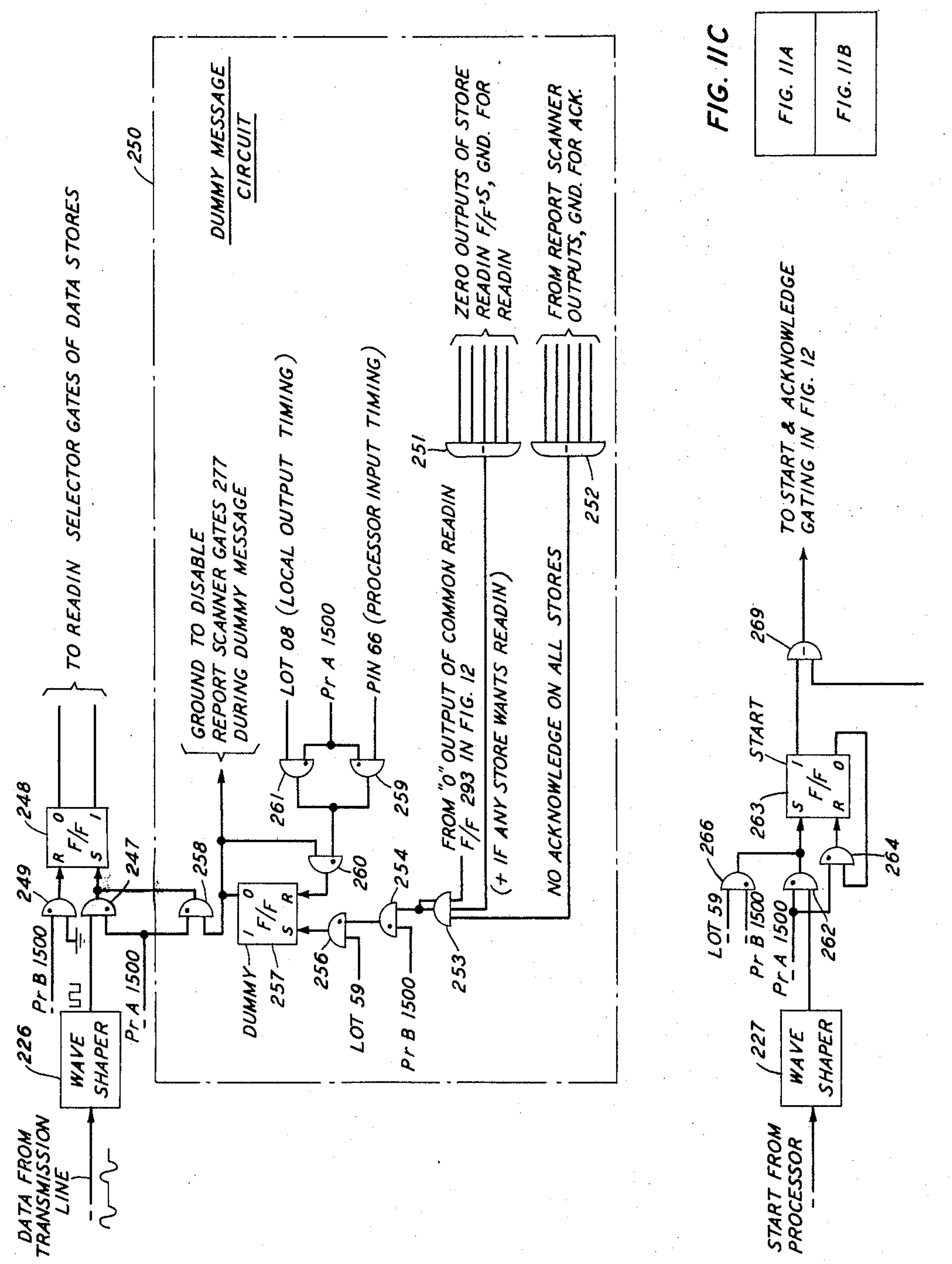
Figure 11B:
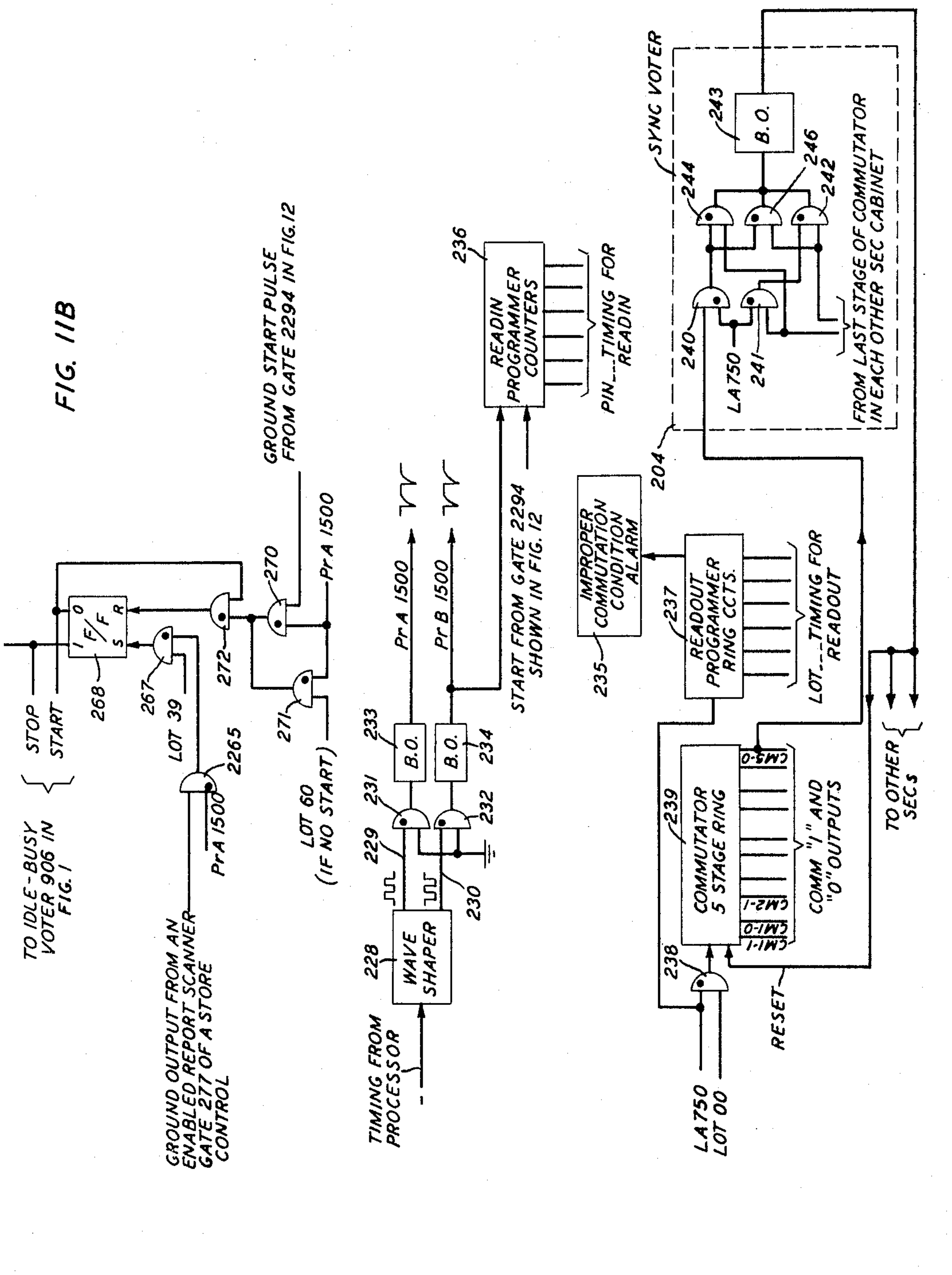
Figure 12:
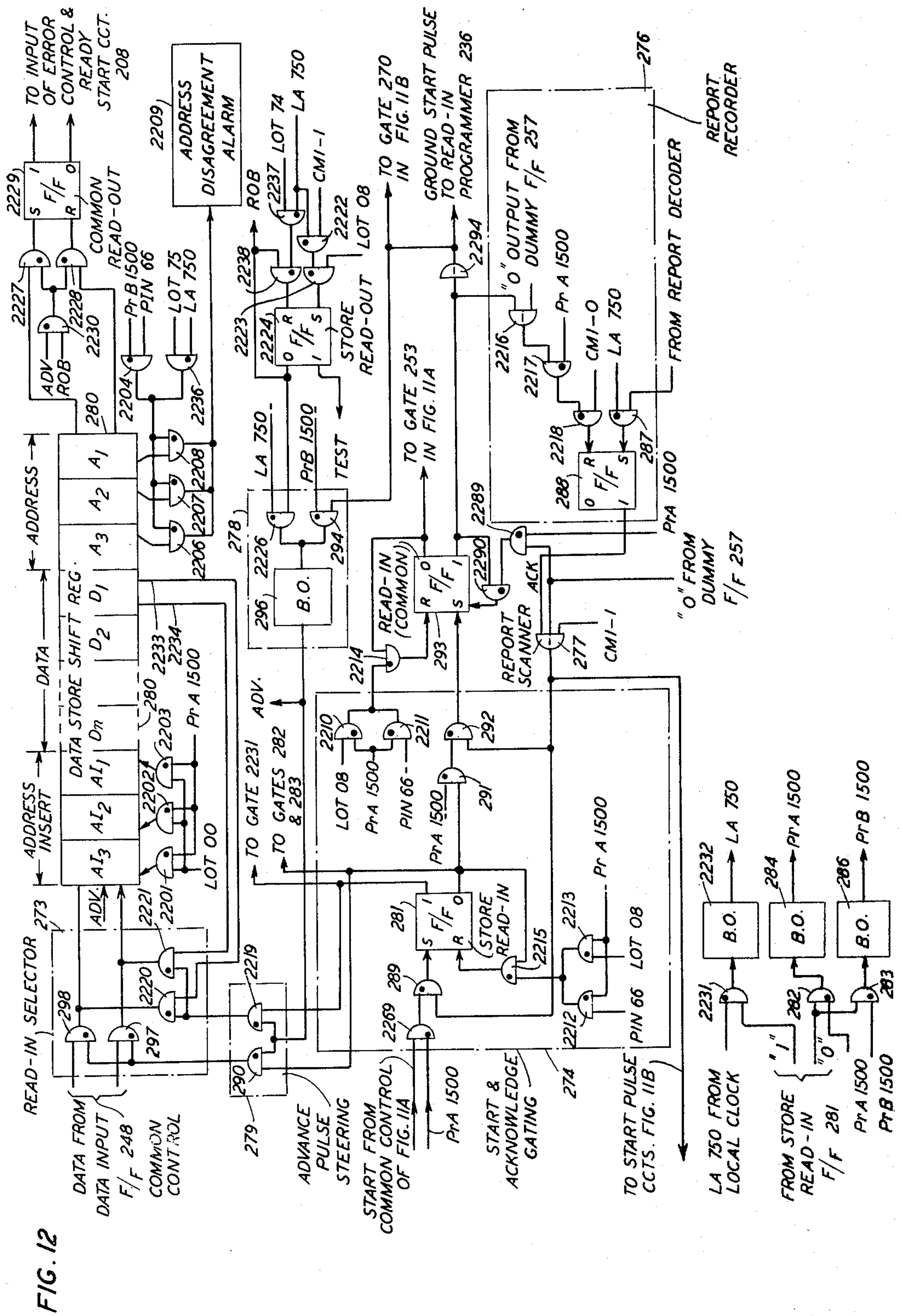
Figure 13:
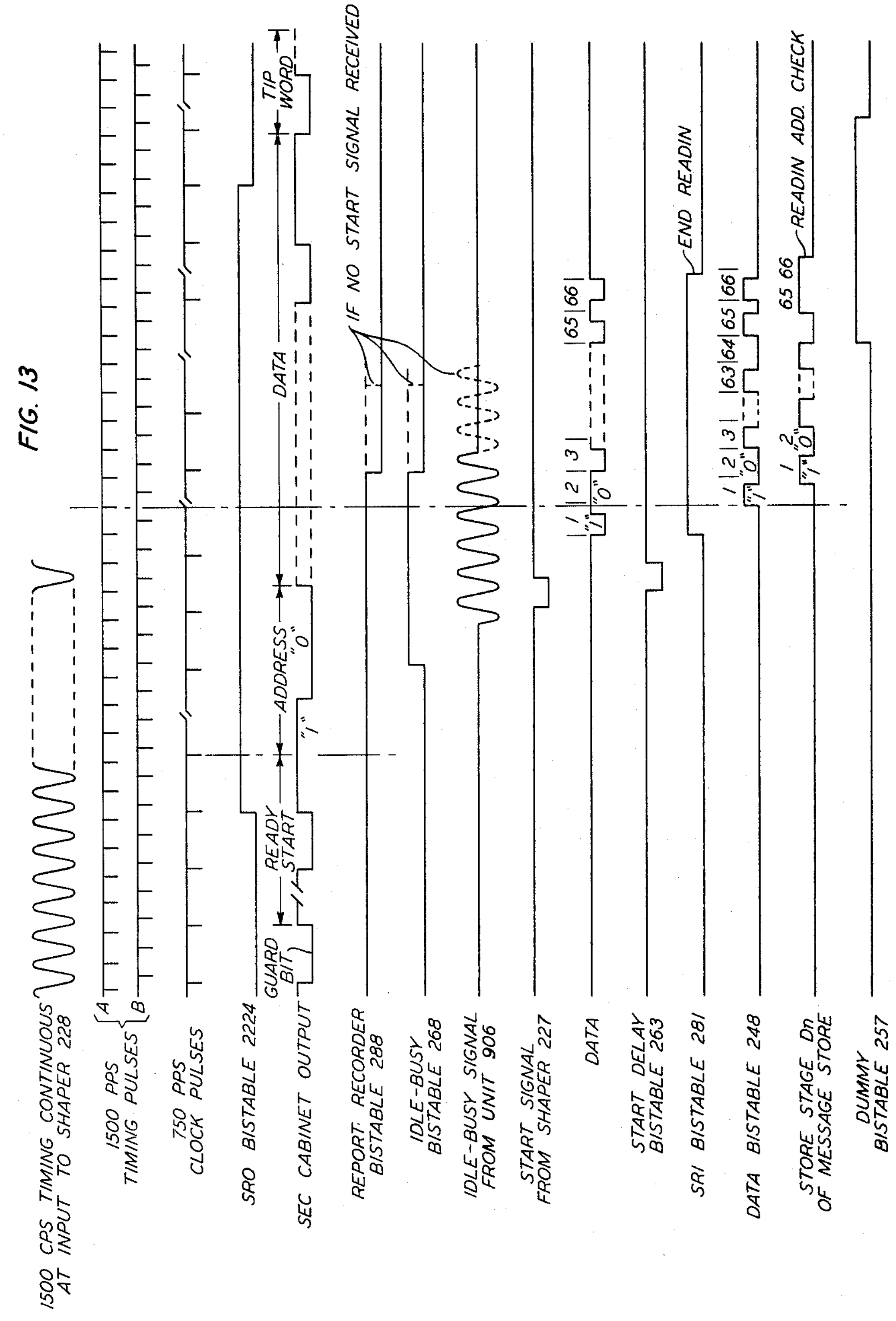
Figure 14:
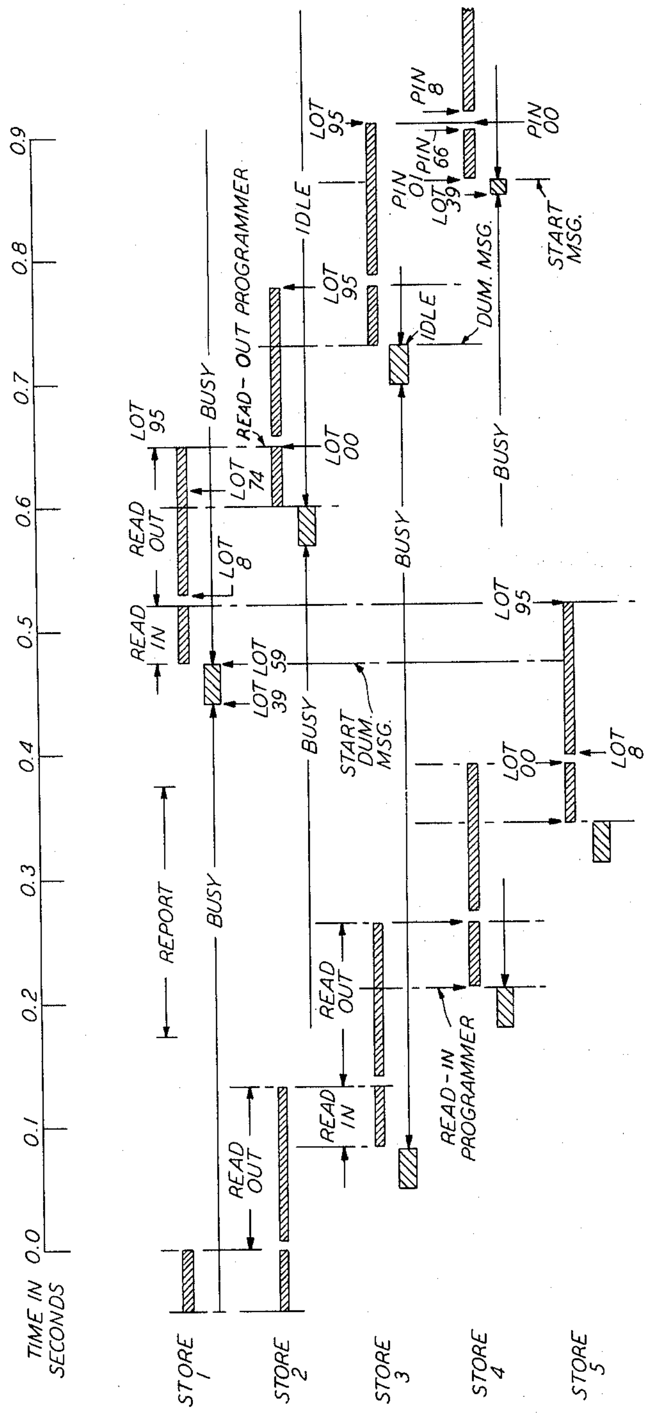
Figure 15:
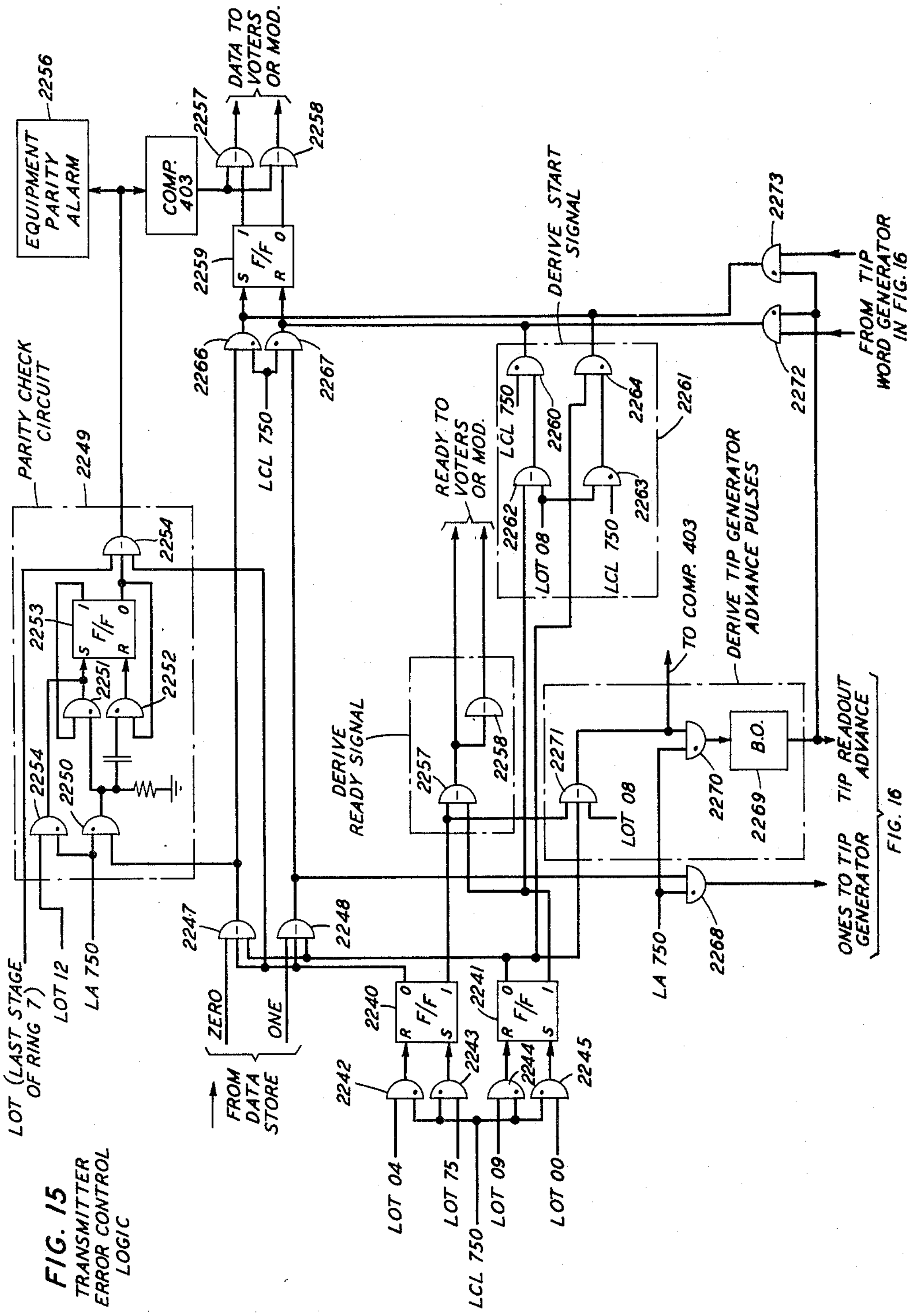
Figure 16:
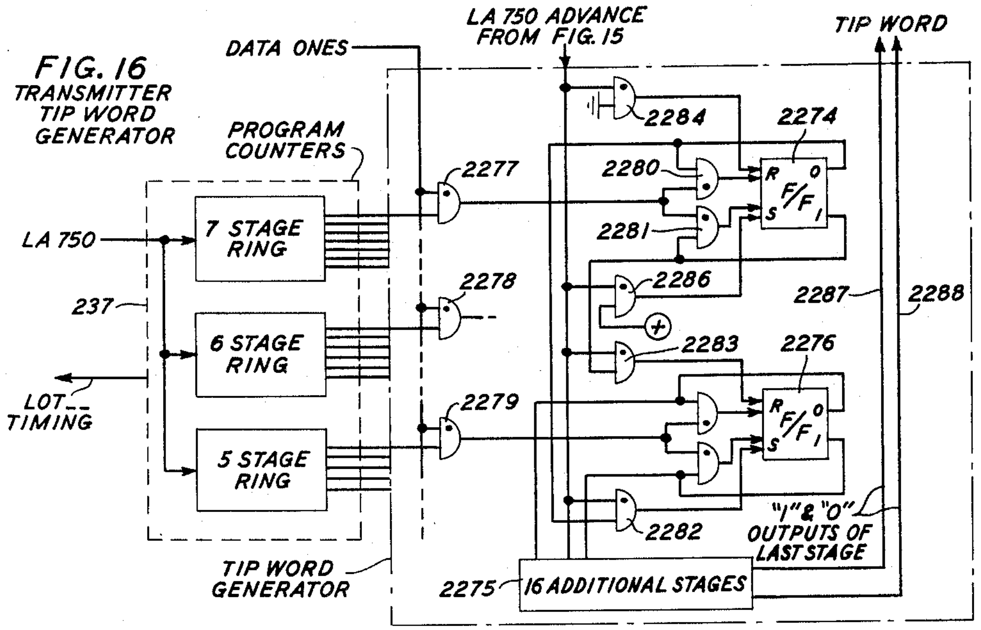
Figure 25:
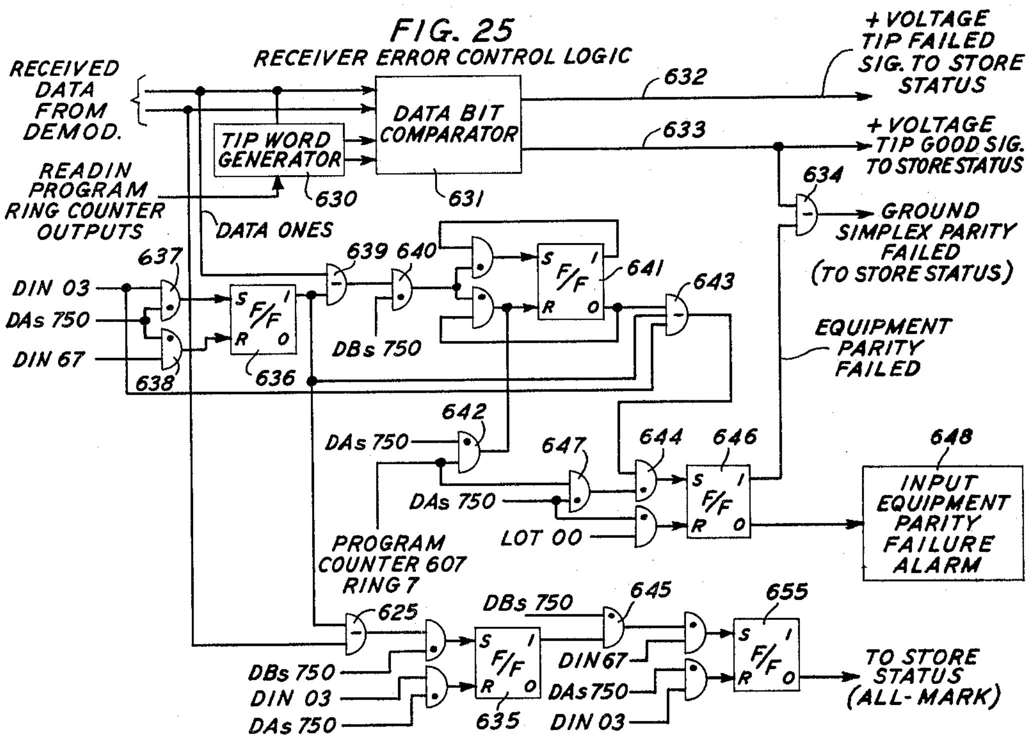
Figure 17:
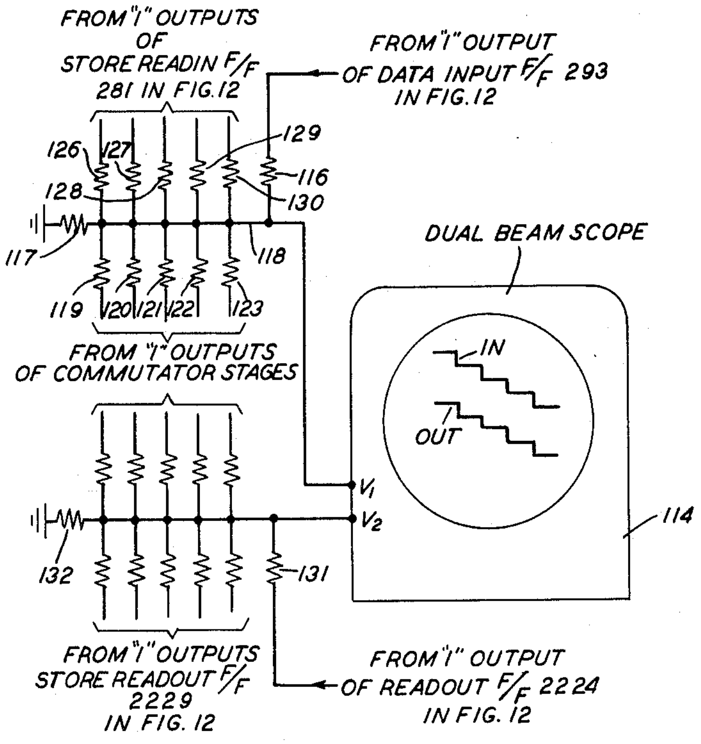
Figure 18:
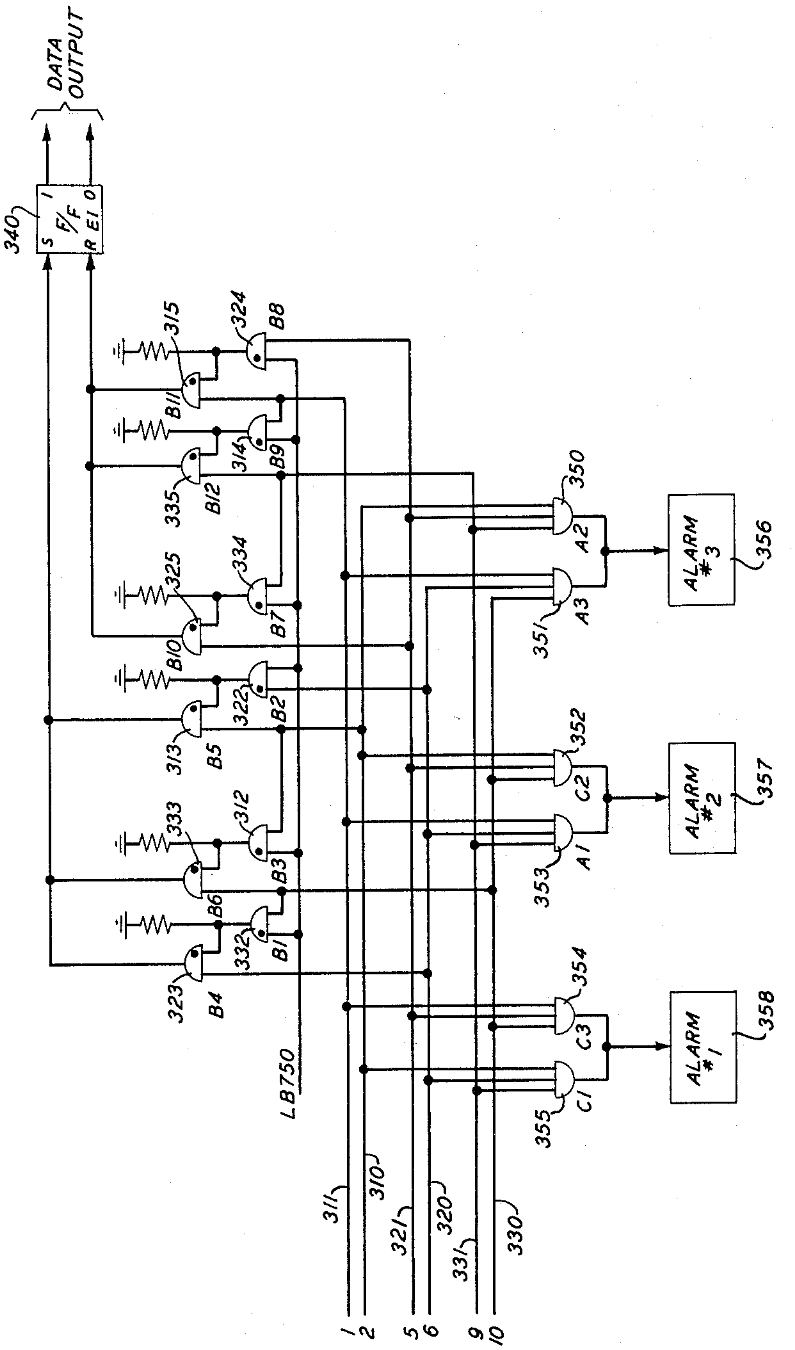
Figure 19:
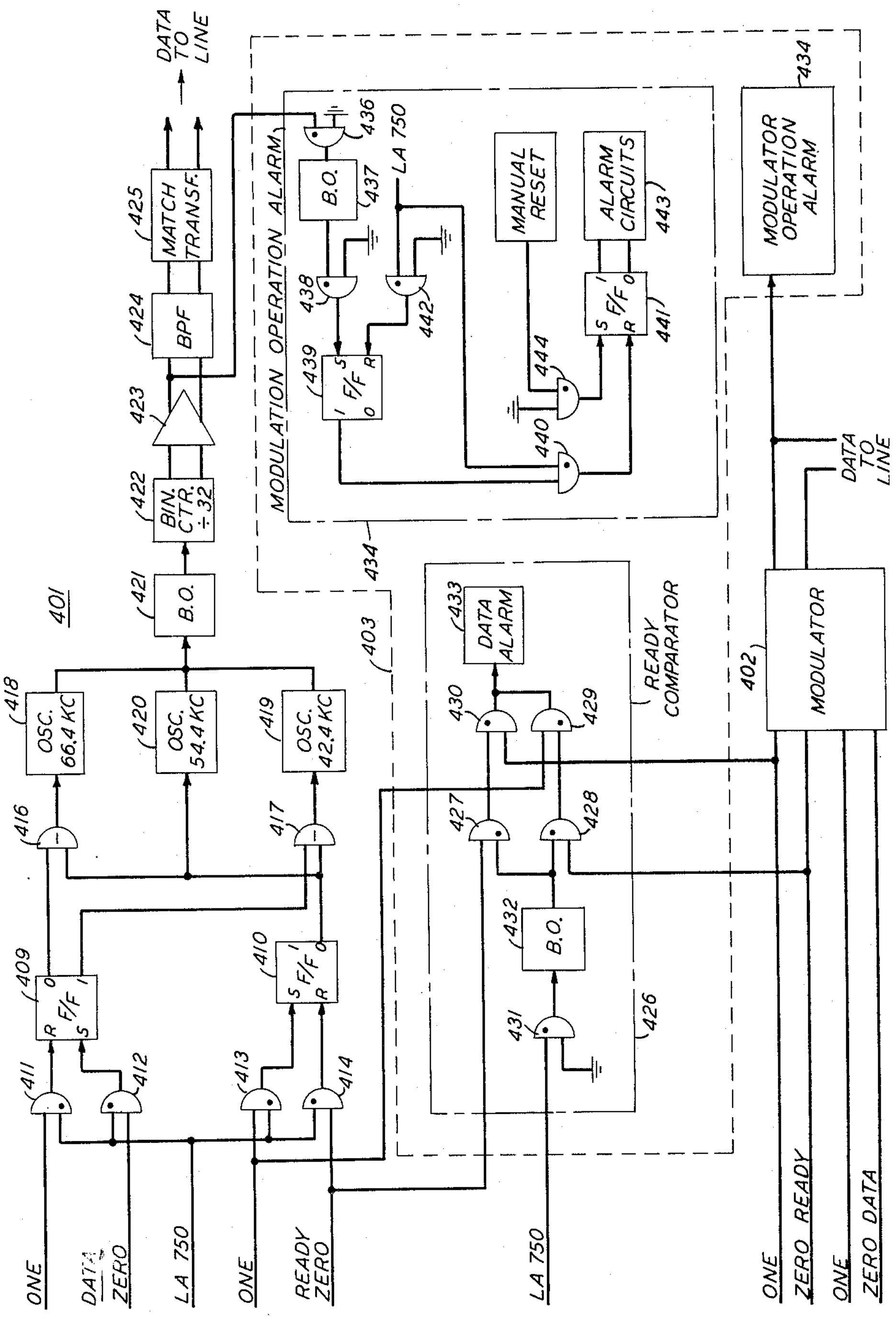
Figure 20:
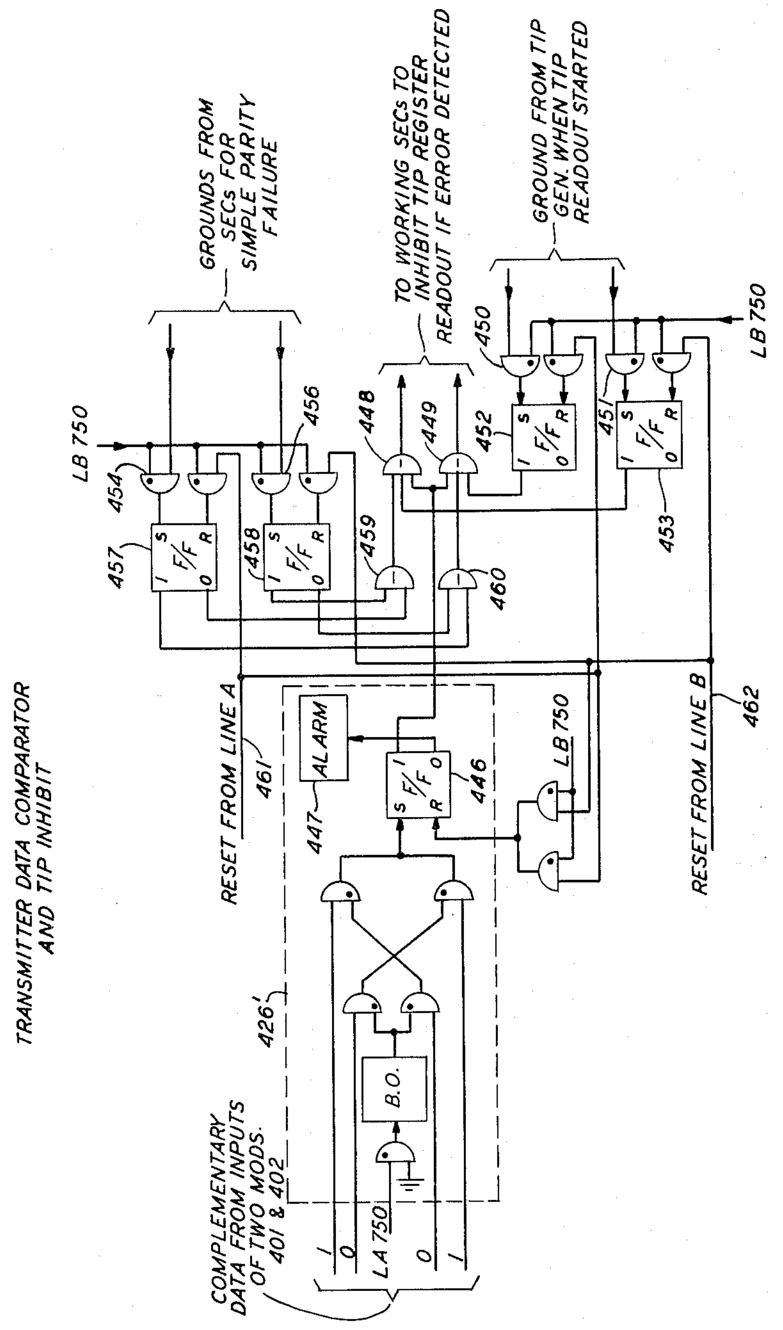
Figure 21:
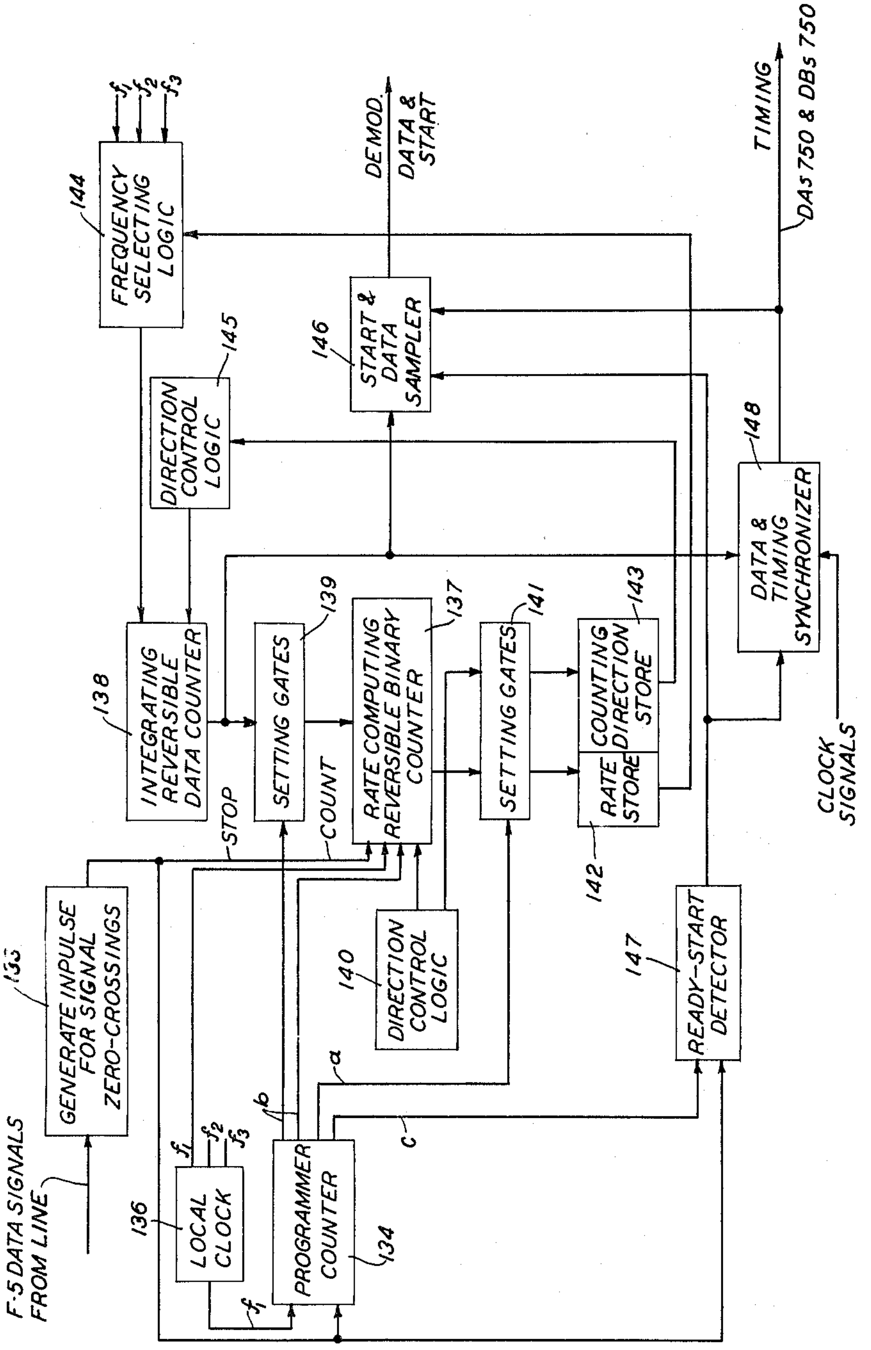
Figure 22A:
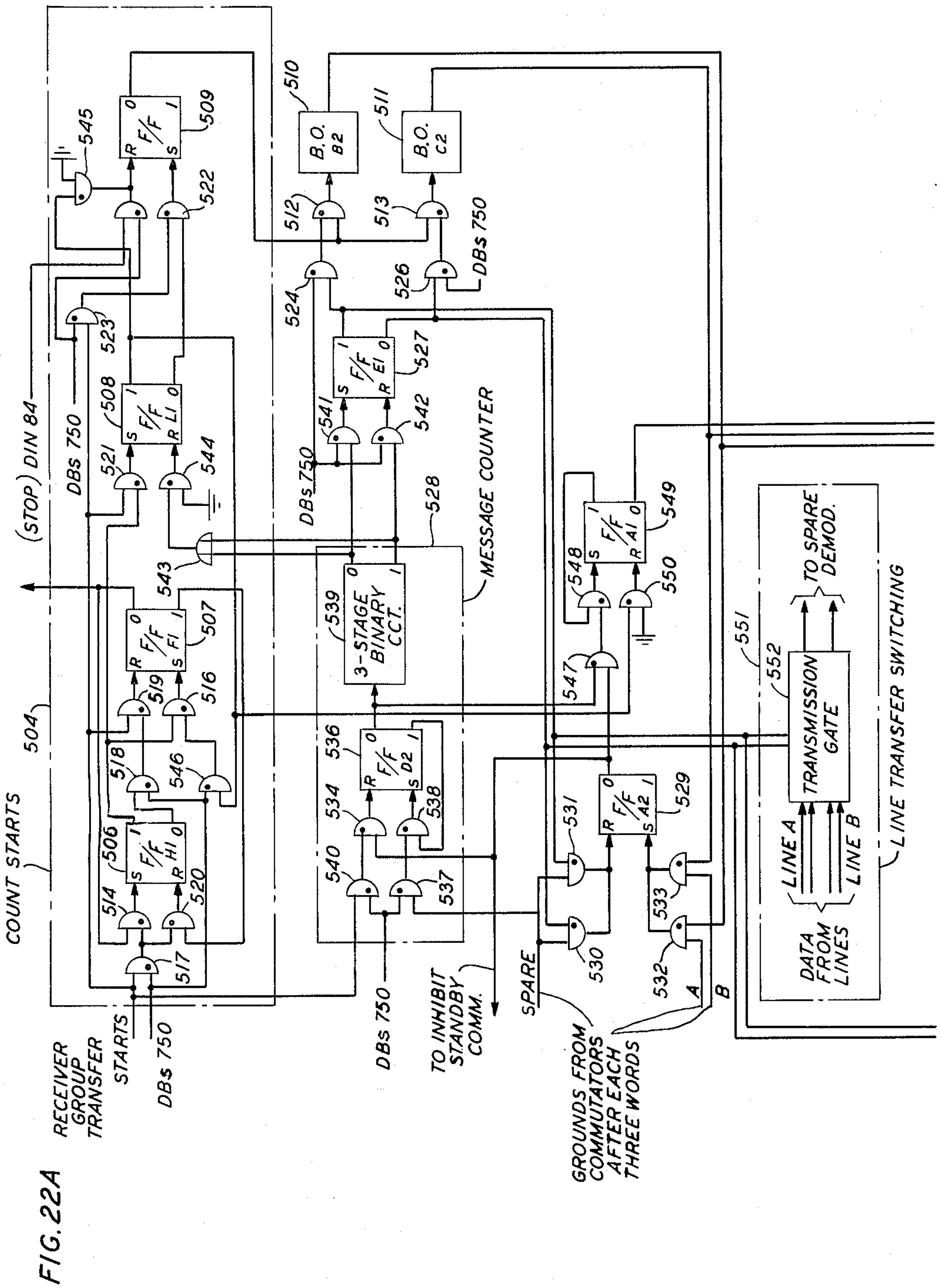
Figure 23:
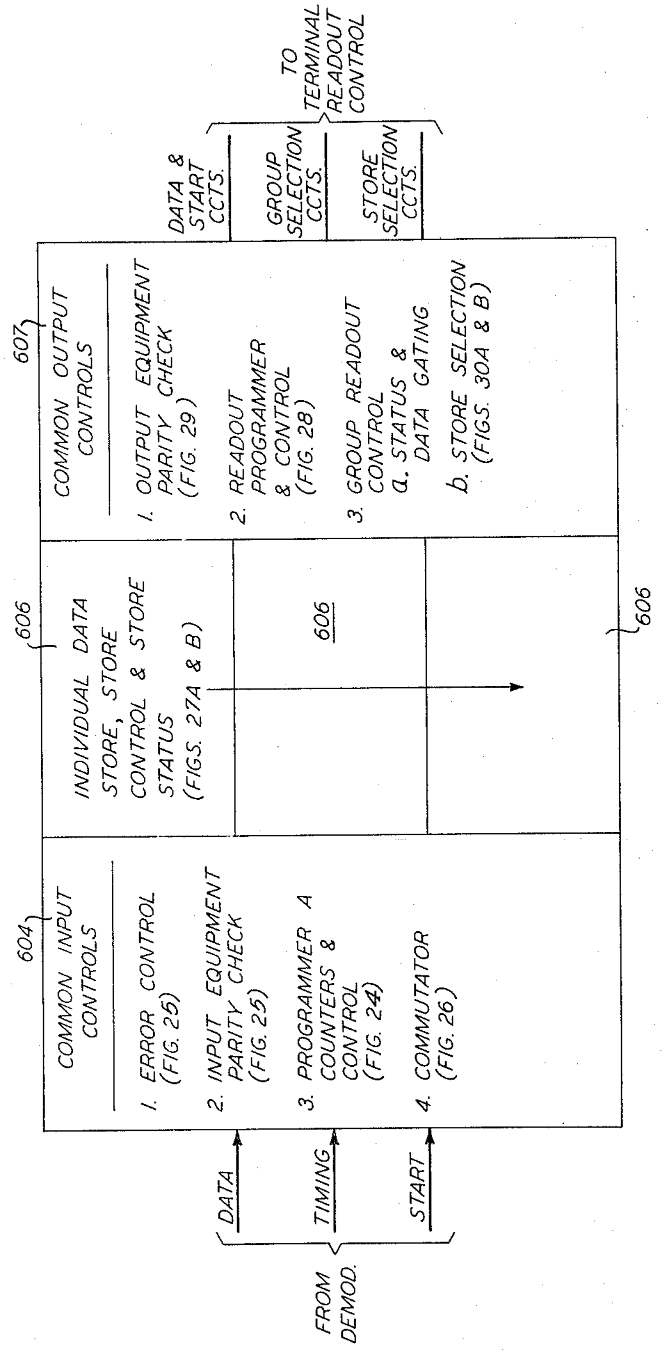
Figure 26:
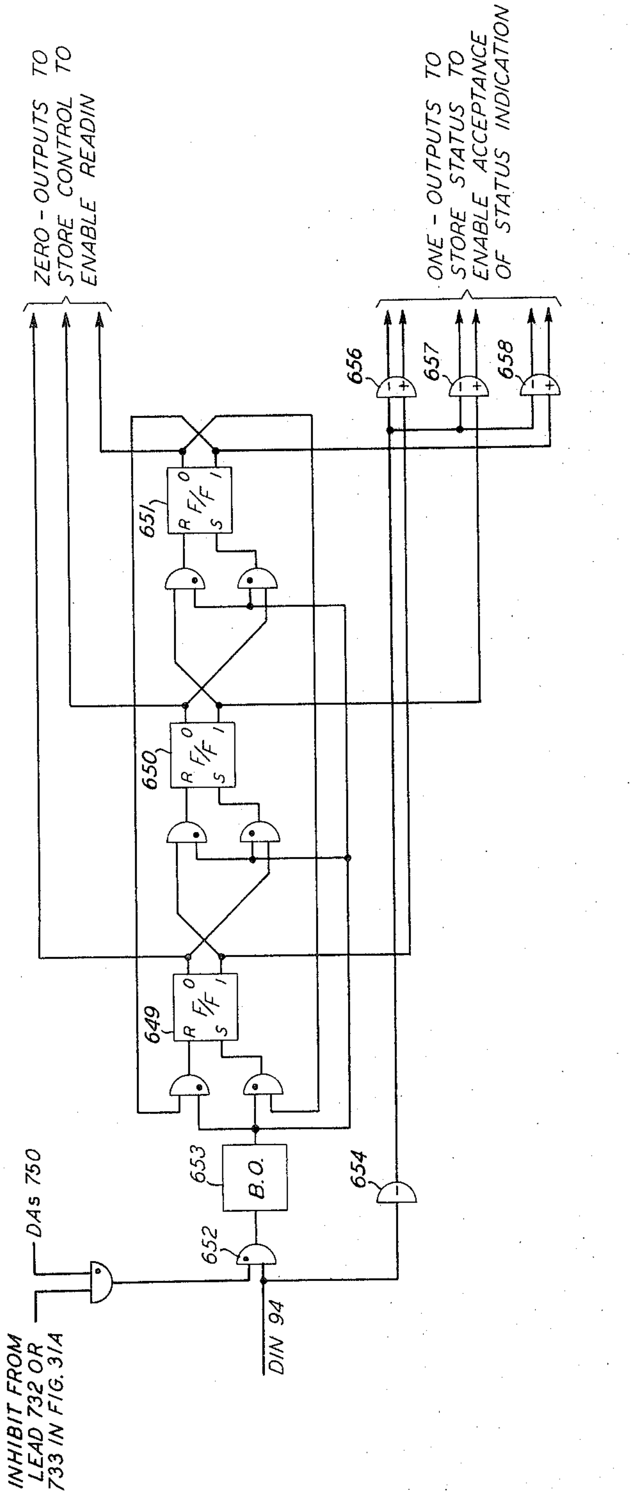
Figure 27A:
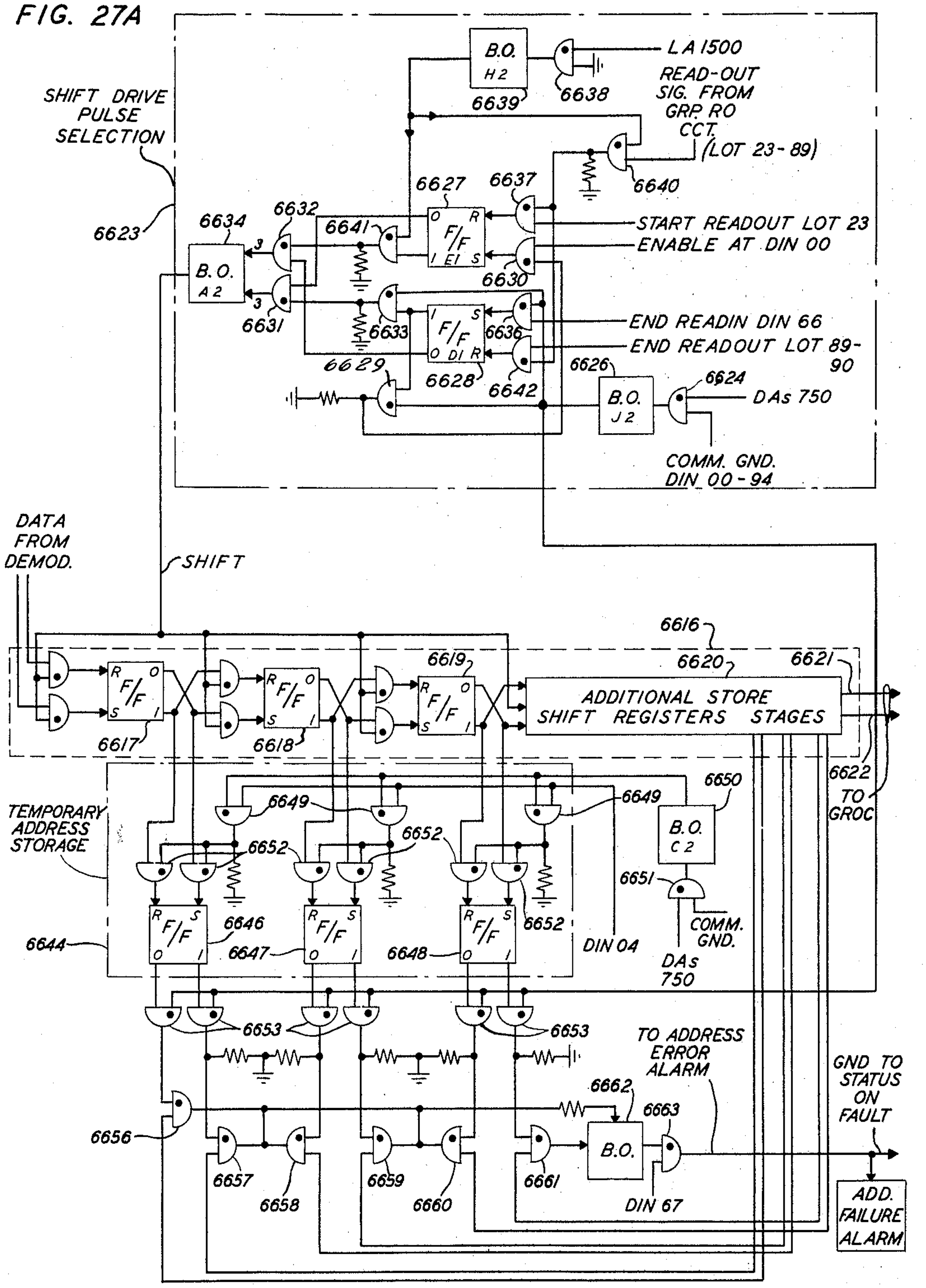
Figure 29:
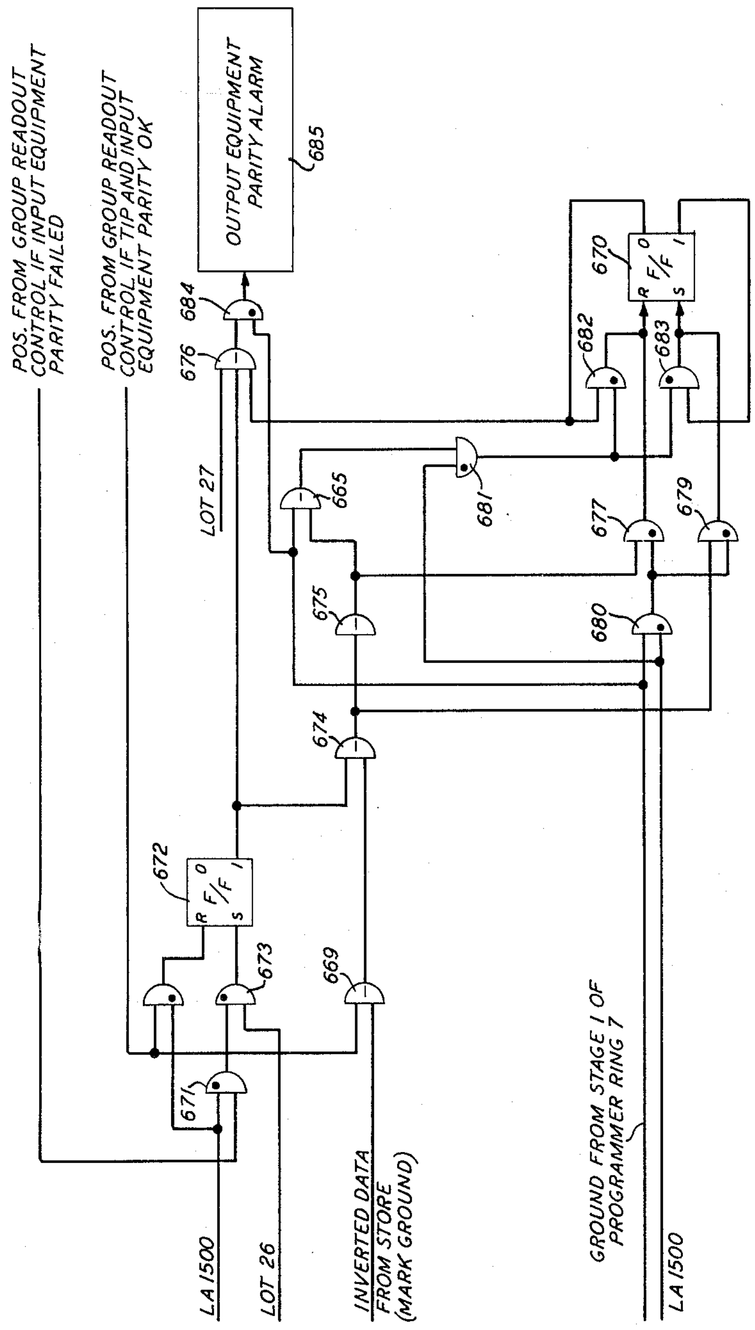
Figure 30A:
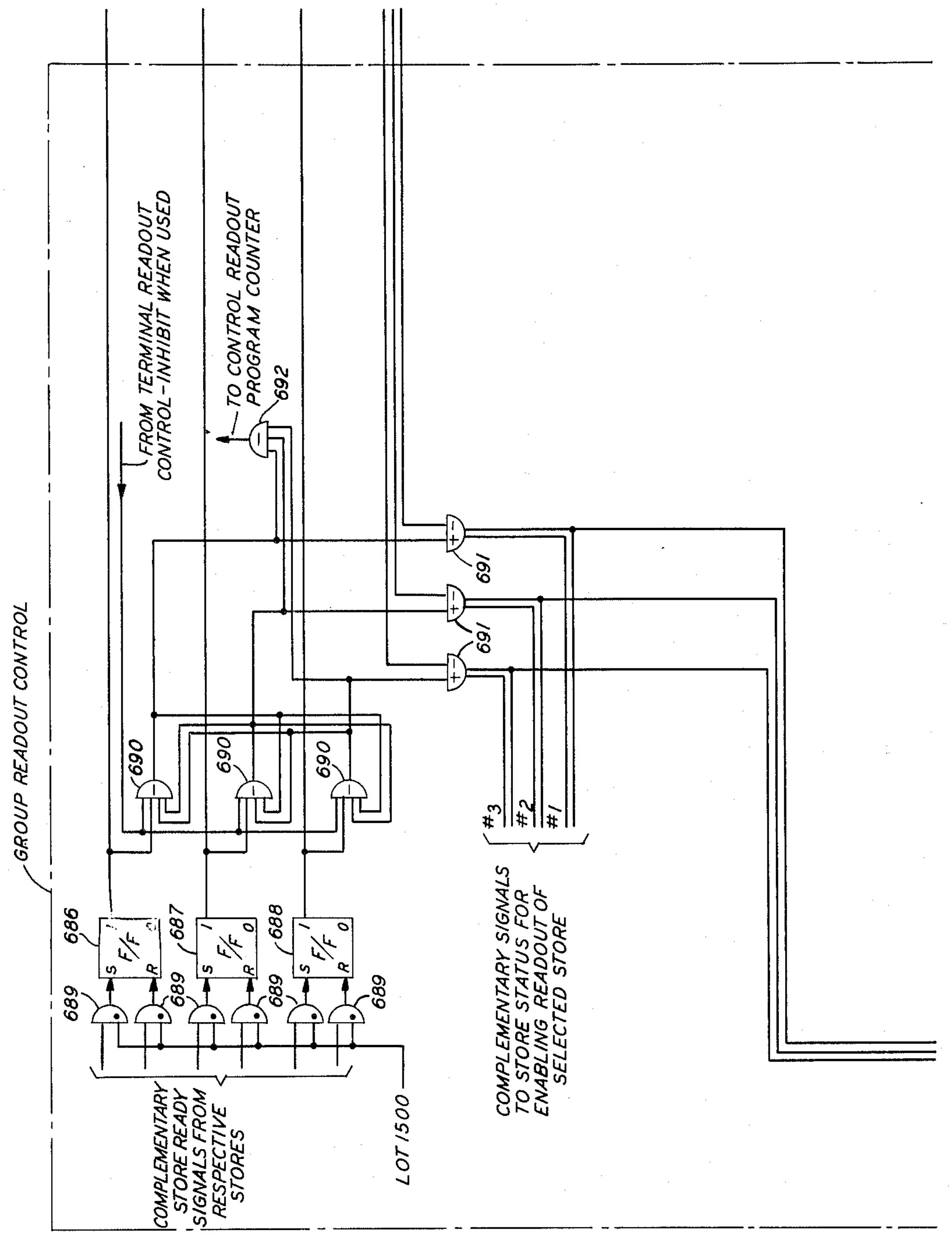
Figure 31A:
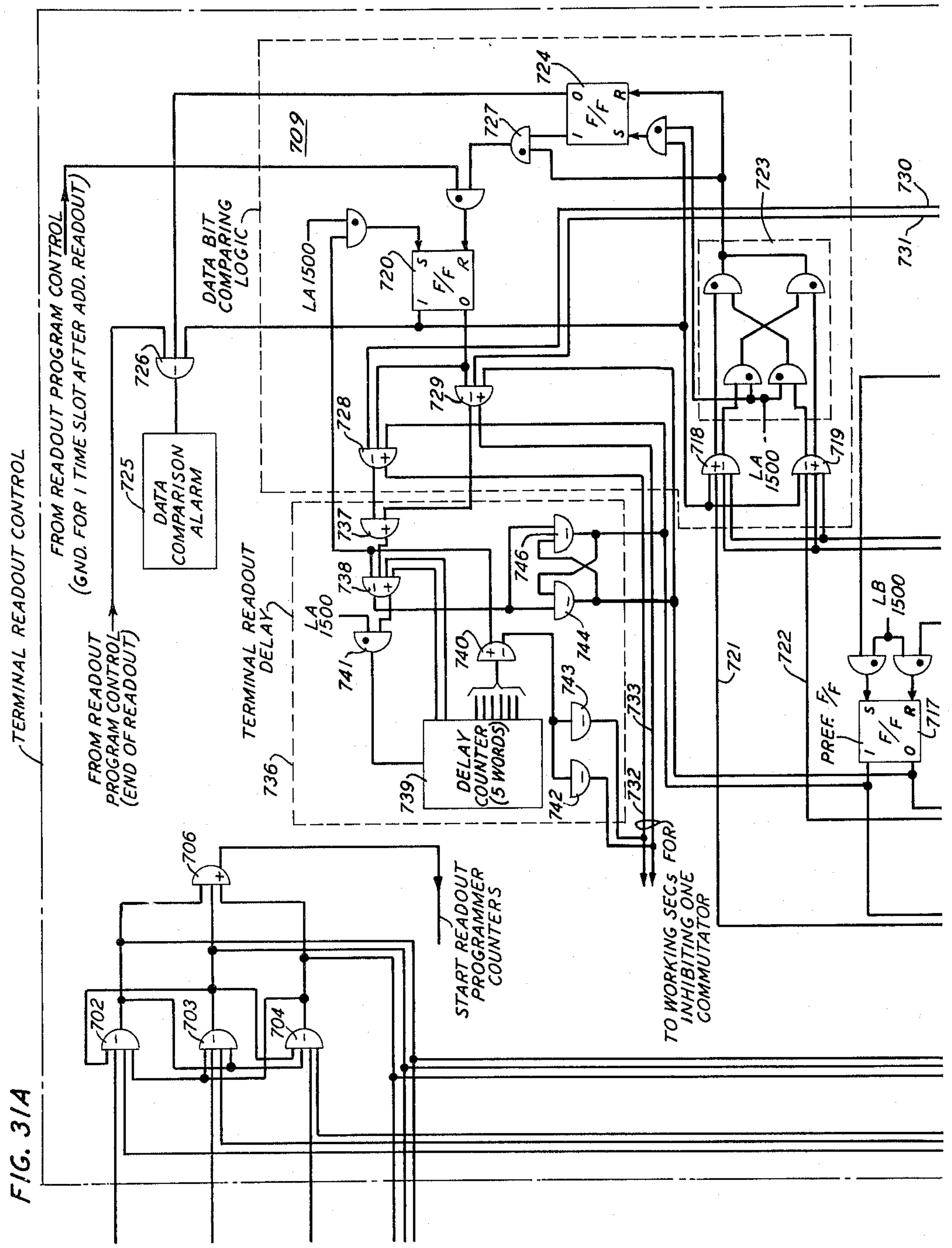
Figure 34:
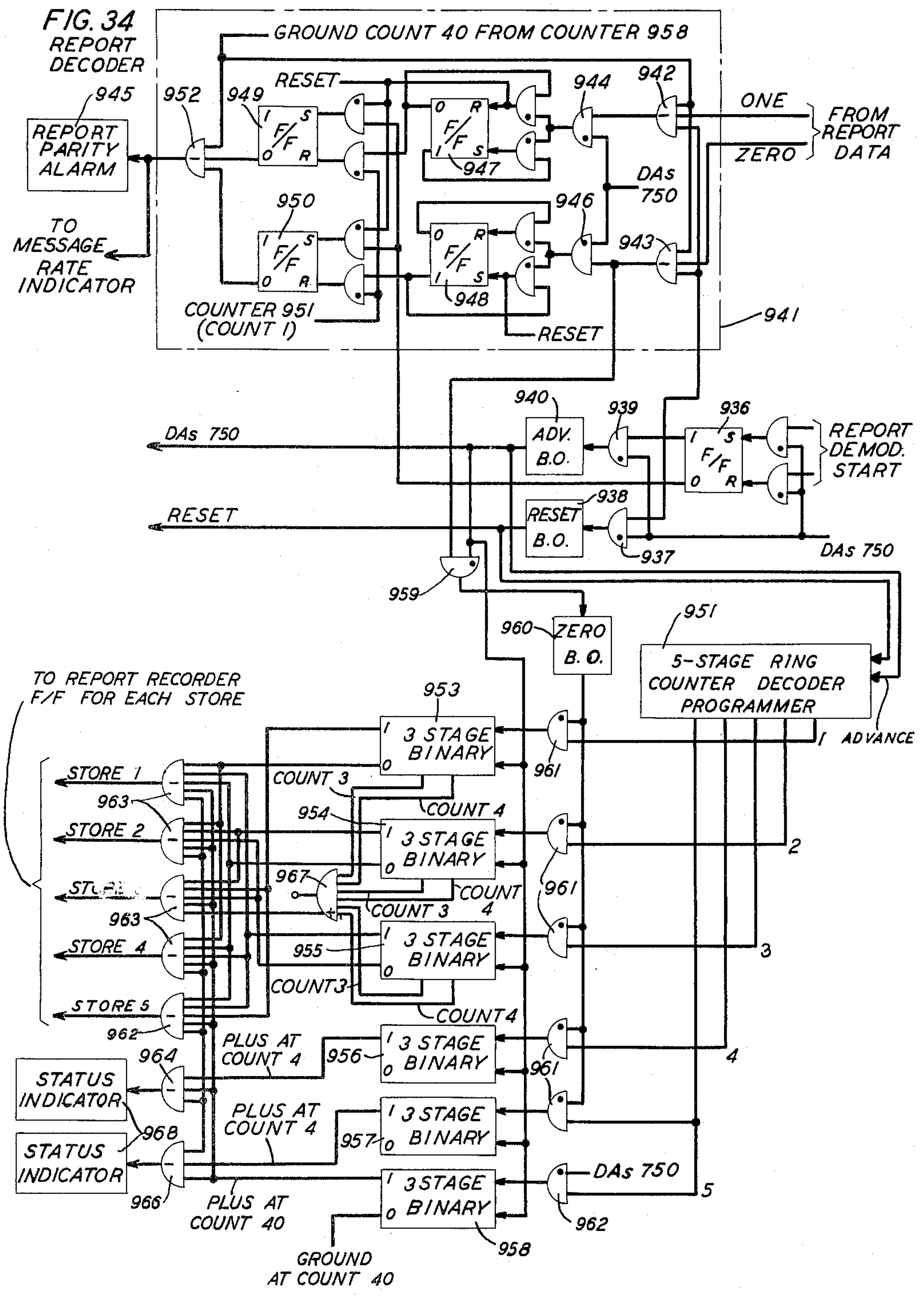
Figure 35:
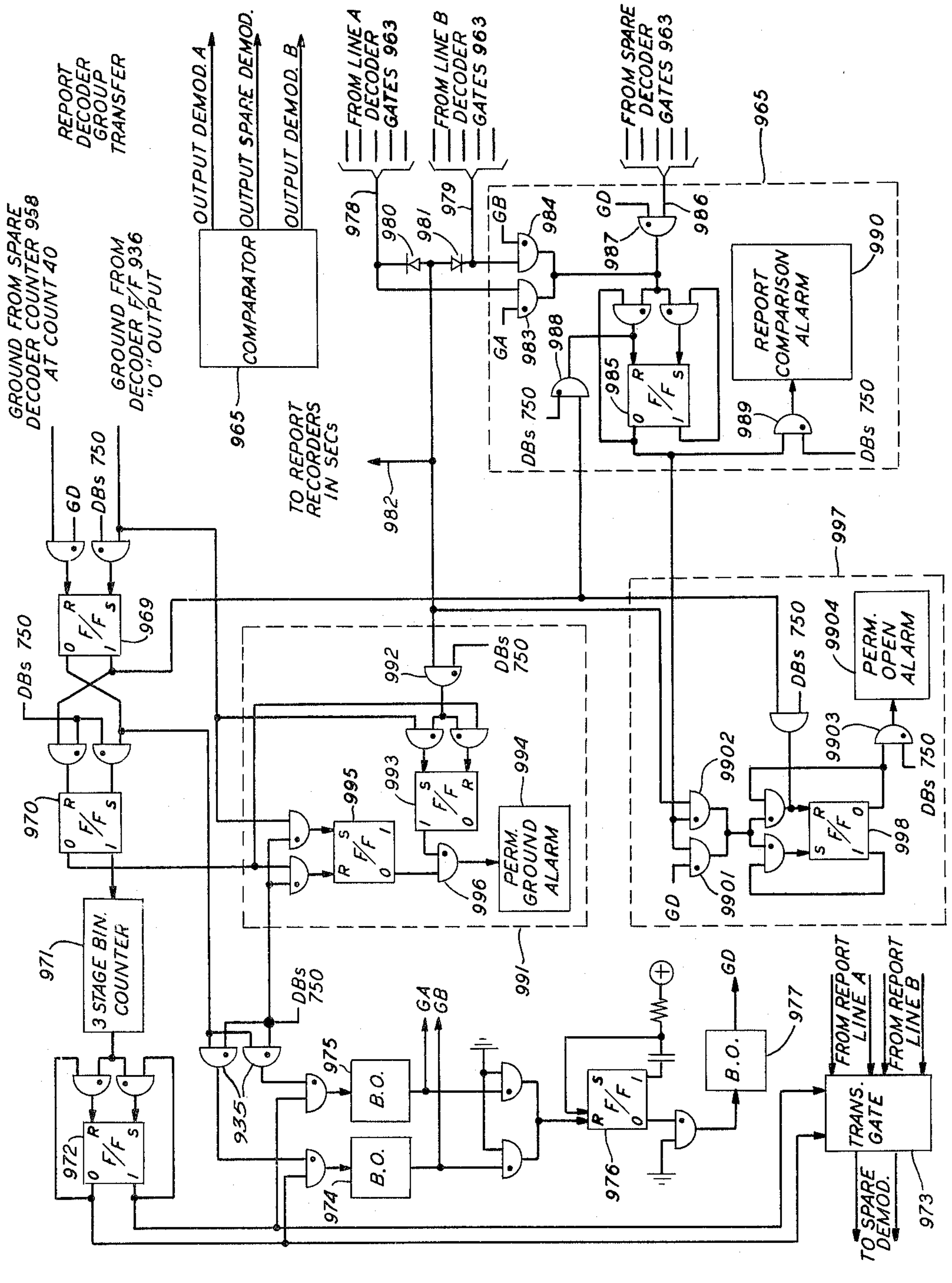

FIGS. 11A and B are simplified diagrams of the common control circuits of FIG. 3;

FIG. 11C shows the manner in which FIGS. 11A and 11B are to be connected;

FIG. 12 is the individual store and control circuit of FIG. 3;

FIGS. 13 and 14 are sequence diagrams illustrating the operation of the transmitting station;

FIG. 15 is the error control and ready-start circuit of FIG. 3;

FIG. 16 is the triple-interleaved parity register of FIG. 3;

FIG. 17 is a schematic diagram of a test point monitoring circuit;

FIG. 18 is the voter shown in FIGS. 1 and 2;

FIG. 19 is a frequency shift modulator of FIGS. 1 and 2;

FIG. 20 is a data comparing circuit in accordance with the invention;

FIG. 21 is the demodulator used in FIGS. 1 and 2;

FIGS. 22A and B are the receiver group transfer circuits of FIG. 2;

FIG. 23 is a simplified block and line diagram of the receiver storage and error control circuit;

FIG. 24 shows the receiver readin programming circuits;

FIG. 25 is the receiver error control circuit;

FIG. 26 shows the receiver commutator;

FIGS. 27A and B show the receiver individual store and control circuits;

FIG. 28 is the receiver readout programming circuit;

FIG. 29 shows the receiver output equipment parity checking circuit;

FIGS. 30A and B are the receiver group readout control circuits;

FIGS. 31A and B are the receiver terminal readout control circuits;

FIG. 32 is the signal converter;

FIG. 33 is the report encoder and control circuit;

FIG. 34 is the report decoder;

FIG. 35 is the report equipment transfer and comparator; and

Figure 36:
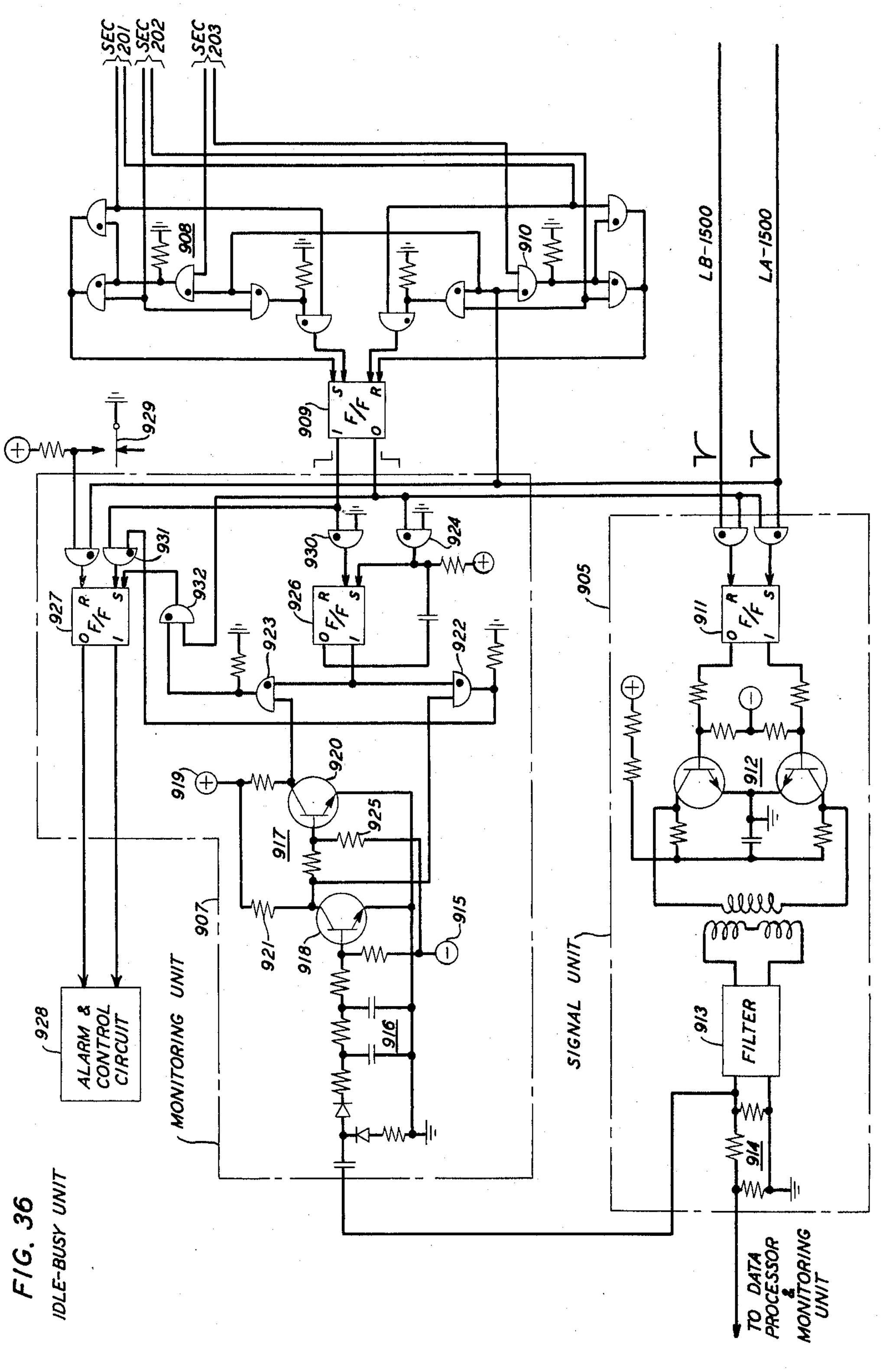

FIG. 36 is the idle-busy unit.

In the subsequent description of the invention a broad picture of the arrangement and operating principles of the invention will be presented in connection with FIGS. 1 and 2. Details of the various parts of the system are included in other figures. In order to facilitate cross reference between the over-all system of FIGS. 1 and 2 and the details of the remaining figures, different number blocks of one hundred numbers each are utilized for reference characters for each of the major portions of the system. Thus, the one hundred series of numbers is used to designate system parts in FIGS. 1 and 2 which are ancillary to the invention and are not shown in substantial detail in other figures. Other number blocks are assigned to the various equipment blocks of the transmission system, and numbers within these blocks are used for reference characters in connection with descriptions of the details of each equipment block. When there are not enough numbers in a block, the block is repeated with a thousands digit added, e.g., 200, 2200.

*Overall transmission system*

In FIG. 1 a data processing terminal 100 supplies timing, start, and data signals to a loop transfer circuit 101 in the transmitting station of the figure. These signals are actually applied over three separate transmission channels and the signals are in the form of sinusoidal dipulses, i.e., the timing signals comprise a continuous sinusoidal wave at 1500 cycles per second. The start signal is one cycle of a 1500 cycle per second sine wave, and the data signals comprise a single cycle of a 1500 cycle per second sine wave for a mark and nothing for a space.

Two routes, route A and route B, are provided for supplying the aforementioned signals to loop transfer circuit 101. Only one of these routes, route A, is normally employed, and route B is maintained as a standby route in the event that route A should become disabled for any reason. A relay, not shown, may be operated to drive the switching contacts illustrated in loop transfer 101 for substituting route B for route A when desired. Timing, start, and data signals are coupled in their respective transmission channels from loop transfer 101 to each of the three transmitter storage and error control (SEC) circuits 201, 202, and 203. Briefly, each of the SEC cabinets converts the dipulse signals to corrsesponding rectangular pulse signals. Next, each of the SEC cabinets stores successive blocks of data in separate transmitter stores under the control of common control circuits operated by the timing signals from processing terminal 100. Each store has a discrete address, and the data representation of this address is stored with the data block. Readout from the stores is accomplished in accordance with a different program operated by locally generated clock signals provided from a local clock 102. As each data block and its associated store address are read out, a ready-start signal code is inserted before it, and an error-detecting code word is attached to the end of it. The operations of the three SEC cabinets 201–203 are kept in synchronism by means of a commutator voter 204 in a manner which will be described.

Data and ready-start outputs from each of the three SEC cabinets are applied to the three inputs of each of two voters 301 and 302. These voters determine whether or not the outputs of the three SEC cabinets are in agreement; and if any two SEC outputs agree, each of the voters provides a corresponding data and ready-start output to one of the modulator circuits 401 and 402. If one SEC cabinet should become inoperative, the voters may of course be bypassed and the outputs of the remaining cabinets applied to different modulators.

Each of the modulators converts the rectangular pulse data signals into corresponding frequency modulated, or frequency-shift, data signals. A comparator 403 compares input signals to modulator 401 against input signals to modulator 402 and gives an alarm if a difference is detected. Comparator 403 also provides an alarm if there should be a failure of output from either modulator. Modulator outputs are applied to line A and line B, respectively, for independent transmission to the receiving station illustrated in FIG. 2.

Since the transmission routes represented by lines A and B between transmitting and receiving stations may include completely different types of transmitting media and may follow widely different geographical routes, it would be pure coincidence if the signals on the two lines should arrive at the receiving station at the same time. Thus, working receiving equipment in the receiving station does not operate in synchronism insofar as reading operations are concerned. Furthermore, spare equipment for checking the operation of working equipment cannot operate in parallel with the two sets of working equipment as in the transmitter since the two sets are not in step. Accordingly, the spare equipment in the receiving station is arranged to operate in parallel with one set of receiving equipment for a first predetermined interval, in parallel with a second set of receiving equipment for a second predetermined interval, and to continue operating alternately in this fashion with the two sets of receiving equipment.

In order to implement the above-described type of receiving station operation, frequency-shift data signals from lines A and B are applied to demodulators 103 and 104, respectively, in FIG. 2. A receiver group transfer 500 alternately applies frequency-shift data signals from lines A and B to a spare demodulator 106 after each of the mentioned predetermined intervals. A line transfer circuit 501 in receiver group transfer 500 accomplishes the desired alternate coupling of line signals to spare demodulator 106. Transfer circuit 500 also includes a demodulator check circuit 502 for comparing the output of spare demodulator 106 with the output of the one of the working demodulators 103 or 104 to which it is parallel connected at any particular time.

Each of the demodulators is preferably a digital demodulator and is responsive to the frequency-shift data signals for producing, on separate output circuits, the corresponding rectangular start, data, and timing signals for use in the receiver station. These signals are separately applied from demondulators 103, 104, and 106 to receiver storage and error control (SEC) cabinets 601, 602, and 603. SEC cabinets 601 and 603 are normally connected to working demondulators whereas SEC cabinet 602 is normally connected to spare demodulator 106. This spare demodulator 106 and its SEC cabinet 602 are adapted to operate in step with the working demodulator and SEC cabinet to which they are connected at any particular time.

Each working SEC cabinet causes the incoming data signal to be checked for errors and routed into one of a number of receiver stores under the control of programming circuits driven by timing signals from the demodulator to which the SEC cabinet is connected. Various data checks are performed in the receiver, and decision logic may determine whether or not any particular data block contains sufficient correct information to warrant forwarding that block to the receiving data processor. If such forwarding is warranted, the rectangular pulse data is coupled through a terminal readout control (TROC) circuit 700 to a signal converter 107. The signal converter operates in cooperation with a local source 108 of clock signals for converting the rectangular pulse data into corresponding sinusoidal dipulse signals which are transmitted to the receiving processor 109 along with a dipulse start signal and a continuous sinusoidal timing wave at the frequency required by the receiving processor 109.

Simultaneously with the readout of a data word from a receiver SEC cabinet, a report signal is coupled from the SEC cabinet to each of three report encoder and control circuits 801, 802, and 803. The report signal comprises the transmitter store address of the data block being read out and pulse signals indicating the status of reception on transmission lines A and B. These encoder circuits each utilize the report signals to produce a report word that is transmitted seven times in succession, along with a ready-start signal, to a pair of voters 303 and 304. Voters 303 and 304 operate in much the same fashion as the voters 301 and 302 in the transmitting station to provide two output signals for modulation whenever any two of the three report encoder and control circuits 801–803 are in agreement.

The report message produced by voters 303 and 304 is in rectangular pulse form and is applied from each voter to one of the modulators 406 and 407. A conversion from rectangular pulses to corresponding frequency-shift data signals is accomplished by modulators 406 and 407 in the same fashion as the transmitting station modulators 401 and 402 operated. A comparator 408, which is similar to comparator 403, checks the input of modulator 406 against the corresponding input of modulator 407 and gives an alarm if a difference is detected. Comparator 403 also gives an alarm if modulator output fails. Frequency-shift report messages are coupled from the modulators over report lines A and B to the transmitting station in FIG. 1.

In the transmitting station report demodulators 110 and 111, which are of the same type as demodulators 103 and 104, reconvert the frequency-shift signals on report lines A and B to rectangular pulse form for application to report decoders 901 and 902, respectively. Here again, the transmissions over the two report routes represented by lines A and B are not received in synchronism so a spare demodulator 112 and a spare decoder 903 are provided for checking the operation of the working report demodulator and decoder in much the same fashion as previously described in connection with checking operations performed on the receiving station working demodulators and working SEC cabinets. Likewise, a report equipment transfer and comparator circuit 904 is provided to perform for the report receiver the functions corresponding to those of the receiver group transfer 500 in the receiving station.

Each report decoder examines the seven repetitions of the report word by means of an error-detecting-and-correcting voter to determine the correct address of the transmitter store which is being reported. This address is then utilized to produce a signal that is applied to the corresponding store in each of the transmitter SEC cabinets 201–203 to enable that store for the readin of new data. If the report does not include such an address, no enabling signal goes to the SEC cabinets of the transmitter; and during the next program cycle the previously restored data in the reported store is retransmitted.

The report decoders also route the status bits of the report word to message rate indicator circuits 113 to provide an indication of the rate of good data reception on each of the main data transmission lines A and B between transmitting and receiving stations.

Transmitter SEC cabinets 201–203 also utilize the good report signal supplied by the report decoders to apply a message-request signal to three input connections of an idle-busy unit 906. If at least two of the three transmitter SEC cabinets are in agreement that a good message was received and a message request is in order, the idle-busy unit 906 causes an idle-busy tone to be returned to data processing terminal 100 through the loop transfer 101 over the idle-busy route A. This tone may typically take the form of a 1500 cycle per second sinusoidal wave. A stand-by idle-busy route B is also provided for selection in loop transfer 101 in the manner previously described if trouble should be encountered on route A. Data processing terminal 100 responds to the idle-busy tone by transmitting a start signal and another block of data to the transmitting station. This type of operation is carried on continuously so that fault-detecting equipment which was previously mentioned, as well as other fault-detecting equipment that may conventionally be employed in connection with such a transmission system, may maintain constant surveillance of system operation.

The transmission system of FIGS. 1 and 2 may of course be arranged for different modes of operation to perform variations of the functions described. Thus, for example, one could provide switching means to limit the number of times that a particular data block is retransmitted. If all report lines were in a fault condition the mode of operation might be arranged to cause every data block to be transmitted two times before being replaced by new data.

*Transmitter storage and error control cabinet—FIG. 3*

FIG. 3 shows a simplified functional block diagram of a transmitter SEC cabinet. Common control circuits 206 receive on separate leads dipulse timing, start, and data signals from a data processing terminal. Each dipulse is converted to a single-pulse data bit of rectangular waveform, and the start and timing signals are utilized for controlling the storage blocks of data in individual block stores 207. Each block of data may include a single data word in the transmitted message or it may comprise a group of words. Ideally, however, the size of the block should be sufficient so that an error-detecting code word, based upon the structure of the block, including the associated store address, may be efficiently employed and transmitted when the block is read out of its store.

An error control and ready-start circuit 208 receives data blocks, which are being read out of data store 207 and cooperates with a parity register 209 to generate the aforementioned code word for detecting errors. The data word and error-detecting word are then coupled in their rectangular pulse form to both of the data voters as previously described in connection with FIG. 1. Readout operations from the data stores 207, and the operation of the TIP parity register 209 and the error controlling and ready-start circuits 208 are all conducted under the control of local clock signals derived from clock 102 in FIG. 1.

FIGS. 4A through 4E illustrate schematic diagrams of conventional logic blocks utilized throughout the data transmission systems to be described. FIGS. 5A through 5E show a corresponding simplified schematic representation of each of the circuits of FIG. 4 as they will be shown in drawing figures which are yet to be discussed.

Figures 4A, 4B, 4C, 4D, 4E, 5A, 5B, 5C, 5D, 5E, 6, 7:
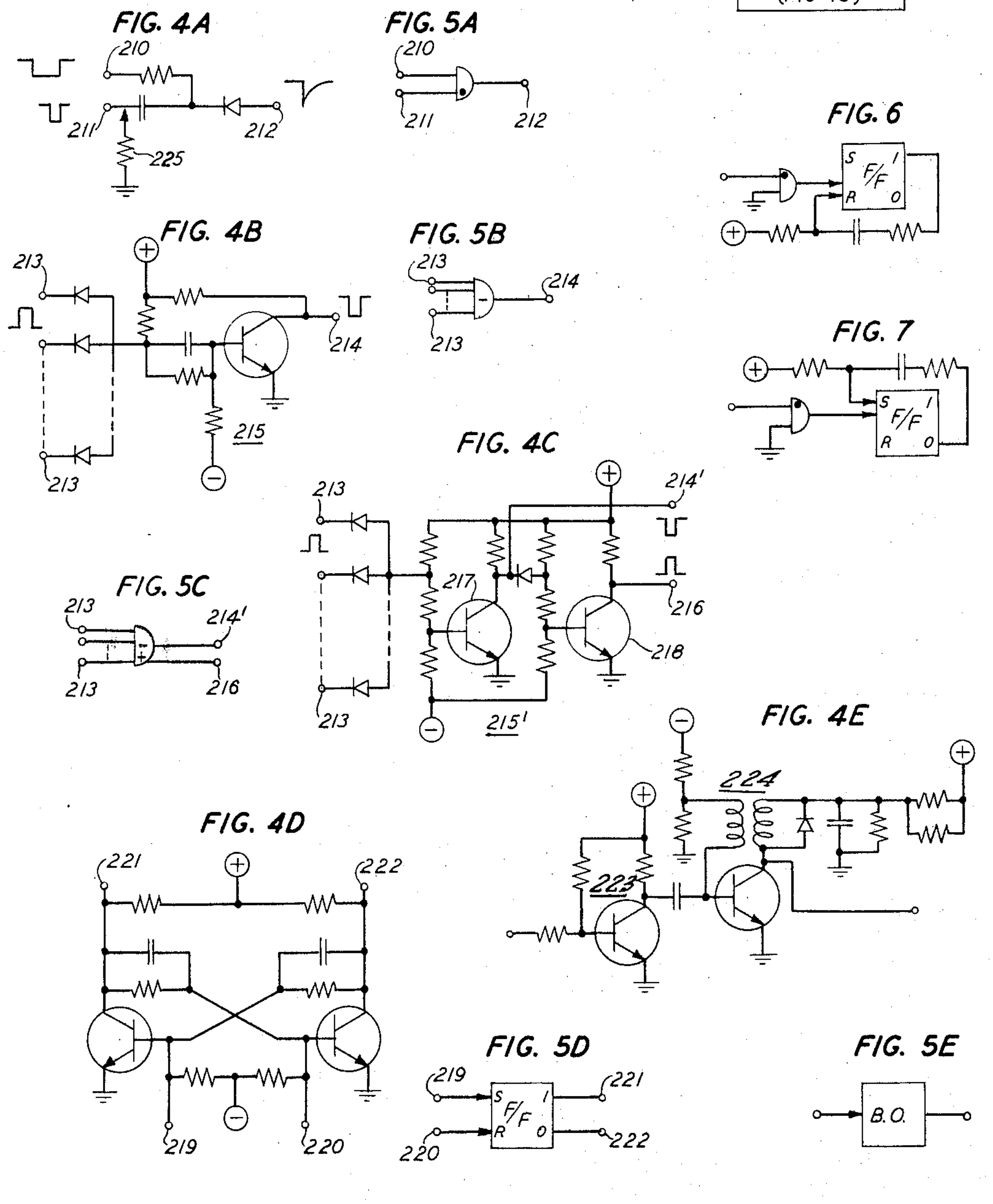
FIGS. 6 and 7 are schematic representations of set and reset monostable multivibrators, respectively.

FIG. 4A is a simple diode AND gate. Although not shown in the drawing, it is assumed that gates of this type are provided with a conductive path from terminal 212 to ground in the form of the circuit which the gate is to control. The gate is enabled by the application of a negative-going potential to an input control, or enabling, terminal 210, and it is opened by the application of a further negative-going potential to the pulse input terminal 211. The negative-going portion of the potential at terminal 211 must occur while terminal 210 is enabled in order to open the gate. When opened, the gate of FIG. 4A produces at its output a negative-going impulse at the output terminal 212. A typical negative-going output impulse is illustrated adjacent to the terminal 212. In a typical operating atmosphere, the described negative-going input potentials may be potentials changing from a positive level of approximately 16 volts to a more negative level which may be ground or a fraction of a volt above ground. Thus, in the future consideration of the gates of the type shown in FIG. 4A, as well as other circuits of the invention, control voltages will be described as being either positive or ground voltages. If two or more diode AND gates are to be used in tandem, the second and later gates should have a resistor 225 connected between ground and input lead 211 to prevent the build up of charge on the gate capacitor. In the other drawing figures, such resistors are considered to be included and are not separately shown. FIG. 5A illustrates the simplified schematic representation of the AND gate of FIG. 4A with a dot placed adjacent the pulse input lead 211, which is normally used for finally opening a previously enabled gate.

It may be further noted in connection with the gate of FIG. 4A that the capacitor performs a differentiating function. Thus, only the negative-going transition of a signal applied to the capacitor produces a gate output. Such output always consists of a narrow impulse coincident with the negative-going edge of the pulse signal applied to the capacitor. Because the gate includes a resistor and capacitor, it will be understood that a finite time is required after the application to, or removal from, terminal 210 of enabling signals before the gate actually responds.

FIG. 4B shows a transistor-diode AND gate which may have a plurality of input terminals 213 and an output terminal 214. Positive control voltages must be applied to all of the input terminals 213 simultaneously in order to enable the gate. Output terminal 214 is so connected to the output of an amplifier 215 that it will exhibit a positive potential when the gate is disabled and a potential near ground when the gate is enabled. In other words, when all of the diodes connected to input terminal 213 are biased off, the base control electrode potential of a transistor in amplifier 215 rises sufficiently to permit strong conduction in the transistor and thereby clamp output terminal 214 to ground. A schematic representation of the transistor diode gate of FIG. 4B is shown in FIG. 5B.

FIG. 4C shows an inverting transistor diode AND gate which is similar to the gate shown in FIG. 4B, but which includes an extra stage of amplification, so that the output terminals 214′ and 216 will be subjected to potential variations of opposite phase during gate operation. Thus, when positive potentials are applied to all input terminals 213, a ground potential appears at output terminal 214′ because transistor 217 in amplifier 215′ is thereby driven into conduction to clamp output terminal 214′ at ground. In like manner the negative-going potential at the collector of transistor 217 biases transistor 218 into a nonconducting condition thereby permitting the potential at output terminal 216 to rise to a positive level. The schematic representation of the gate of FIG. 4C is shown in FIG. 5C. It will be noted in the latter figure that output terminal 214' appears approximately in the middle of the right-hand side of the schematic representation, and a minus sign is included in the symbol adjacent to the lead connected to terminal 214'. This terminal is the one which exhibits the ground potential when the gate is enabled by positive signals and a positive potential in the absence of a positive signal on at least one of the input terminals. Output terminal 216 appears in the lower portion on the right-hand side of the schematic representation and exhibits a positive potential or a ground potential when terminal 214' exhibits ground potential or a positive potential, respectively. A plus sign is included in the schematic representation adjacent to the lead connected to terminal 216.

FIG. 4D is a conventional bistable multivibrator with input terminals 219 and 220 for applying signals to transfer conduction back and forth between the two multivibrator transistors in a well-known manner. Output signals are derived at terminals 221 and 222. The schematic representation of this multivibrator appears in FIG. 5D with the additional characterizing designations of "S" and "R" to indicate Set and Reset input portions of the multivibrator and "1" and "0" to indicate corresponding output connections. Thus, a negative-going or ground potential applied at input terminal 219 causes a transfer of conduction between the transistors, so that a positive potential appears at the ONE output connection 221 and a ground appears at the ZERO output connection 222.

The circuit of FIG. 4E is a blocking oscillator circuit which includes a transistor amplifier stage 223 for coupling input pulses to a blocking oscillator stage 224. Amplifier 223 normally conducts in the absence of ground or negative input pulses, and oscillator 224 is normally resting in a nonconducting condition. A ground pulse applied to the amplifier input terminal biases the amplifier to a nonconducting condition and causes a positive pulse to be coupled to the oscillator. This pulse drives the oscillator into its unstable conduction condition and produces a ground output pulse. FIG. 5E is the schematic condensation of the blocking oscillator circuit of FIG. 4E.

FIGS. 6 and 7 illustrate further modifications of a multivibrator similar to that shown in FIG. 4D, but in each case arranged to operate in the well-known monostable fashion. That is, the circuit normally rests in one condition and when triggered it transfers to its other condition temporarily restoring to its normal rest condition automatically after a predetermined time intervals. The circuit of FIG. 6 normally rests in the set condition and is designated a set monostable, while the circuit of FIG. 7 normally rests in the reset condition and is designated a reset monostable.

Figure 8:
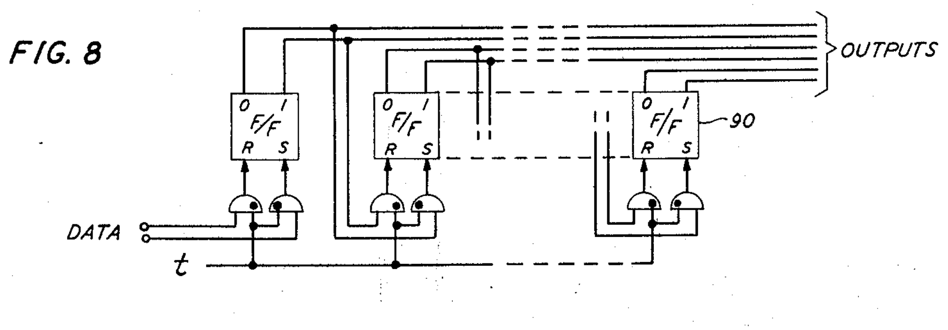
FIGS. 8 through 10 are simplified block and line diagrams of a shift register, a ring counter, and a binary counter, respectively.
Figure 9:
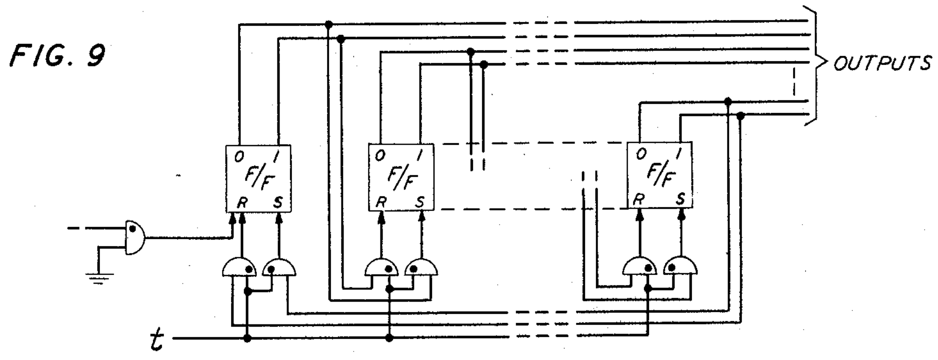
Figure 10:
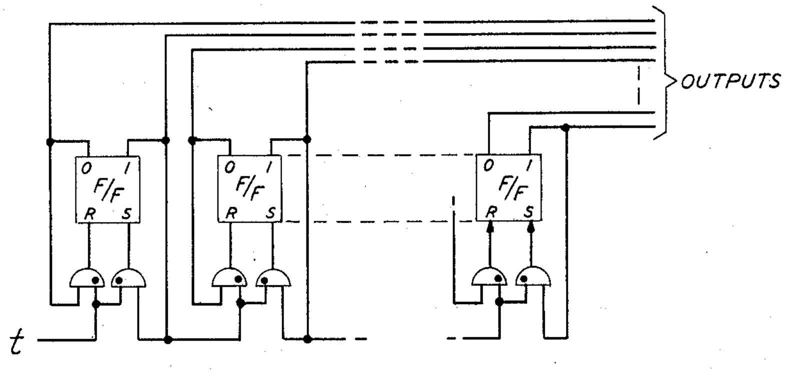

FIGS. 8, 9 and 10 show bistable circuits arranged in well-known configurations to function as a shift register, a ring counter, and a binary counter, respectively. The shift register of FIG. 8 includes data and timing inputs and has the ONE and ZERO output connections of each stage coupled to the reset and set input connections of the following stage through AND gates which are enabled or disabled by the data which is being shifted between the stages. Timing pulses are applied in multiple to the pulse inputs of all of the aforementioned gates to open the enabled gates and transfer the coupling signals directly to the corresponding multivibrator inputs. Output signals may be derived from any one or more of the shift register stages as the need at hand may demand. Usually, however, outputs will be coupled through some sort of logic, such as logical AND gates; or they may be derived as parallel output signals from the register stages simultaneously or from one or more stages in predetermined steps.

The ring counter of FIG. 9 is similar to the shift register, but in this case normally a single data ONE bit or a single ZERO bit is inserted into the ring counter. The output of the last stage is coupled back to the input of the first stage, and the timing signals cause the single data bit to be repeatedly circulated around the ring thus formed.

Figure 10A:
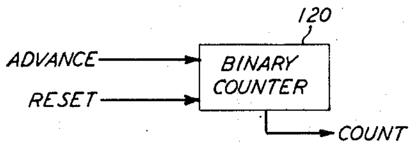
FIG. 10A is a simplified block diagram of the binary counter of FIG. 10.

In the binary counter of FIG. 10 every bistable, or flip-flop, circuit is provided with control gates at its set and reset inputs as in the case of the shift register and ring counter. However, now a single input is applied to the control gates at their pulse input connections, sometimes referred to as a complementing input connection, so that each input pulse to the complementing input connection causes the first stage to transfer from either one of its stable conditions to the other. The ONE output of each stage is coupled to the complementing input of the next following stage if there is one. Output connections are again derived from the ONE and ZERO outputs of the various bistables in the counter. FIG. 10A illustrates the type of schematic representation used in the drawings for the register and counters of FIGS. 8 through 10. In this case a binary counter is illustrated so the ADVANCE input lead corresponds to the lead *t* in FIG. 10. Another input lead designated "reset" may also be provided and would include AND gates arranged to couple a single input pulse in parallel directly to the reset or set input connections of all flip-flops in the counter for resetting the counter to some predetermined condition. Output connections from the binary counter may be provided (through logic not separately shown) and designated "Count ——" indicating that a counter ouput signal is derived from the counter as described and at the counting level indicated.

*Transmitter SEC—Common control—FIGS 11A through 11C*

FIGS. 11A and 11B may be combined in the fashion shown in FIG. 11C with FIG. 11A above FIG. 11B. When so combined the two figures represent the common control circuits 206 previously mentioned in connection with FIG. 3. Data, start, and timing signals from data processor 100 are applied to wave shapers 226, 227, and 228, respectively. These wave shapers perform whatever wave amplification and clamping may be necessary to convert the sinusoidal start, data, and timing signals which are received into corresponding rectangular output pulses occurring at the same frequency. One such wave shaper employed a particularly convenient limiting amplifier of the type shown in the copending application Serial No. 138,221, filed September 11, 1961, in the same name of O. J. Murphy and entitled "Limiting Amplifier" and assigned to the same assignee as the present application.

Wave shaper 228 receives sinusoidal timing signals at 1500 cycles per second and produces on its output leads 229 and 230 two trains of positive-going rectangular pulses at the same frequency but in opposite phase. The two trains of rectangular pulses are coupled through permanently enabled gates 231 and 232 to drive blocking oscillators 233 and 234, respectively. Outputs from these two blocking oscillators are designated P*r*A1500 and P*r*B1500, indicating negative-going timing pulse waves of 1500 cycles per second derived from processor terminal timing as two phases A and B. In order to simplify the drawings and thereby facilitate the understanding of the principles of the invention, direct connections between the various circuits and these two output leads of blocking oscillators 233 and 234 are generally not shown. Circuits utilizing these processor timing signals are shown with input leads bearing the same designations as the output lead at which the corresponding timing is available. A similar procedure has been adopted in connection with other timing and programming signals used throughout the transmission system and which will be subsequently described.

The output of blocking oscillator 234 is also utilized to drive readin programmer counters 236. These counters comprise, in one circuit which was actually operated, a seven-stage ring counter with one output driving a four-stage binary counter. Readin program timing signals are derived from the various counter stages as previsously discussed in connection with FIG. 10 and are available at output leads designated "PIN——." This designation indicates that the timing signal occurs after the indicated number of 1500 cycle timing pulses have been counted. The letter P in the designation indicates that the timing is under the control of timing signals derived from the data processing terminal and the letters "IN" indicate that the timing signal is used to control readin operation. Programmer counters 236 are started in synchronism with the first data bit at the beginning of each data block by a start signal derived from the ZERO output of the common readin flip-flop 293 shown in FIG. 12. Counters 236 are reset to the zero count at the end of each data block by a self-generated signal, i.e., the last readin program count signal is used internally to reset the counters.

The common control circuits of the transmitter SEC also include circuits for obtaining readout program and timing control. These circuits are also shown in FIG. 11B and comprise a set of readout programmer counters 237 which are driven by 750 cycle per second timing signals from local clock 102 and appearing on the lead designated LA 750. Counters 237 in one embodiment include three ring counters of 7, 6 and 5 stages, respectively, all driven individually by the LA 750 timing signals. More details of such a counter driving arrangement are shown in FIG. 16. Readout programming signals are derived from these counters 237 on leads designated "LOT——." The "L" in this designation indicates that the program timing is controlled by the local clock and the "OT" indicates that the timing is used for readout control. The numbers in the blank indicate the number of 750 cycle per second clock signals that must be counted by the ring counters before a count signal appears on the program lead.

Timing LA 750 is also applied through an AND gate 238 which was previously enabled by readout timing LOT 00 to advance a commutator 239 which may comprise a five-stage ring counter. ONE and ZERO outputs derived from the commutator stages are utilized to control certain ones of the individual store circuits 207 in FIG. 3 and for associated individual control logic networks. These commutator output leads are designated CM 1–0, for example, indicating an output signal derived from the ZERO output of the first stage of the commutator. Other commutator outputs would be similarly designated to indicate similar outputs of certain stages in the commutator ring.

In order to synchronize the operation of the three transmitter SEC cabinets, a ground connection is taken from the ZERO output of the fifth commutator stage to a voter circuit 204. Each SEC cabinet is provided with a similar output lead from its commutator, and the three leads are coupled to enabling inputs of voter gates 240, 241, 242, 244, and 246 in voter 204. Clock signal LA 750 opens gates 240 and 241, and the output of the latter gate opens gate 242 to apply triggering signal to a blocking oscillator 243. The output of gate 240 is utilized to open two additional gates 244 and 246 for also driving blocking oscillator 243 after one of these gates has been previously enabled by a commutator output signal from one of the other commutators. Thus, blocking oscillator 243 is triggered any time that the commutators in two of the SEC cabinets have reached a full count in coincidence with a 750 cycle clock pulse. The output of blocking oscillator 243 is applied to the reset inputs of all commutators to reset all at the same time. It will become apparent as the description proceeds that this operation causes all three commutators to enable only one store in their respective SEC cabinets in response to the occurrence of the next 750 cycle clock pulse.

Each commutator 239 may be provided with logic to activate an alarm 235 if upon reset from the commutator voter 204 an improper condition such as all ZEROs, an excess of ONEs, or a lagging ONE condition exists.

Turning now to the data input to the SEC cabinet, sinusoidal data dipulses are applied to wave shaper 226 which produces rectangular ground level output data signals whenever a data bit interval contains a mark, or ONE. The latter pulses enable the set gate 247 of a flip-flop 248. The next P*r*A 1500 processor timing pulse opens gate 247 and sets flip-flop 248. One-half cycle later a P*r*B 1500 pulse opens a permanently enabled gate 249 to reset flip-flop 248. Operation continues in this fashion during the data message with flip-flop 248 being set by each mark, or ONE pulse, in the data and immediately reset by phase B of the processor timing signal. ONE and ZERO outputs from flip-flop 248 are coupled to the readin selector gates 273 associated with the individual data stores 207 which are shown in FIG. 12.

A dummy message circuit 250 in FIG. 11A is provided for applying to the transmittting station stores a message of continuous data ONES if there should be a failure of data coming in from the data processing terminal 100. A transistor-diode gate 251 supplies a plus output signal if any store in the SEC cabinet is prepared for the readin of data. A gate 252 provides a plus signal derived from the report receiver of the transmitting station as long as there is an acknowledge signal indicating satisfactory reception of the data found in one of the transmitter stores. These two plus signals are employed to enable a further gate 253, which is opened by the ZERO output of the readin flip-flop 281 in the start and acknowledge gates 274 of FIG. 12, thereby indicating that no start signal has been received from the processor 100. When gate 253 has been opened indicating that everything is ready for new data from the processor, but no such data is being received, the ground output signal from gate 253 enables AND gate 254. P*r*B 1500 timing pulses are applied through gate 254 to open a further AND gate 256 if that gate had been previously enabled by readout timing LOT 59.

A dummy flip-flop 257 is set by the output of gate 256 and enables AND gate 258 to couple P*r*A 1500 timing pulses to the set input of data reading flip-flop 248. This means that continuous ONEs are applied to the data store receiving the output of flip-flop 248 until such time as flip-flop 257 may be reset. Such reset may occur when readin timing PIN 66 enables AND gate 259 to couple timing P*r*A 1500 for opening a further AND gate 260 to reset the flip-flop. However, if readout timing LOT 08 should occur before the mentioned readin timing, flip-flop 257 will be reset in a similar manner by the operation of gate 261.

Start dipulses from the data processor 100 are converted by wave shaper 227 to rectangular pulses. Such rectangular start pulses enable AND gate 262 for coupling a P*r*A 1500 clock pulse to set start flip-flop 263. This flip-flop is then reset by the next P*r*A 1500 timing pulse applied to AND gate 264, which is enabled by the ground ZERO output of flip-flop 263. However, if readout timing LOT 59 should occur before a start pulse is received, gate 266 is enabled and permits clock pulse P*r*B 1500 to set flip-flop 263. The significance of the circuitry just described is that flip-flop 263 generates a start pulse whenever a start dipulse is received from processing terminal 100; or, if such a start pulse is not received, the flip-flop still generates a start pulse in response to readout timing LOT 59. This operation is required since the start pulse is utilized in other transmitter circuits that must be operated in order to handle the dummy message, which is also started at readout timing LOT 59 as previously described.

The use of the start pulse generated by flip-flop 263 is coordinated with other transmitter operations by logic circuits shown at the top of FIG. 11B. Thus, at readout timing LOT 39 a gate 267, which had been previously enabled by a "satisfactory" report signal from report scanner gate 277 in FIG. 12, is opened to set an idle-busy flip-flop 268. The opening signal to gate 267 is received from a gate 2265 at the time of the first PrA 1500 clock pulse following the opening of gate 277. Ground start and stop signals from the ZERO and ONE outputs of this flip-flop are applied to idle-busy circuit 906. The ONE output of flip-flop 268 also enables a transistor-diode AND gate 269 for the duration of the idle-busy tone. As soon as a ground appears at the ONE output of the readin flip-flop 293 in FIG. 12, or upon the occurrence of readout timing LOT 60, a PrA 1500 timing pulse is coupled through one of the AND gates 270 or 271 in FIG. 11B to open a gate 272, which was previously enabled by the ground ZERO output of flip-flop 268. This operation resets flip-flop 268 and thereby terminates the idle-busy tone. This inhibits any start pulses from either the data processor or the gate 266 at LOT 59 due to false acknowledgments which could arrive between times LOT 39 and LOT 59. This feature, under noisy line conditions, prevents the erroneous discard of an unacknowledged message by substitution of a dummy message and falsely indicating to the processor that a start was asked for and not received.

Thus, the common control circuits 206 of each storage and error control cabinet receive data, start, and timing dipulses from processing terminal 100 and respond to these dipulses by providing rectangular pulses representing the data, the start, and the timing signals to the individual store circuits.

*Transmitter SEC—Individual store and Control—FIG. 12*

The rectangular pulse data signals in complementary form are received from flip-flop 248 in FIG. 11A and applied to a group 273 of readin selector gates including AND gates 297 and 298. Start pulses from gate 269 in FIG. 11A are applied to start and acknowledge gating 274, and an acknowledge signal from the report decoder is applied to an input of report recorder 276. In addition to the signals enumerated, the data store and control circuits receive seletcion signals from the commutator 239 in FIG. 11B and clock and program signals from FIG. 11B and from the clock 102. The store outputs include complementary data and address signals and a start signal for the readin programmer as will be described.

Report recorder 276 supplies a positive signal which indicates when a previous data block has been satisfactorily received, and this signal enables a report scanner gate 277 which transmits the acknowledge signal as a ground to the start and acknowledge gating 274. The latter gating affects the selection of advance pulses in selecting circuit 278 and the routing of these pulses through advance pulse steering gates 279. Pulses from circuit 279 are used for gating data into a data store shift register 280.

A store readin control flip-flop 281 in the start and acknowledge gating 274 is set by a start pulse as will be described. The ground ZERO output of flip-flop 281 enables AND gates 282 and 283 in the lower left-hand portion of FIG. 12 for coupling clock signals PrA 1500 and PrB 1500 to blocking oscillators 284 and 286, respectively. These blocking oscillators, when their input gates are enabled, simply repeat the clock signals for utilization in the individual store control circuits when such store is selected for operation.

The acknowledge signal from the report decoder enables an AND gate 287 in report recorder 276 for coupling clock signals LA 750 directly from clock 102 to set the recorder flip-flop 288. A positive ONE output signal from flip-flop 288 enables gate 277 of the report scanner as previously mentioned. A further enabling signal for this gate is obtained from the dummy flip-flop 257 in FIG. 11A indicating that the dummy message circuit 250 is not being employed. CM 1–1 output from the commutator opens gate 277, supplying a ground start signal to AND gate 2265 in FIG. 11B. The same ground signal is also applied to enable AND gate 289 in start and acknowledge gating 274 for coupling a PrA 1500 clock pulse to set flip-flop 281 upon the occurrence of a start pulse.

The setting of flip-flops 281 directs store 280 to receive a new data block. A ground ZERO output of this flip-flop enables AND gate 290 in the advance pulse steering circuit 279 for coupling advance pulses from the pulse selecting circuit 278 to the readin selector gates 273. Ground ZERO output from flip-flop 281 also enables AND gate 291 to couple PrA 1500 clock pulses through another AND gate 292 which was previously enabled by the acknowledge signal to set common readin flip-flop 293. As its name suggests, the flip-flop 293 is common to all of the transmitter store control circuits in one SEC cabinet although all of the rest of the equipment shown in FIG. 12 is individual to the store 280. The positive ONE output from flip-flop 293 actuates gate 2294 to produce a ground that is coupled as a start signal to the readin programmer 236 in FIG. 11B. The same ground also enables AND gate 294 for passing a clock signal PrB 1500 to trigger a blocking oscillator 296 in the advance pulse selecting circuit 278. These advance pulses are coupled from the output lead designated "ADV" to similarly designated input leads in the store control circuits. One such input lead appears at the input of data store shift register 280 for advancing data in this store. The advance pulses are also coupled through the steering gate 290 to open AND gates 297 and 298 for coupling complementary data signals from the common control to the input stage of data store shift register 280.

Data store shift register 280 comprises a series of bistable circuits in the well-known manner previously described, and for the purposes of the present invention the number of stages to be employed must equal the number of bits in the basic data block, or message, plus additional stages to accommodate a data code indicating the store address, and plus further additional stages for injecting the address code. Thus, as indicated in FIG. 12, register 280 includes three address storing stages, A1, A2, and A3, data storage stages D1 through D*n*, and three address injection stages, AI1, AI2 and AI3. In the illustrative example being considered, a 63-bit data block is used so D*n* would be D63.

At the end of each readout operation, the readout programmer circuits 237 in FIG. 11B are reset to the ZERO condition and generate readout timing signal LOT 00. This signal enables three AND gates 2201, 2202, and 2203 in FIG. 12 for coupling a clock pulse PrA 1500 through strapped gate output leads to establish predetermined stability conditions in the three address injection stages of store register 280. This strapped logic is schematically represented by turned output leads at the address gate outputs to indicate connection to the set or reset inputs of the address injection stages. Each of these leads has an arrowhead, and they are shown by way of illustration in FIG. 12 with two of them directed in one direction and one in the other to indicate, for example, an address binary code representation of 001.

As data is shifted into store 280 the address moves ahead of it through the data stages into the three address storage stages A1 through A3. At the end of the readin operation, which for a 63-bit data word plus a three-bit address, would be at readin timing PIN 66, AND gate 2204 is enabled and applies the clock pulse PrB 1500 to three address-check gates 2206, 2207, and 2208. The enabling inputs of these three gates are strapped to output terminals of address stages A1, A2, and A3 which represent the binary complement of the address injected into stages AI1–AI3. Thus, if any bit of the address has been changed for any reason during the shifting and storage operations, one of the address checking gates is enabled; and the PrB 1500 clock pulse is applied to an appropriate address-disagreement alarm circuit 2209. Alarm circuit 2209 may be adapted in any convenient fashion for sounding an alarm or for initiating some control operation.

If a dummy message is to be processed, flip-flop 257 in FIG. 11A is set as previously described. The ground ZERO output of that flip-flop inhibits gates 277 and 2216 in FIG. 12 so no acknowledge signal is available for use by start and acknowledge gating 274. However, the same ground ZERO signal from flip-flop 257 also enables gate 2289 in FIG. 12. The next PrA 1500 clock pulse opens the latter gate, and its ground output opens a gate 2290 that had been enabled by the ground ONE output of flip-flop 293. This action sets flip-flop 293 to start readin operations as before. This time, however, the ground ZERO from flip-flop 257 inhibits gate 2216 and thereby prevents the resetting of report recorder flip-flop 288. Now when the dummy message has been completed and flip-flop 257 in FIG. 11A is reset, gate 277 in FIG. 12 is enabled to cause flip-flop 268 in FIG. 11B to initiate the idle-busy tone once more. Thus, after each dummy message, a new message request is sent to the processor regardless of the nature of reception of the dummy message at the receiving station.

The readin program ends at readin time PIN 66 which is always within the readout time cycle determined by the readout programmer 237. At this time the readin flip-flops 281 and 293 are reset through gates 2212, 2215, and gates 2211, 2214.

Readout operation from the store is always initiated by the LOT 08 timing signal which also enables AND gates 2210 and 2213 in the start and acknowledge gating 274 in FIG. 12 as a redundant reset to improve circuit reliability. One of the gates 2212 or 2213 is enabled by one of these program signals and applies clock PrA 1500 to open AND gate 2215, which was previously enabled by the ground ZERO output of flip-flop 281, for resetting that flip-flop. The ground ONE output of the flip-flop now enables a gate 2219 in advance pulse steering circuit 279 for routing advance pulses to AND gates 2220 and 2221 in the readin selector network 273. The same ground ONE output of flip-flop 281 also couples local clock signals to the store control circuits by enabling AND gate 2231 in the lower left-hand corner of FIG. 12. This gate applies clock pulses LA 750 to a blocking oscillator 2232 which provides clock signals to the store control circuits during the readout operation.

One of the gates 2210 or 2211 in start and acknowledge gating 274 passes a PrA 1500 clock pulse to open AND gate 2214, which was previously enabled by the ground ZERO output of common readin flip-flop 293, for resetting that flip-flop. Now the ground ONE output of flip-flop 293 is inverted by transistor-diode gate 2294 and inhibits the application of further PrB 1500 clock pulses to store 280 from pulse selector circuit 278.

Readout starts when a commutator output signal on lead CM 1–1 enables AND gate 2222 in FIG. 12 to pass clock pulse LA 750 for opening a further gate 2223 when such gate has been enabled by readout program timing LOT 08. The ground output from gate 2223 sets a readout flip-flop 2224 for enabling an AND gate 2226 to couple clock pulses LA 750 to the advance pulse blocking oscillator 296. Advance pulses at the new 750 cycle per second rate now begin shifting data out of store 280 from stage A1 to the set and reset gates 2227 and 2228 of the common readout flip-flop 2229. These gates are enabled by the data and opened by the output of AND gate 2230 which is enabled by the ground ZERO output of store readout flip-flop 2224 on a lead designated "ROB" and which is opened by advance pulses on the lead ADV.

During the readout operation, and while the data and address are being shifted through readout flip-flop 2229 to the error control and ready-start circuits, the data only is being recycled from data store stage D1 by leads 2233 and 2234 to the enabling inputs of readin selector gates 2220 and 2221. The latter gates are intermittently opened by advance pulses, as has been described, and couple the data from stage D1 back to the input of data store register 280. At the beginning of the readout operation readout timing LOT 00 again enables the strapped logic gates 2201–2203 for inserting the store address in store stages AI1–AI3. Thus, as readout is accomplished leads 2233 and 2234 recycle the data into store 280 so that at the end of the readout portions of the program the store address appears again in stages A1–A3 after having been shifted through the register stages, and the data appears again in stages D1–D*n*. In this condition the store is ready for either immediately reading out the same data and address again, if required, or for reading in new data in the manner described. If a new data block is to be read in, the data block presently stored is shifted out, bit by bit, but cannot pass through gates 2227 and 2228, or through gates 2220 and 2221, because these gates are not opened when a data block is being read in. The old data block is thus discarded.

At the end of the readout operation, timing LOT 75 enables AND gate 2236 for opening address checking gates 2206–2208 to check the address again for the recycled data. At readout time LOT 74 AND gate 2237 is enabled and couples a clock pulse LA 750 to AND gate 2238 for resetting store readout flip-flop 2224. The plus ZERO output of flip-flop 2224 inhibits the coupling of further advance pulses to store register 280, and the readout operation is terminated insofar as the illustrated store is concerned.

Data from the store appearing at the output of flip-flop 2229 is coupled to the error control and ready-start circuits 208 of FIG. 3. The operations described in connection with the store and store control circuits of FIG. 12 are repeated for each of the individual stores 207 in a cyclic manner under the control of commutator 239 in FIG. 11B.

FIG. 13 shows a typical sequence chart for the operation of a store of the type illustrated in FIG. 12. This chart includes a wave diagram illustrating the composition of a typical data word as it might appear at the output of an SEC cabinet. The word diagram shows part of the last bit of the previous data block which is followed by a space that functions as a guad bit. Next comes the ready-start signal which includes eight bits of mark (actually four bits each of ready and mark as will be described), one bit of space, and one bit of mark. The ready-start is followed by the three address bits of the transmitter store and the 63 bits of data. Last comes the 18-bit error checking code word generated by the error control and ready-start circuit 208 in a manner which will be subsequently described in connection with FIGS. 15 and 16.

Each of the other wave diagrams in FIG. 13 includes a legend indicating the source of the wave with reference to FIG. 11 or 12. Considering these diagrams as a whole, a number of significant observations can be made with respect to the data transmission system of the invention. The sinusoidal timing wave received from the data processing terminal 100 is converted to blocking oscillator pulses at the same frequency, and these pulses have no synchronous relation with respect to the locally generated 750 cycle per second clock pulses. The former clock pulses control the readin operation, and the latter control the readout operation.

Data read out of a store appears at the output of readout flip-flop 2229 during the readout program interval LOT 08 to LOT 74. The readin operationis observed at the enabling input leads for readin selector gates 297 and 298 and occurs at some time during the readout time interval LOT 39 to LOT 95. This readin time interval includes an interval beginning at readout time LOT 39 at which an idle-busy signal is initiated for transmission back to the data processor. Subsequently, a start signal is received, and the readin of data may begin. If no start signal appears by readout time LOT 59, a dummy message is called for, and a data block of all ONEs is inserted in the store.

In FIG. 14 a sequence chart for a group of five stores is shown. Various significant program times are indicated on the chart for convenient cross reference to FIG. 13 and to the part of the text describing the operation. It can be observed here also that the readin operation for any one store takes place during a portion of the readout operation of the previous store. The readout timing embraces the entire readout operation for the SEC cabinet from beginning to end and covers readout times LOT 00 through LOT 94. The entire readout cycle is longer than previously indicated in connection with FIG. 13 because the over-all diagrams of FIG. 14 take into account the time required to insert the error checking code word. It can also be observed in FIGS. 13 and 14 that since readin is accomplished under the control of processor timing, which in the illustrated embodiment occurs at a substantially higher rate than locally generated timing, the interval required for readin is substantially shorter than that required for readout.

A substantial time interval follows the end of readout for any particular store and continues to the beginning of the next readin operation for that store. During this interval readin and readout operations are conducted at the other ones of the five stores in sequence, and the store which has just transmitted its data awaits the return of a report from the receiving staion to indicate whether or not the dtaa was satisfactorily received. The exact time of occurrence of the report message is uncertain since it depends upon the amount of delay in each of the various transmission routes employed for the data and the transmission routes employed for returning the report. Obviously, then, for continuous application of data to the transmitter output, the minimum number of stores required depends upon a number of factors. Among these factors are the number of bits in the data transmitted (including address, TIP word, and data block); the rates of readin and readout; the round-trip delay of the transmission path; and the length of the report message.

*Transmitter error control logic—FIG. 15*

The circuits of this figure perform a simple parity check on data received from the data store. They also generate a ready-start signal, and they provide data ONEs and advance pulses on different leads for use in the parity register of FIG. 16.

Two flip-flop circuits 2240 and 2241 are operated by various readout program times, as indicated in the drawing, for generating further program control signals used in the error control circuits. Flip-flop 2240 is reset by readout program time LOT 04 which permits a clock pulse LA 750 to pass AND gate 2242 for resetting the flip-flop. In a similar manner readout program signal LOT 75 opens gate 2243 to set flip-flop 2240. AND gates 2244 and 2245, which are enabled at readout program times 09 and 00, respectively, pass LA 750 clock pulses for resetting and setting flip-flop 2241.

The ZERO outputs of both flip-flops are positive between the readout program times LOT 09 and Lot 75, and are both applied to enable two transistor-diode gates 2247 and 2248. During that interval complementary data signals from a data store in the SEC cabinet enable one of the gates 2247 or 2248 in accordance with the mark and space bits of the data.

Ground output voltages from gate 2247 represent ZEROs in the incoming data and are applied to a parity check circuit 2249 to enable AND gate 2250 for coupling clock pulses LA 750 to the input gates 2251 and 2252 of a flip-flop circuit 2253. After the data address bits have passed through gates 2247 and 2248, readout program signal LOT 12 enables AND gate 2254 and couples clock pulse LA 750 to the set input of flip-flop 2253. Thus, at the beginning of the data portion of each block of data flip-flop 2253 is set. Thereafter, clock pulses LA 750 are coupled through gate 2250, whenever it is enabled by a ZERO in the data, for transferring flip-flop 2253 back and forth between its set and reset conditions.

If an odd number of ZEROs are counted, flip-flop 2253 will rest in its reset condition and its positive ZERO output will apply an enabling input to transistor-diode gate 2254. This gate is further enabled by the positive ZERO output of flip-flop 2240 during readout time interval LOT 04 through 75. An additional enabling signal is applied to gate 2254 from the last stage of the seven-stage ring counter in programmer 237 which is shown again in FIG. 16. Thus, at the end of every seven data bits gate 2254 is provided with enabling signals which permit it to generate a ground output signal if, at that time, flip-flop 2253 is in the reset condition, indicating that an odd number of ZEROs have been counted. This ground output signal from gate 2254 is applied to a suitable parity alarm circuit 2256. The same ground signal is also applied through comparator circuit 403 to inputs of transistor-diode gates 2257 and 2258 for inhibiting any further data output from the transmitter error control circuitry of FIG. 15. The nature of the operation of comparator circuit 403 in this inhibit operation will be further described in connection with the details of that circuit shown in FIG. 20.

A data code combination which constitutes the ready-start signal is produced as a result of a combination of data and ready output signals from the circuit of FIG. 15 which are applied to a modulator of the type shown in FIG. 19 as will subsequently be described. Suffice it to say at this stage of the description that these combined signals are utilized to enable output signals from three oscillators of different frequencies to represent different data conditions.

Each ready-start signal comprises four bit intervals of the ready frequency, four bit intervals of the mark frequency, one bit interval of space frequency, and another bit interval of mark frequency. At the end of each readout operation, readout program time signal LOT 75 sets flip-flop 2240, as previously mentioned; and this flip-flop remains in that condition until it is reset at time LOT 04 near the beginning of the succeeding readout program. Accordingly, between readout times LOT 00 and 04 an AND gate 2257 is partially enabled by the positive ONE output of flip-flop 2240. During this same interval, gate 2257 is further enabled by the positive ONE output of flip-flop 2241. The resulting ground output from the gate is applied to the modulators through the voters 301 and 302, both directly and in an inverted form which is produced by a transistor-diode gate 2258. These complementary ready signals, lasting for the duration of four bits, cause the modulators to produce the ready frequency.

At readout time LOT 01, a flip-flop circuit 2259 is reset by a ground output from a gate 2260 in a circuit 2261 which produces the start portion of the ready-start control signal. Gate 2260 is enabled by a ground output from transistor-diode gate 2262 at readout time LOT 01 because the latter gate is at that time enabled by the positive ONE output of the newly set flip-flop 2241 and by the absence of the readout program signal LOT 08. The ground ONE and positive ZERO outputs of flip-flop 2259 are coupled through output gates 2257 and 2258 and through voters 301 and 302 to modulators 401 and 402 where they are able to cause four bits of the mark frequency to be produced when the ready part of the ready-start signal ends at time LOT 04.

At readout program time LOT 08 AND gate 2263 in start signal circuits 2261 is enabled and couples a clock pulse LA 750 to open a gate 2264 that was previously enabled by the ground ZERO output of flip-flop 2241. Thus, at time LOT 08 the ground output from gate 2264 sets flip-flop 2259 to terminate the four mark bits and generate the ONE bit of space frequency.

At LOT 08 gate 2262 is disabled by the corresponding readout program signal, but it is enabled again during the beginning of time interval LOT 09. At the latter time the readout program circuits cause flip-flop 2241 to be reset, but the positive ONE output of that flip-flop persists long enough to fully enable gate 2262 and thereby enable gate 2260 for resetting flip-flop 2259 once more. This latter action produces the single bit of mark frequency and completes the ready-start signal. Immediately thereafter data signals are coupled through gates 2247 and 2248, as previously described, to operate the set and reset gates 2266 and 2267 of flip-flop 2259. These enabling signals permit clock pulses LA 750 to operate flip-flop 2259 and couple data through gates 2257 and 2258, and through the voters, to the modulators.

Each data ONE is also applied to enable an AND gate 2268 in FIG. 15 for coupling clock signals LA 750 to the triple-interleaved parity (TIP) generator, or parity register, in FIG. 16. Advance pulses to the TIP word generator of FIG. 16 are supplied from a blocking oscillator 2269 in FIG. 15. This blocking oscillator is triggered by clock pulses LA 750 applied through a gate 2270 which has been enabled by a ground output signal from a transistor-diode gate 2271. The latter gate is disabled at readout time LOT 08, but is otherwise enabled after readout time LOT 75 by the positive ONE output of flip-flop 2240 and by the positive ZERO output of flip-flop 2241. The pulses from oscillator 2269 advance the register of the TIP word generator after the data word has ended and cause that register to shift its complementary interleaved parity checking word through gates 2272 and 2273 to the set and reset inputs of flip-flop 2259 for coupling to the voters and modulators in the same fashion as the data bits had been previously coupled.

*Transmitter tip word generator—FIG. 16*

This generator examines each data word and the three-bit address preceding the word and generates an interleaved parity code word which is to be transmitted after the data word. At the heart of this generator there are eighteen flip-flop circuits; two of these are illustrated in FIG. 16 and designated flip-flops 2274 and 2276. The remaining 16 flip-flops are similarly connected and are schematically represented by a block 2275. These 18 flip-flop circuits are arranged so that they may operate as individual, single-stage, binary counters, or they may operate in cooperation with one another as a shift register. Such counters indicate whether they have counted an odd or an even number of ONEs and are, therefore, sometimes called odd-even counters.

Data ONEs from the error control logic of FIG. 15 are applied to the alternating current inputs of 18 AND gates, three of which gates, 2277, 2278 and 2279, are illustrated in FIG. 16. Each of these gates is connected at its output to a complementing input circuit of one of the flip-flop circuits in the manner that the output connections of gates 2277 and 2279 are connected to set and reset flip-flops 2274 and 2276. Each complementing input includes two AND gates such as 2280 and 2281 having their outputs connected respectively to the reset and set inputs of the corresponding flip-flop circuit. The ZERO output of each flip-flop is coupled back to the enabling input of its reset gate 2280 and the ONE output is similarly connected to the set gate 2281.

Each of the gates 2277–2279, etc., has an enabling input connection from one stage of one of the three ring counters in the readout programmer 237. Each of these ring counters is separately driven by clock pulses LA 750, and each one has only one of its output leads activated during any single bit time for enabling one of the gates 2277–2279, etc. Thus, only three of those gates are enabled during each bit, and those three couple data ones from the error control logic of FIG. 15 to the complementing inputs of their corresponding flip-flop circuits. At the end of the data word each of the flip-flops is in its set or reset condition, depending upon the mark-space structure of the data word and upon the permutations of enabling signals received from the counters of programmer 237.

After readout time LOT 75, the data word has ended. No more data ONEs are coupled to the TIP word generator, and LA 750 advance pulses are supplied to the flip-flops 2274 through 2276 for operating the flip-flops together as a shift register. In this connection it will be noted that the ZERO output of each flip-flop is coupled to the set input of the succeeding stage through an AND gate such as the gate 2282. Similarly, the ONE output is coupled to the reset input of the succeeding stage by an AND gate such as the gate 2283. These gates are opened by the aforementioned advance pulses, and in response to each pulse the set or reset condition of each flip-flop is transferred to the succeeding flip-flop circuit in the series of 18 stages. Advance pulses to the first stage flip-flop 2274 are applied through AND gates 2284 and 2286 which have their respective enabling inputs connected to ground and to a source of positive potential. These latter connections to gates 2284 and 2286 comprise a substitute for the usual data input to a shift register; and they produce the result that as the last bit of the TIP word is shifted out of each stage, that stage is forced to its reset condition. Such operation assures that the flip-flops of the register will all be in their reset conditions prior to examining the next data word.

The ONE and ZERO outputs of the eighteenth stage of the TIP register are coupled by leads 2287 and 2288 to gates 2272 and 2273 in the error control logic of FIG. 15.

*Monitor circuit—FIG. 17*

FIG. 17 illustrates a monitoring circuit which enables an attendant to observe, in a single visual display, the readin and readout conditions of every one of the five stores in a single SEC cabinet of the transmitter. For this purpose a dual beam oscilloscope 114 has its two vertical control input connections V1 and V2 coupled to separate resistor summing networks. One summing network is provided with a first input through a resistor 116 from a ONE output of the common readin flip-flop 293 of FIG. 12. The ONE output of flip-flop 293 is positive during each readin cycle in a particular SEC cabinet and, therefore, drives a current through resistor 116 and a resistor 117 to ground.

The ONE outputs of the five stages of the commutator for the SEC are connected, respectively, to the common lead 118 between resistors 116 and 117 by individual resistors 119, 120, 121, 122, and 123. Each of the resistors 119–123 is assigned a different resistance value so that the resultant signal applied to scope input terminal V1 as the commutator is stepped through its cycle of operation causes a stair-step trace to be produced on the screen of the oscilloscope. Such a trace is designated "trace IN" in FIG. 17. The ONE input lead from flip-flop 248 in FIG. 11A to reset readin selector gates 273 for each store is connected to common lead 118 through a different one of the resistors 126, 127, 128, 129, and 130. The latter resistors are assigned resistance values which are substantially equal to one another. These inputs from readin selector gates 273 modulate different steps of the stair-step trace IN in accordance with the data word which is being received for storage.

In a similar manner the ONE output from store readout flip-flop 2224 in FIG. 12, which is also positive during readout, is applied through a resistor 131 and a resistor 132 to ground with the common terminal between the two resistors connected to the other input terminal V2 of scope 114. The ONE outputs from the commutators are connected to this summing network in the same manner as they were previously connected to the summing network for scope input V1. However, in this case, the resistance magnitudes assigned to each of the commutator output circuits are shifted by one stage so that the resulting scope trace OUT is displaced with respect to the trace IN. One output from each of the individual store readout flip-flops 2229 is also coupled to the readout summing network in the same manner that resistors 126–130 couple readin signals to the readin summing network.

*Voter—FIG. 18*

FIG. 18 illustrates a voter of the type which may be used for voter circuits 301 and 302 in the transmitting station of FIG. 1 or in voters 303 and 304 in the receiving station of FIG. 2. Separate voter units of the type shown in this figure would be used for the data and ready signals applied to each of the aforementioned voter circuits.

Complementary input signals from the three equipments supplying data to each voter unit are received on input leads 310 and 311, 320 and 321, and 330 and 331. Simple diode gates are arranged as a complementary, clocked, two-out-of-three voter for detecting agreement between any two pairs of input leads. The ONE leads 310, 320 and 330 of each pair are connected to the enabling inputs of three first-level gates, 312, 322 and 332, respectively. Clock signals at the readout frequency for the station in which the particular voter unit is employed open each of the gates 312, 322, and 332 if it has been previously enabled by a ONE signal on the corresponding input lead.

The same ONE input leads of the input lead pairs are also connected to enabling inputs of second-level gates 313, 323 and 333, respectively. Each of the latter gates applies a ground signal to set a flip-flop 340 when it is opened. The opening of gates 313, 323 and 333 is accomplished by first fully enabling first-level clocked gates 322, 312 and 332, respectively.

In a like manner the ZERO leads 311, 321 and 331 are connected to first-level clocked gates 314, 324 and 334, respectively. Each of the latter gates when enabled causes similarly connected second-level gates 335, 315 and 325, respectively, to be enabled for resetting flip-flop 340.

If it is assumed, as an illustration of the operation of the two-out-of-three portion of the voter that the signals on input leads 310 and 311 disagree with the signals on the other two pairs of leads by indicating a plus on lead 310 and a ground on lead 311, the voter operation will be clear. Second-level gate 313 is inhibited by the positive voltage on lead 310, but the corresponding second-level gates 323 and 333 are enabled by the ground signals on leads 320 and 330, respectively. Similarly, the first-level gate 312 is disabled while its companion gates 322 and 333 are enabled. Since both of the gates 323 and 332 are fully enabled, a ground is applied to the set input of flip-flop 340 for setting that circuit.

The positive signals on leads 321 and 331 disable gates 324 and 325 as well as the gates 334 and 335. Consequently, no output from the voting gates is applied to the reset side of flip-flop 340, and it is thus set to reproduce at its output connections the signals which appeared on the input lead pairs 320–321 and 330–331. This output signal from flip-flop 340 is applied to the appropriate input of the corresponding modulator circuit.

In a similar fashion each of the voter circuit input leads of one polarity is connected to an input of a transistor diode gate in the one-out-of-three portion of the voter while the complements of that lead from the other two pairs of input circuits are connected to two additional enabling input connections of the same gate. A clock signal is applied in common to an enabling input of each of the one-out-of-three gates for sampling their input connection conditions during each bit. Thus, input lead 310 is connected to gate 350 along with the complementary input leads 321 and 331. In like manner, each of the remaining input leads is connected to another one of the gates 351, 352, 353, 354 and 355, along with the complementary leads from the other two pairs of input connections.

Considering the same example previously used wherein leads 310 and 311 are in disagreement with the other two pairs of input leads and include positive and ground signals, respectively, gate 350 is enabled by the positive signal from lead 310 and by the positive signals from the complementary leads 321 and 331. Gate 350 produces a ground output signal for enabling the alarm 356 to indicate that the equipment serving leads 310 and 311 is in trouble as compared to the other two corresponding equipments. In like manner, gates 352 and 352 operate alarm circuit 357 for input lead pair 320–321, and gates 354 and 355 operate alarm circuit 358 for input lead pair 330–331.

*Frequency-shift modulation—FIG. 19*

FIG. 19 shows a block and line diagram of one modulator, a simplified representation of a duplicate modulator, and additional circuits for checking the accuracy of data coupled to the input of each modulator. Modulator operation alarms are also provided for giving an alarm in the event that the output of either modulator should fail.

Complementary data and ready signals are applied to flip-flop circuits 409 and 410 through clocked gates 411, 412, 413 and 414. Gates 411–414 are opened by locally generated clock signals LA 750. Transistor-diode gates 416 and 417 couple the ZERO outputs of flip-flops 409 and 410 to oscillators 418 and 419. In addition, the ZERO output of flip-flop 410 is applied directly to actuate a third oscillator 420. Each oscillator is arranged so that its output is blocked in the absence of a ground input signal. The output signal from any of the three oscillators 418–420, when activated, is applied to a blocking oscillator 421. A binary counter 422 counts down the frequency in the output of oscillator 421 by a factor of 32, and output oscillations from counter 422 are amplified by means of an amplifier 423 and thereafter coupled to the output data line through a bandpass filter 424 and a matching transformer 425.

Oscillators 418–420 have, in one embodiment, the frequencies of 66.4 kilocycles, 42.4 kilocycles and 54.4 kilocycles. These frequencies correspond to the space, mark, and ready signals of the frequency shift data signal after they have been divided down in counter 422. As previously discussed in connection with the transmitter error control logic of FIG. 15, the data word is preceded by a ready-start signal comprising four bits of ready, four bits of mark, one bit of space, and one bit of mark.

The initial signals from the error control logic set ready flip-flop 410 and reset data flip-flop 409. The ground ZERO output of ready flip-flop 410 is applied directly to oscillator 420 to produce 54.4 kilocycle signals for transmission as the ready signal. This same ground ZERO output of flip-flop 410 also disables gates 416 and 417.

During the ready signal, flip-flop 409 is set by a change in its data input as described in connection with FIG. 15. The ready signal resets flip-flop 410 at the end of the first four bits, thereby disabling oscillator 420 and partially enabling gates 416 and 417. The latter gate, which is now fully enabled by the positive ONE output of flip-flop 409, activates oscillator 419 to transmit the frequency 42.4 kilocycles to blocking oscillator 421 during the four bits of mark frequency.

The next two bits on the data input lead after the four mark bits reset and then set data flip-flop 409 for enabling gates 416 and 417 in that order to actuate oscillators 418 and 419, respectively, for transmitting the single bit of space frequency followed by a single bit of mark frequency. The data signal follows immediately after the final mark bit of the ready-start signal and operates data flip-flop 409 for actuating oscillators 418 and 419 to represent data spaces and marks, respectively.

Also illustrated in FIG. 19 is a duplicate modulator which may represent transmitting station modulator 402, while the previously described modulator may represent the transmitting station modulator 401. Ready signals which would reset flip-flop 410 in each of the two modulators are applied to a ready comparator circuit 426 to open AND gates 427 and 428. Similarly, ready signals which would set flip-flops 410 in the two modulators are applied to AND gates 429 and 430, respectively. The latter two gates are opened by ground outputs from gates 428 and 427, respectively, at the time of local clock signals LA 750 which enable a gate 431 to trigger a blocking oscillator 432. The output of blocking oscillator 432 is applied to the pulse input connections of gates 427 and 428.

If a ready signal disagreement occurs while the ZERO lead of modulator 401 is at ground, output pulses from blocking oscillator 432 may be applied through gates 427 and 430 to activate a data alarm circuit 433. Alternatively, if the disagreement occurs while the ready ONE lead of modulator 401 is at ground, these pulses may also be applied through gates 428 and 429.

This combination of gates 427–430 for the bit-by-bit comparison of two data signals is the same comparator arrangement which is utilized throughout the data transmission system of the invention. In some applications data alarm 433 may comprise a monostable circuit for actuating a visible or audible alarm, whereas in other applications data alarm 433 may comprise a flip-flop circuit or other control logic for causing additional circuit operations to take place in response to detected disagreement in the data compared.

Modulator operation alarms 434 are provided to give an indication in the even that there should be a failure of frequency-shift output signals from modulators 401 and 402. Each alarm receives frequency-shift data signals from its corresponding modulator output to open a permanently-enabled AND gate 436 for triggering a blocking oscillator 437 to open a further permanently-enabled AND gate 438 which sets a flip-flop circuit 439. The positive ONE output of flip-flop 439 inhibits an AND gate 440 at the reset input of a further flip-flop circuit 441. Each clock pulse LA 750 opens a permanently-enabled AND gate 442 for resetting flip-flop 439. The same clock pulse attempts to open gate 440 but does not persist for a sufficiently long interval to permit that gate to be enabled when flip-flop 439 has completed its resetting operation. Immediately following each clock pulse the next cycle of frequency-shift data signals causes flip-flop 439 to be set once more. Thus, as long as frequency-shift signals persist, the clock pulses are unable to reset flip-flop 441. If modulator output fails flip-flop 439 is not set after each clock pulse, but it remains reset after the last preceding clock pulse. The next succeeding clock pulse then opens gate 440 and resets flip-flop 441 to actuate alarm circuit 443. The alarm given by circuit 443 continues until flip-flop 441 is reset by a manually generated reset signal applied through gate 444.

As indicated in FIG. 19, the ready comparator circuit 426 and the modulator operation alarms 434 comprise a part of the comparator circuit 403 shown in the transmitter station of FIG. 1. Comparator 403, however, also employs a data bit comparator illustrated in FIG. 20.

*Transmitter-data comparator and tip inhibit—FIG. 20*

This circuit is part of comparator 403. Complementary data signals from the input circuits of modulators 401 and 402 are, in FIG. 20, applied to respective ONE and ZERO input connections for a bit-by-bit comparator 426′ which is similar to the ready comparator 426 discussed in connection with FIG. 19. The alarm portion of this circuit, however, includes a flip-flop circuit 446 which is set in the event of a disagreement detected in the received data signals. The ground ZERO output of flip-flop 446 is utilized to activate an alarm 447. This much of the data bit comparing circuit in comparator 403 is also normally included in comparator 408.

Comparator 403 further includes TIP inhibit circuits. For the inhibit circuits, the positive ONE output of flip-flop 446 partially enables two transistor-diode gates 448 and 449. When one of the gates 448 and 449 is fully enabled, as will be described, it provides a ground output voltage which is applied to the transmitter error control logic of FIG. 15 to disable gates 2257 and 2258, thereby stopping readout of the TIP word from those circuits. The reason for this inhibit is that if the data is in disagreement at the modulators, the TIP words will also disagree and initiate an alarm at the receiver as will be described.

When TIP word readout begins, ground signals from the output connection of transistor-diode gate 2271 in the FIG. 15 transmitter error control logic of each of the working SEC cabinets 201 and 203 are received in the data comparator of FIG. 20. These grounds enable two AND gates 450 and 451 for setting a pair of flip-flop circuits 452 and 453. A positive ONE output from each of these flip-flops is applied to an enabling input of the gates 449 and 448, respectively, for indicating that TIP word readout has started.

If a simple parity failure is detected in the error control logic of FIG. 15, a ground output signal from transistor-diode gate 2254 in each of the working SEC cabinets 201 and 203 is applied to an enabling input of one of the AND gates 454 and 456. These AND gates couple the next clock pulse LB 750 to the set inputs of two flip-flop circuits 457 and 458 for indicating the parity failure to the data comparator circuit. The ONE and ZERO output connections of these two flip-flop circuits are coupled to enabling inputs of transistor-diode gates 459 and 460 so that the ONE output of each flip-flop is connected to enable a gate which is further enabled by the ZERO output of the other flip-flop. In the absence of a parity failure both flip-flops are normally resting in their reset conditions and both of the gates 459 and 460 are disabled. Output connections from these gates are applied to inputs of gates 448 and 449, respectively, so that in the absence of a detected simple parity failure gates 448 and 449 are disabled because gates 459 and 460 are enabled.

Upon the occurrence of a simple parity failure one of the gates 59 and 460 is disabled, and its output partially enables one of the gates 448 or 449. However, a simple parity failure is not sufficient to halt TIP word readout. Such failure must also be accompanied by a detected difference in the bits of data applied to the modulator inputs so that flip-flop 446 may be set and completely enable one of the gates 448 and 449 to produce the TIP word inhibit signal as previously described. TIP readout continues to be inhibited until an attendant applies a manual reset signal for each of the lines A and B on leads 461 and 462 to reset flip-flops 452 and 453 and flip-flops 457 and 458.

*Demodulator—FIG. 21*

Considering now the receiving station circuits, the demodulator 103 will be discussed in outline only since the details of a frequency shift demodulator that has been used successfully in the transmission system are shown in the copending patent application Serial No. 141,250, filed September 25, 1961, in the name of R. O. Soffel and entitled "Digital Demodulator." That application is assigned to the same assignee as the present application.

A functional block and line diagram of the demodulator in simplified form is shown in FIG. 21. This type of demodulator has been found to be advantageous because it produces pulse data signals which are relatively phase stable as compared to a time base signal. Furthermore, no direct current amplification is required, and the demodulator can operate accurately in the presence of a high level of noise.

Frequency shift data signals from the transmission line are applied to a C-pulse generator 133 which produces output impulses in response to the zero axis crossings of alternating current frequency shift signals applied thereto. These C pulses are, of course, spaced by time intervals which are a direct function of the frequency of each frequency shift signal applied to the impulse generator, as is well known in the art. Such pulses are coupled to a programmer counter 134 which may, for example, be a binary counter. Counter 134 is driven by higher frequency ($f_1$) pulses from a local clock 136 and each C-pulse resets the counter.

A rate computing reversible binary counter 137 and an integrating reversible binary counter, called the data counter 138, cooperate in the demodulator to perform as a digital equivalent of an analog low-pass filter. Rate counter 137 always begins its operation from a counting level shifted into its stages by setting gates 139 from data counter 138 in accordance with a program signal from counter 134. Direction control logic 140 causes counter 137 to count initially in the reverse direction during each cycle of its operation. When counter 137 reaches a count of zero it is automatically reversed and begins counting in the forward direction. A program signal from counter 134 causes rate counter 137 to begin operation during the latter portion of each C-pulse interval and to count local clock pulses at the same frequency $f_1$ as those counted by programmer 134. Operation of counter 137 is terminated by the C-pulse at the end of the C-pulse interval, and a signal from programmer counter 134 opens setting gates 141 to transfer the count information in rate counter 137 into a rate store 142 and to transfer the signals indicating the direction in which counter 137 is operating from control logic 140 into counting direction store 143.

The output signal from rate store 142 activates frequency-selecting logic circuits 144 for coupling to the counting input of data counter 138 one of the local clock frequencies $f_1$, $f_2$ or $f_3$, depending upon how far the final count in rate counter 137 was from its reversing count level of zero at the time counting was halted by a C pulse. Store 143 actuates direction control logic 145 for driving counter 138 in the same direction in which rate counter 137 was operating just prior to the time that its operation was halted by the C pulse.

The effect of the previously described cooperative functioning of rate counter 137 and data counter 138 is that the rate counter compares successive interval durations with one another. Counter 137 then tells data counter 138 to count up or down at a rate which is a function of the magnitude of the difference between its last interval duration count and the new one measured by rate counter 137. Consequently, the final count indication in counter 138 is at all times an extremely close approximation of the actual frequency being received from the transmission line by the demodulator. The output of data counter 138 is applied to a start and data sampling circuit 146 wherein the data counter output is sampled in accordance with the dictates of a locally phase-synchronized clock signal for producing a clocked pulse data output wave.

C pulses from C-pulse generator 133 are also applied to a ready-start detecting circuit 147 along with a signal from the programmer counter which provides a rough indication to detector 147 as to whether a particular incoming data signal happens to be at the ready frequency or at the mark frequency. Detector 147 then goes into operation to examine the incoming signal and determine whether or not the required ready-start code combination is present. If the proper combination is detected a signal is applied to a data and timing synchronizer circuit 148 and to sampler 146 to prepare those circuits for the reception of the ONE-bit space signal which follows the ready-mark portion of the ready-start code combination.

Data and timing synchronizer 148 also receives data signals from the output of data counter 138 and employs the start pulses so received for adjusting the phase of a local clock frequency generator to be in synchronism with the data start pulses. These synchronized timing signals which result from the synchronizer operation are employed in the readin portions of the receiving station equipment and are typically produced in two phases designated phase A and phase B. These clock signals are designated DA*s* 750 and DB*s* 750, wherein the designation D indicates timing derived from the demodulator, the A or B indicates the phase of the timing signal, and *s* indicates that the timing is locally synchronized with the demodulated data. This timing is applied directly to start and data sampler 146 for sampling the data output of counter 138 to produce synchronized data signals for further operations in the receiving station.

Figure 22B:
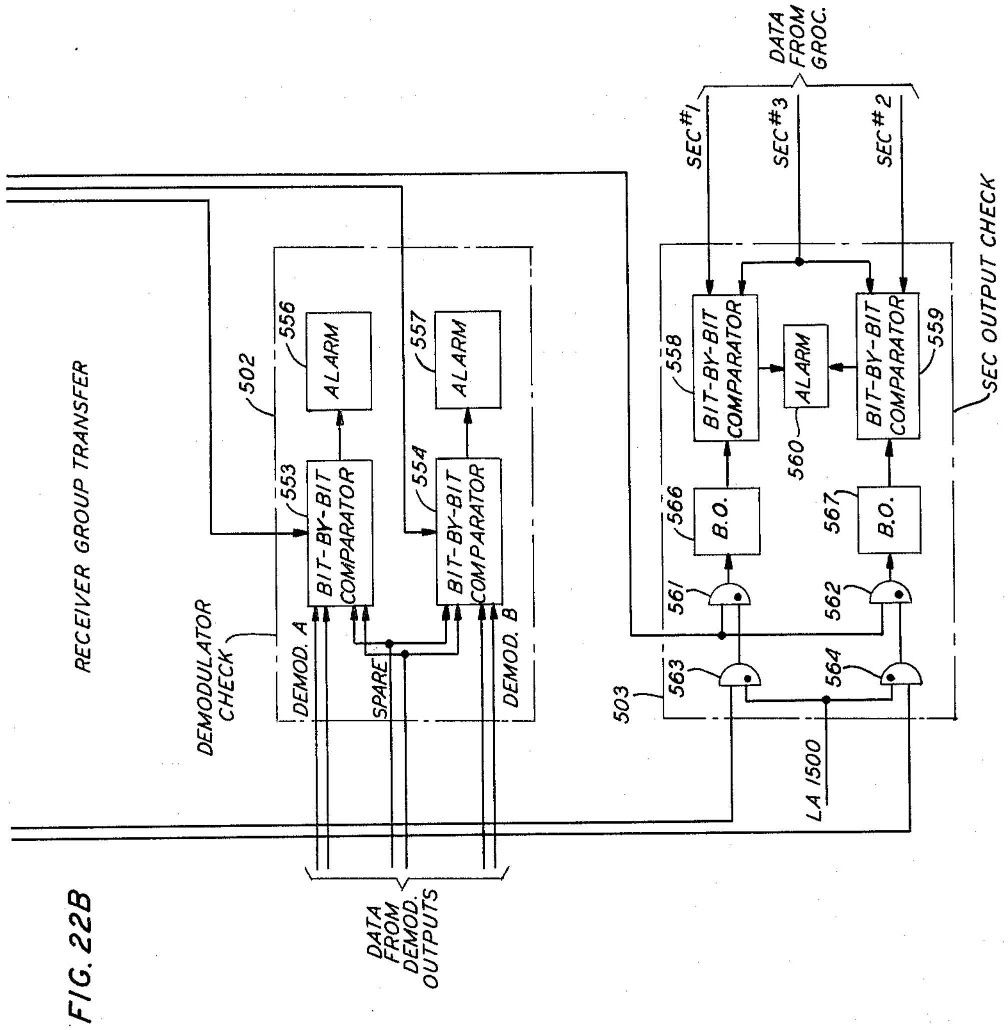

*Receiver group transfer circuits—FIGS. 22A and 22B*

Receiver group transfer circuits are provided, as has been previously described in detail, for transferring a spare demodulator and SEC cabinet back and forth for parallel operation with one or the other of the working demodulators and working receiver SEC cabinets. These transfer circuits receive their control signals primarily from the spare equipment since it is necessary upon each transfer to bring the spare equipment into synchronism with the working equipment which it is about to check. In the drawing, FIG. 22A represents the line transfer circuits 501 shown in FIG. 2, while the checking circuits 502 and 503 are shown in FIG. 22B.

In FIG. 22A, a start pulse counting circuit 504 is arranged in a unique manner to delay the actual connection of spare equipment to one of the working lines for an interval of at least four data blocks. This delay is needed because the readin programmer will not immediately align itself with line start-signal from the new working line as will be described in connection with FIG. 24.

Four flip-flop circuits 506–509 in the start counting circuit 504 are interlocked by various logic gates to count four start pulses and thereafter enable the application of clock signals DB*s* 750 to one or the other of two blocking oscillators 510 and 511 through AND gates 512 and 513, respectively. At the outset of any particular operating sequence, flip-flop 507 is set while the flip-flops 506, 508, and 509 are reset. In this condition the ground ZERO output of flip-flop 507 enables the set input gate 514 of flip-flop 506. Similarly, the ground ONE output of flip-flop 506 enables the set input gate 516 of flip-flop 507.

A first start pulse enables gate 517 to pass a clock pulse DB*s* 750 for opening gate 514 and setting flip-flop 506. Now the ground ZERO output of flip-flop 506 enables a gate 518 which couples DB*s* 750 clock pulses to the reset gate 519 of flip-flop 507.

The second start pulse enables gate 519 to pass a clock pulse from gate 518 and reset flip-flop 507. Now the ONE output of flip-flop 507 enables the reset gate 520 of flip-flop 506 and the latter flip-flop is reset upon the occurrence of the third start pulse.

The third start pulse also enables a set gate 521 for flip-flop 508, and the negative-going transition voltage at the ONE output of flip-flop 506 during the reset operation opens gate 521 to set flip-flop 508.

Ground ZERO output of flip-flop 508 now enables a set gate 522 for flip-flop 509 to pass clock pulse DB*s* 750 from gate 523 to set flip-flop 509 upon the appearance of the fourth start pulse. The setting of flip-flop 509 enables gates 512 and 513 to couple DB*s* 750 clock pulses from one of the gates 524 or 526 to drive one of the blocking oscillators 510 or 511, depending upon which of the gates 524 or 526 is enabled by the output connections from a selection flip-flop 527.

A message counter 528 cooperates with a flip-flop circuit 529 for measuring the time, in terms of data words, that spare receiving equipment works in cooperation with any one set of working receiving equipment. At the end of approximately twelve words of operation message counter 528 operates flip-flop 527 to signal a transfer of the spare equipment from one working line to the other. In order to accomplish this function, flip-flop 529 receives a ground at its reset input through one of the AND gates 530 or 531 from the spare SEC cabinet commutator each time that commutator has completed a cycle of enabling all of the receiver stores once to read in data. Similar ground signals are received from the commutators of the working SEC cabinets through AND gates 532 and 533 at the set input of flip-flop 529. The spare commutator ground is applied directly to enable AND gate 537 to couple clock pulses DB*s* 750 for opening the set gate 538 of flip-flop 536. Gate 538 had been previously enabled by the ground ONE output of the flip-flop 536. A three-stage binary counter 539 is now advanced one count by the ground ZERO output of flip-flop 536. When four such counts have been made flip-flop 527 changes state to select a new working line.

Flip-flop 529 is then reset by the ground from the spare commutator through whichever one of the gates 530 or 531 is opened by the working line selection signal from flip-flop 527. This ground signal resets flip-flop 529 and applies its positive ZERO output to inhibit the spare commutator advance and to block AND gate 534 in the reset input of a flip-flop 536 in message counter 528.

After the four count delay to allow readin programmer alignment as previously described, blocking oscillator output pulses from one of the oscillators 510 or 511 which has been selected by selector flip-flop 527 are applied to enable the one of gates 532 or 533 which receives commutator ground signals from the working equipment on the selected line with which the spare equipment is to operate. When a ground is received from the selected working equipment commutator, it enables one of the gates 532 or 533 to transmit the blocking oscillator pulses for setting flip-flop 529. A ground ZERO output from flip-flop 529 enables gate 534 in message counter 528 and also removes the inhibit signal from the spare equipment commutator. In other words, the setting of flip-flop 529 indicates that the spare commutator and the commutator of the selected working equipment are now in step, and the counting of start pulses to measure the time interval during which these two equipments should work together may begin.

Start pulses are utilized to enable a gate 540 which passes clock signal DB*s* 750 through gate 534 to reset flip-flop 536. The next time that the spare commutator has operated through its full cycle of enabling three receiver SEC cabinet stores, a ground signal is applied to gate 537 once more and causes flip-flop 536 to be set, thereby advancing counter 539 another count. This particular spare commutator ground signal does not affect flip-flop 529 because it is applied to the enabling inputs of gates 530 and 531. Since these gates receive their opening signals from flip-flop 527 through the pulse input connections of the gates, the gates are not enabled because there is no change in the alternating current input signal which can be coupled through the gate.

This operation continues until flip-flop circuit 536 has counted four spare commutator ground pulses, thereby indicating that approximately twelve messages have been received and processed since the spare commutator provides such a ground pulse after each three data blocks. Counter 539 recognizes that twelve messages, or blocks, have been counted and directs flip-flop circuit 527 to change state by enabling one of the input gates 541 or 542 to couple a DB*s* 750 clock pulse to the flip-flop. Counter 539 completes a cycle of checking two working receivers in eight counts, or 24 checked messages.

The same signal from binary counter 539 is coupled through circuits such as an OR logic gate 543 of any of the well known types to open the permanently enabled reset gate 544 of flip-flop 508 and reset that flip-flop. The ground ONE output of flip-flop 508 opens a permanently enabled gate 545 for resetting flip-flop 509 which thereafter inhibits gates 512 and 513 to prevent blocking oscillators 510 and 511 from further operation. The ground ONE output of flip-flop 508 is also applied to enable a gate 546 for coupling DB*s* 750 clock pulses to open the set gate 516 of flip-flop 507. The latter gate was previously enabled by the ground ONE output of flip-flop 506. The setting of flip-flop 507 causes a ground ZERO output to be coupled therefrom back to the enabling input of gate 514 at the set input of flip-flop 506. All flip-flops of start-counting circuit 504 are now in condition to operate once again for counting off four start pulses to delay spare equipment operation for the prescribed interval following the transfer of that spare equipment from one working line to the other as just directed by the change in state of flip-flop 527. At the end of each readin operation a readin programmer, to be described, generates a signal DIN 84 to reset flip-flop 509. However, as long as flip-flop 508 remains set, each succeeding start pulse sets flip-flop 509 once more.

The ground ZERO output of flip-flop 529 during each message counting cycle also enables AND gate 547 to couple ground ZERO output signals from flip-flop 536 to open AND gate 548 in the set input circuit of a flip-flop circuit 549. Gate 548 was previously enabled by the ground ONE output of the flip-flop so that flip-flop 549 is now caused to set by the first count pulse applied from flip-flop 536 to counter 539. The ground ZERO output of flip-flop 549 is applied, along with the working like selection signals derived from the output of flip-flop 527, through blocking oscillators 510 and 511 and their associated gates, to checking circuits 502 and 503 in FIG. 22B. The ground ONE output of flip-flop 508 in counting circuit 504, which was utilized to carry out resetting operations in circuit 504, is also employed to open a permanently enabled gate 550 to reset flip-flop 549 at the end of each message counting interval measured by counter 528.

Selection signals from flip-flop 527 are further coupled to a line transfer switching circuit 551 which performs the actual switching operation whereby data signals from one working line or the other are coupled to the input circuit of the spare demodulator 106. This switching operation is carried out by a transmission gate 552. Many such gates are known in the art but a particularly convenient gate for performing the circuit-switching operation, and which was utilized successfully in the data transmission system of the invention, is shown and described in detail in the copending patent application Serial No. 139,580, filed September 19, 1961, in the name of O. F. Gerkensmeier and entitled "Channel Selecting Circuit," which is assigned to the same assignee as the present application. Accordingly, the disclosures of that application are hereby incorporated in the present application by reference.

In FIG. 22B, the demodulator check circuit 502 receives selection signals from the selected one of blocking oscillators 510 and 511 in FIG. 22A for enabling the operation of one of the bit-by-bit comparators 553 or 554. Each of these comparators is of the same type as comparator 426 shown in FIG. 19 and has its alarm circuit externally shown as the alarms 556 and 557, respectively. Data signals from demodulator 103 are applied to comparator 553 where they are checked against data signals from spare demodulator 106 when enabling or clock signals are applied to comparator 553 from blocking oscillator 510. In like fashion data signals from demodulator 104 are compared with signals from spare demodulator 106 in comparator 554 when selected clocking signals are applied to the comparator from blocking oscillator 511 in FIG. 22A.

Also shown in FIG. 22B is the SEC output checking circuit 503 which receives pulse data signals from the three receiver SEC cabinets during the readout cycle. Since readout from all three SECs is accomplished simultaneously, two bit-by-bit comparators 558 and 559 which are once again of the same type as comparator 426 in FIG. 19 are utilized for comparing data from spare SEC 602 with data from either SEC cabinet 601 or SEC cabinet 603. Alarms for the two comparators are represented by the box 560. An enabling signal is supplied to check circuit 503 from the ZERO output of flip-flop 549 in FIG. 22A to enable AND gates 561 and 562. One of the gates 561 or 562 is opened by a ground output from one of the gates 563 or 564, respectively. When one of the latter gates is enabled by a selection signal derived from the output of flip-flop 527 in FIG. 22A, it couples clock pulses LA 1500 to open gates 561 or 562 for triggering one of the blocking oscillators 566 or 567. The oscillators provide clock signals to the comparators 558 and 559. It will be noted that the clock signal applied to checking circuit 503 is at the 1500 cycle per second frequency derived from local clock 108 since the SEC output checking circuit is receiving data that is being read out of receiver SEC store circuits under the control of readout program and timing which are both locally controlled.

*Receiver storage and error control—Overall—FIG. 23*

Each receiver storage and error control cabinet of FIG. 2 includes the functional blocks indicated in FIG. 23 and is roughly similar to the storage and error control block of the transmitting station in that it includes certain common input controls 604 which receive on three separate circuits data, start, and timing signals. The principal components of common input controls 604 are an error control circuit, an input equipment parity check circuit, a programmer A counter system and control logic therefor, and a commutator. These common input controls guide the storage of received data in the individual data stores 606. Each of the individual stores 606 includes as an operational portion thereof certain individual store control circuits and also some store status circuits for indicating the condition of the message which is contained in the store.

Receiver storage and error control cabinets also include some common output controls 607 since it is necessary to coordinate the readout activities of the three different receiver SEC cabinets. These common output controls include an output equipment parity check circuit, a readout programmer and control therefor, and a group readout control (GROC). Each set of common output controls also includes three types of output circuits which interconnect the receiver SEC cabinet with the terminal readout control circuit 700. These three types of circuits include data and start circuits, group selection circuits, and store selection circuits. The functional relationships among all of these circuits will be brought out in connection with detailed discussions of the operations of individual blocks included in the store and the various control circuits.

*Receiver SEC—Program A (readin) counters and control—FIG. 24*

The principal purpose of the receiver readin program control is to provide program interval time signals; but a secondary purpose, although no less important, is to provide means for synchronizing the start pulses generated by the program logic with the start pulses which are received from the demodulator circuits. The program counters and their associated program signal-deriving logic are schematically represented in FIG. 24 by a block 607. This block includes counters such as the combination of three separately driven ring counters hereinbefore described in connection with the readout program generating counters and logic 237 of the transmitting station. Block 607 also includes the associated logic necessary for deriving readin program time signals which are provided on leads designated "DIN ——." The "D" designates timing which is derived from incoming data which is synchronized with a clock signal in the receiving station demodulator. The letters "IN" designate readin control timing, and the numerals following the letters DIN indicate the number of the time interval following the beginning of the readin program.

The remaining major function of the readin program control of FIG. 24 is the mentioned one of synchronizing start signals from the programmer 607 with start signals received from the demodulator. This function is carried out by the remaining logic circuits shown in FIG. 24 which are also shown and described, in somewhat greater detail than is presented here, in a copending application Serial No. 141,247, filed September 25, 1961, in the name of C. W. Farrow and entitled "Synchronizing System for Pulse Sources." The latter application is assigned to the same assignee as the present invention. Circuits such as those illustrated in FIG. 24 are particularly useful at times when the transmission system may be subject to a high level of noise. These circuits make it possible for the start pulses to be reliably distinguished from noise impulses. The principle of operation of the start pulse synchronizing logic is to recognize that when alternate start pulses are received from programmer 607 and from the demodulator it is a strong indication that the programmer 607 and the demodulator output are not in step and that corrective action should be initiated. Circuits of FIG. 24 recognize such a pattern of alternate start pulses and initiate a reset operation for the programmer counters 607. They also recognize deviations from the pattern and initiate a reset operation for the pattern detecting arrangement.

Gate 608 receives input signals from the ONE lead of the circuit bringing complementary start signals from the demodulator. This gate also receives signals on the ZERO lead of the circuit bringing complementary start signals at time DIN 00 from programmer 607. In like manner a transistor-diode gate 609 receives its enabling signals from the ONE lead for the program start pulses and the ZERO lead for the demodulator start pulses. Thus, if start signals from the two sources are occurring simultaneously, both of the gates 608 and 609 are disabled. However, if these start pulses should occur at different times gates 608 and 609 are enabled in alternation and apply ground driving signals to the enabling input of a diode gate 610 which can couple DB*s* 750 timing pulses to the complementing input connection of a three-stage binary counter including the flip-flop circuits 611, 612, and 613. The counter flip-flops are arranged to be restored to the all-ONEs, or all-set, condition by ground signals applied to their respective set input circuits from AND gates 614, 615, and 616. The ONE output of each stage is coupled to the complementing input circuit of the following stage. In addition, the ONE and ZERO output circuits of flip-flop 611 are coupled back to inputs on transistor-diode gates 608 and 609.

If it is assumed that a start pulse is received from the demodulator at a time when there is no start pulse present from the programmer 607, and the three counter stages 611–613 are all set to the ONE condition, gate 608 is opened and enables gate 610 to couple a clock pulse DB*s* 750 to the complementing input of flip-flop 611. This action causes that flip-flop to reset and apply an inhibiting ground signal to gate 608, while its positive ZERO output is coupled back to enable gate 609. Counter flip-flops 612 and 613 also reset at the same time. The counter can now be advanced by the occurrence of a start pulse from only programmer 607 in the absence of a start pulse from the demodulator. When such a programmer start pulse occurs, it enables fully the gate 609 for further causing flip-flop circuit 611 to be transferred to its set condition. Now gate 608 is enabled and gate 609 is disabled by the outputs from flip-flop 611.

A transistor-diode gate 617 has input leads connected to the ONE output connection of flip-flops 611 and 613, and to the ZERO output of flip-flop 612. This gate is also provided with an enabling input lead from the ONE side of the demodulator start circuit. Thus, with the counter stages 611–613 in the binary five condition just recited, with stage 611 and stage 613 set while stage 612 is reset, the next demodulator start pulse to appear opens gate 617 before the flip-flops can change state.

When gate 617 is open its ground output disables a further transistor-diode gate 618 which in turn disables AND gate 619 in the set input circuit of a flip-flop 620. The same ground output signal from gate 617 also enables AND gate 621, which may now be opened by the next advance pulse from blocking oscillator 630. Gate 621 then produces a ground pulse that resets flip-flop 620. The ground ONE output of flip-flop 620 is coupled back to enable AND gate 622 which passes a DB*s* 750 clock pulse to trigger blocking oscillator 623. Gate 619 is blocked as previously described, but the output of oscillator 623 is coupled directly to the reset input of programmer 607. Programmer 607 is arranged to be reset to the program DIN 02 condition since the start time has now passed.

The ONE and ZERO leads of programmer output DIN 00 now display ground and positive potentials, respectively. Gate 627 is enabled and gate 628 is disabled. After gate 617 has been disabled, upon the termination of the demodulator start pulse that opened gate 617, the next pulse from oscillator 623 passes through gates 619 and 627 to set flip-flop 620. The ONE and ZERO outputs of this flip-flop now disable gate 622 and enable gate 629. DB*s* 750 clock pulses open gate 629 for driving blocking oscillator 630 to advance programmer 607.

If programmer 607 is now in step with start signals from the demodulator its starts will occur simultaneously with demodulator starts. Gates 624 and 626 are connected to recognize this condition. These gates also recognize the occurrence of two successive starts from one source with no intervening start from the other, a condition which suggests that one of the two pulses was a noise impulse. In either event, the gates 624 and 626 restore the flip-flops 611–613 to their set conditions to start a new checking cycle.

Gate 624 has one input connected to the ONE lead of the programmer start pulse circuit. Another input for gate 624 comes from the ONE output of flip-flop 611, which output is positive when a demodulator start pulse is to be next received. If gate 624 is enabled it must have recognized two programmer starts in a row. Gate 626 is similarly connected to recognize two successive demodulator starts. When either gate is enabled, its ground output enables reset gates 614–616 for restoring flip-flops 611–613 to their set condition when the next DB*s* 750 clock pulse occurs.

The restoration of flip-flops 611–613 to their set conditions further disables gate 617 and consequently enables gate 619 once more as already described. The readin program control circuits of FIG. 24 now remain in this condition until the transistor-diode gate 617 is once more enabled, indicating that the start pulses from programmer 607 and from the demodulator have slipped out of step.

*Receiver SEC—Error control—Tip circuits and input equipment parity check—FIG. 25*

Complementary data signals from the demodulator are applied to a TIP word generator 630 wherein a triple-interleaved parity word is generated in the same fashion as was previously described in connection with the transmitter error control circuits and parity register circuits of FIGS. 15 and 16. Data ONEs applied to circuit 630 gate output signals from the ring counters of the programmer 607 in FIG. 24 into the stages of a shift register. At the end of the data word the parity information stored in the shift register is shifted out to one of the data inputs of a data bit comparator 631 which also receives the complementary data signals from the demodulator. Comparator 631 performs a bit-by-bit comparison of the received TIP word from the demodulator against the locally generated TIP word produced by circuit 630 and provides a positive voltage on an output lead 632 if there is a lack of perfect correspondence. A positive voltage appears on output lead 633 if there is perfect correspondence, i.e., good TIP. These signals from leads 632 and 633 are applied to the store status circuits of the individual store which is receiving the data word that has been examined. A transistor-diode gate 634 may be enabled by the good TIP positive voltage from lead 633 or disabled if a ground appears on that lead indicating TIP failure.

Error control logic in FIG. 25 also performs a simple parity check to determine whether or not each seven-bit group of the data word proper, exclusive of address and TIP word, is characterized by odd one parity. A flip-flop circuit 636 is alternately set and reset by DA*s* 750 timing pulses gated to its respective set and reset inputs by readin program signals DIN 03 and DIN 67. The one output of flip-flop 636 is coupled to an input of a transistor-diode gate 639 and enables this gate from readin program time DIN 03 to time DIN 67 while flip-flop 636 is in its set condition. Gate 639 is thus fully enabled or disabled by data ONEs coupled to its other input connection from the demodulator circuit after the address has been received and before the TIP word begins. Each data ONE causes gate 639 to generate a ground signal which enables AND gate 640 for coupling DB*s* 750 timing pulses to the complementing input of a flip-flop circuirt 641. Flip-flop 641 is automatically reset at the end of each group of seven bits in the 63-bit data block by a ground signal from the output of AND gate 642 which is enabled by the last stage output of programmer ring-seven counter to pass DA*s* 750 clock pulses to flip-flop 641.

An AND gate of the transistor-diode variety designated 643, receives an input from the ZERO output connection of flip-flop 641. Another input connection to gate 643 provides a signal which tends to enable the gate at all times except during program interval DIN 03. A third input for the gate comes from the positive ONE output of flip-flop 636 during the data portion of each word. Thus if an even number of data ONE's occur during any seven-bit group flip-flop 641 will be found in its reset condition, and gate 643 is enabled to apply a ground enabling signal to a set input gate 644 of a flip-flop 646. Gate 644 may be opened by a ground signal from a gate 647 which is, in turn, opened by a DA*s* 750 clock pulse if the gate is enabled by an output from the seven-stage ring counter of the readin programmer 607 shown in FIG. 24. When gate 644 is enabled flip-flop 646 is set, and its ground ZERO output activates an input equipment parity failure alarm 648. The positive ONE output from flip-flop 646 is applied to enable transistor-idode gate 634.

At readout time LOT 00, which is derived as will be described in connection with FIG. 28, flip-flop 646 is reset. If the TIP parity check is good but the simple parity check is bad, gate 634 is enabled and provides a ground signal output to the store status circuits of the individual store which is receiving the data word that was checked. If the simple parity check is satisfactory, gate 634 is disabled regardless of the outcome of the TIP check.

Also shown in FIG. 25 is a circuit for detecting a dummy, or all-mark, message since such a message is introduced by the transmitter itself and should be prevented from reaching the receiving processor terminal 109. A transistor-diode gate 625, which is disabled by inverted data signals in the form of positive ZEROs and by the positive ONE output of flip-flop 636, enables the set gate of a flip-flop 635. DB*s* 750 clock pulses set the latter flip-flop, and its positive ONE output closes AND gate 645. In this condition, a flip-flop 655 cannot be set and cannot provide a ground ZERO output to the store status for indicating an all-mark message.

At the beginning of each message, program signal DIN 03 and timing DA*s* 750 reset flip-flops 635 and 655 thereby enabling gate 645. If a data ZERO is thereafter received, it causes flip-flop 635 to be set and flip-flop 655 to be held in the reset condition as described. If no ZEROs appear, an all-mark message is indicated; and the set gate of flip-flop 655 is enabled at readin time DIN 67. The flip-flop 655 is set by the next DB*s* 750 clock pulse from gate 645 and the flip-flop ground ZERO output signals the status circuit that an all-mark message is present.

*Receiver SEC—Commutator—FIG. 26*

The receiver commutator is a three-stage ring counter which includes flip-flop circuits 649, 650, and 651. Drive for the commutator is applied in the form of DA*s* 750 clock pulses through a gate 652 during program interval DIN 94 to trigger a blocking oscillator 653. The output of oscillator 653 is applied to the shift input connections of the register. Thus, at the end of each data block the register is advanced one step.

Each ZERO output of the flip-flops 649–651 is coupled to store control circuits for each of the stores 606 to enable readin operations. Program signal DIN 94 also disables a transistor-diode gate 654 which applies a positive enabling signal at that time to each of the transistor-diode gates 656, 657, and 658. Gates 656–658 are also provided with enabling input connections from the ONE output circuits of flip-flops 649 through 651. Complementary output signals from gates 656 through 658 are applied to store status circuits for each of the stores 606 to enable those status circuits to accept status indications in a manner which will subsequently be described.

*Receiver SEC—Individual data store, store control, and store status—FIGS. 27A and B*

The overall purpose of the circuits in FIGS. 27A and B is to hold data for a time to equalize route delay when diversity transmission techniques are employed. In addition, these circuits receive reports on the various message checks performed in other parts of the receiver. Such checks include the TIP word comparison, the address check, the all-mark check and the simple parity checks on both input and output equipment. The results of these checks are also evaluated and converted to a form which is usable for comparing versions of the message as received over different routes.

In FIG. 27A the data store for one of the three stores in a receiver SEC cabinet is illustrated as the store 6616 which comprises three flip-flop stages 6617–6619 and sufficient additional stages, represented by the block 6620 to accommodate the data message, less address and TIP word. In the illustrative example for which the program timing indications are adapted, the register block 6620 would include sixty-three additional flip-flop stages similar to the stages 6617–6619. Data being read out of store 6616 appears at output leads 6621 and 6622 for coupling to the group readout control.

Shift pulses for register 6616 are received from a shift pulse selecting circuit 6623 which is responsive to program control signals for applying to store 6616 shift pulses at either the readin frequency or the readout frequency as may be required. In order to begin the readin operation a ground signal from the SEC commutator is applied during the readin interval DIN 00 through DIN 94 to an enabling input lead of AND gate 6624 for coupling clock pulses DA*s* 750 to drive a blocking oscillator 6626.

Two flip-flop circuits 6627 and 6628 are provided in the shift pulse selection circuits 6623, and during a preceding readout operation both flip-flops were finally left in the reset condition. The ground ONE output of flip-flop 6628 enables AND gate 6629 which couples blocking oscillator pulses from oscillator 6626 to the opening input connection of AND gate 6630 which was enabled at readin time DIN 00 for coupling the blocking oscillator pulses to the set input of flip-flop 6627. The ground ZERO output of flip-flop 6627 enables a readin AND gate 6631 while the positive ZERO output of flip-flop 6628 closes the readout gate 6632. DA*s* 750 clock pulses from blocking oscillator 6626 are now applied through an AND gate 6633 which was previously enabled by the ground ONE output of flip-flop 6628, and these pulses pass through gate 6631 for triggering a blocking oscillator 6634. Output pulses from oscillator 6634 are applied to the shift input connections of shift register stages in store 6616.

When data readin has been completed the readin program pulse DIN 66 enables the set gate 6636 of flip-flop 6628 which thereafter couples the next DA*s* 750 clock pulse from blocking oscillator 6626 to set flip-flop 6628. As a result, gates 6629 and 6633 are blocked by the positive ONE output of flip-flop 6628 and the ground ZERO output of this flip-flop enables gate 6632.

At the beginning of the readout interval at program time LOT 23, a reset gate 6637 for flip-flop 6627 is enabled. Gate 6637 couples clock pulses LA 1500 through a permanently enabled gate 6638, a blocking oscillator 6639, and a diode gate 6640, which was also enabled by a signal from the group readout control circuit at readout time LOT 23. This enabling signal on gate 6640 persists through the end of the readout time at program time LOT 89. Flip-flop 6627 is now in its reset condition and enables an AND gate 6641 for passing LA 1500 clock pulses from blocking oscillator 6639 through gate 6632 to trigger blocking oscillator 6634 which provides the shift inputs of store 6616. The positive ZERO output of flip-flop 6627 now blocks readin gate 6631.

At the end of the readout interval a reset gate 6642 for flip-flop 6628 is enabled by the transition from readout program timing LOT 89 to time LOT 90 and couples the last of the LA 1500 ground pulses from gate 6640, which is still enabled, to the reset input of flip-flop 6628. This flip-flop resets, and its positive ZERO output blocks gate 6632. At this time both of the flip-flops 6627 and 6628 are in their reset conditions and no shift pulses are being applied to trigger blocking oscillator 6634. The circuit is, however, in condition for the beginning of the next readin period. Operations of the shift pulse selecting circuit 6623 continue in this fashion alternately selecting clock pulses DA*s* 750 and LA 1500 for driving store 6616 during readin and readout operations, respectively.

During each readin operation, the first three bits of the data message, which comprise the transmitter store address, appear in flip-flops 6617 through 6619 of store 6616. The accuracy of storage of these bits in their final store location is checked for two reasons. The shift register operation should be checked, and it is desirable to gain assurance that the address did not change while being stored. Accordingly, the outputs of flip-flops 6617–6619 are sampled at readin time DIN 04, and the resulting address indications are stored in flip-flop circuits 6646–6648 of a temporary address storage network 6644 while the address is also being shifted through stages 6620. The readin program signal enables sampling gates 6649 which are opened by DA*s* 750 clock pulses applied thereto from a blocking oscillator 6650 that received the clock pulses through AND gate 6651 when that gate was enabled by the commutator ground upon selection of the store for readin. Ground output voltage signals from gates 6649 are applied to open set and reset gates 6652 for the address storage flip-flops 6646–6648. The gates 6652, which are then enabled by ground output voltages from data store flip-flops 6617–6619 actuate their corresponding address temporary storage flip-flop circuits 6646–6648 to store the address of the incoming message. The output voltages from the latter flip-flop circuits enable certain of the gates 6653 for coupling DAs 750 clock pulses from blocking oscillator 6626, in the shift pulse selecting circuit 6623, to the opening input connections for comparing AND gates 6656 through 6661. Each of these AND gates receives at its enabling input an output signal from one of the last three stages of store shift register stages 6620 which output would correspond to the binary complement of the output signal coupled to the enabling input of the same comparing gate from the corresponding one of the store flip-flop stages 6617–6619.

For example, if the address bit stored in flip-flop 6619 at sampling time DIN 04 were a ONE, the ground ZERO output of that flip-flop would be utilized to set flip-flop 6648 and the ground ZERO output of the latter flip-flop would be coupled to the opening input of comparing gate 6660. After the full data word has been shifted into store 6616 the address bit which previously resided in stage 6619 would then be found in the last stage of the stages 6620. If it were there correctly stored as a ONE the resulting positive ONE output of the last stage flip-flop would be applied to the enabling input of gate 6660 for blocking that gate. If, however, the address bit had suffered a mutilation in its travel through the stages of the register, the ONE output of the last stage would be a ground. Gate 6660 would be enabled and its ground output voltage would trigger a blocking oscillator 6662 for giving an alarm to indicate address failure. Thus, gate 6660 is enabled by a ZERO output ground voltage from flip-flop 6619 and by its binary complement, a ground ONE output, from the corresponding last stage of the store shift register stages 6620.

During the operation of shifting an entire new data word into store 6616, some of the comparing gates 6656–6661 may be repeatedly enabled by bits of the old outgoing data and actuate blocking oscillator 6662. However, AND gate 6663 in the output of blocking oscillator 6662 is not enabled until readin program time DIN 67 when the complete new data word has been stored and the address bits are stored in their final location in the last three stages of the store stages 6620. At that time gate 6663 is enabled; and, if an address mismatch is then detected, blocking oscillator 6662 generates a pulse which is coupled to the address failure alarm equipment 6664 and to the status circuits to indicate the address failure. If no address mismatch occurs, the integrity of performance of the entire shift register has been proved.

Figure 27B:
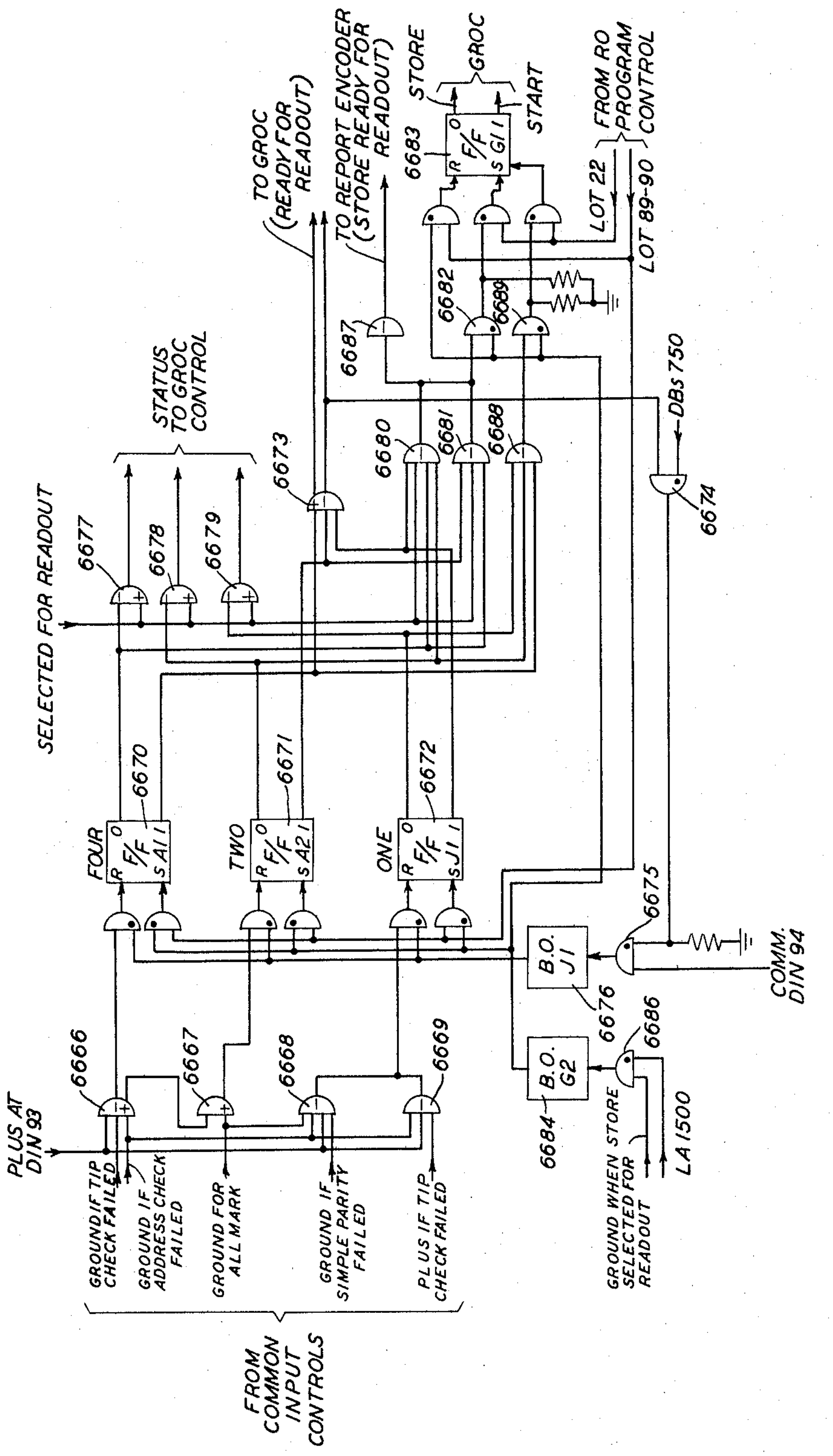

Status circuits of FIG. 27B receive status signals from the outputs of four different message checking circuits which indicate whether or not the stored message successfully passed each of the four tests. These signals are utilized to control logic gates in a code translator for converting the status signals into a weighted number code wherein the status information is represented by a single binary bit on each of three output leads. Each lead has a different weighted significance. By activating these leads in different combinations it is possible to give the check-failure signals from the different checking circuits different degrees of importance in accordance with the severity of the fault that is sought by the checking circuit.

Four transistor-diode gates 6666–6669 receive signals from the various checking circuits and perform the code translation. If the TIP check had failed, a ground is applied to an input of gate 6666 and a positive signal is applied to gate 6669. The inverting output connection from gate 6666 is applied to the enabling input of the reset gate for one of the status storing flip-flop circuits 6670. This flip-flop stores status indications for the weight 4. The in-phase output of gate 6666 is applied to one input of the gate 6667, and the in-phase output of gate 6667 resets flip-flop 6671. The inverting output of gate 6669, which receives the positive TIP failure signal, is applied to the enabling input of the reset gate of flip-flop 6672 which restores the weighted unity signal.

If an address check failure is detected a ground is applied to another input of gate 6666 and also to input connections for gates 6668 and 6669 thereby inhibiting all of them. However, the in-phase output of gate 6666 enables gate 6667 which causes store flip-flop 6671 to be reset as before.

The detection of an all-mark, or dummy, signal causes a ground to be applied to the other input of gate 6667 which has its in-phase output lead connected to the enabling input of a reset gate for flip-flop 6671 that stores the weighted "2" information. An all-mark ground signal is also applied to gate 6668. Thus the all-mark signal inhibits gates 6667 and 6668.

In the event of a simple parity failure a ground is applied to an input of gate 6668 which has its output coupled to reset flip-flop 6672, as previously mentioned.

In order to coordinate the activities of gates 6666–6669 a positive enabling signal is applied at program time DIN 93 to all of the status-receiving gates except gate 6667 which receives an input from gate 6666.

After the readin of a data block has been completed all of the store flip-flops 6670–6672, which had been previously set, as will be described, have their positive ONE outputs applied to enable transistor-diode gate 6673. Ground from the inverted output of gate 6673 enables AND gate 6674 which couples clock signals DBs 750 to the opening input of AND gate 6675 when the latter gate is opened at readin program time DIN 94. These clock pulses actuate a blocking oscillator 6676 which opens any of the reset gates of the store flip-flops which have been enabled by the status gates 6666–6669. At this time flip-flops 6670–6672 are reset or left set in accordance with the relative importance of the various faults found in the stored message.

If a TIP check failed and no other faults were detected, gate 6666 is disabled and flip-flop 6670 remains set. The in-phase output of gate 6666, which is at ground, disables gate 6667 and the in-phase output signal from the latter gate enables the reset of store flip-flop 6671. All inputs applied to gates 6668 and 6669 are positive so the combined outputs thereof are at ground potential and open the reset gate for store flip-flop 6672 permitting that flip-flop to be reset. Thus, a "2" and a "1" are stored as the status indication of the stored message and the sum of these, "3," is the weighted status code indicating a TIP failure.

If a mismatch in the address were detected and no other faults were found, all of the gates 6666–6669 would be disabled in that case, the in-phase output of gate 6667 is at ground and causes flip-flop 6671 to be reset, storing a "2." This is the status indication for an address failure.

The detection of a dummy message disables gates 6667 and 6688. Gate 6666 is enabled since its TIP input is positive in the absence of a TIP failure. Accordingly, the output of gate 6666 causes flip-flop 6670 to be reset, storing a "4" status code. Flip-flop 6671 is also reset to store a "2" status code. Gate 6668 is disabled by the all-mark signal received from the store status, and the absence of a TIP failure causes a ground to be applied to gate 6669, disabling this gate also. Accordingly, the reset of flip-flop 6672 is prevented. Thus, the total status code which is stored is equal to "6," which indicates an all-mark type of failure.

A simple parity failure disables gate 6668 and since gate 6669 is also disabled by a ground signal on one of its inputs in the absence of a TIP failure, the resetting of flip-flop 6672 is once more prevented. Gate 6666 is enabled to reset flip-flop 6670 and store a "4" status code indication. Gate 6667 is also enabled but its in-phase output blocks the resetting of gate 6671. Accordingly, the total status code stored is equal to "4" which indicates a simple parity failure.

The most important status indication of all is, of course, the indication of a good message. Under such conditions, status gate 6666 is enabled causing reset of flip-flop 6670 to store a "4" status code indication. Gate 6667 is also enabled and blocks the reset of flip-flop 6671. Gate 6668 is also enabled and its ground inverted output resets flip-flop 6672 to store a "1" status indication. Gate 6669 is disabled since there was no TIP failure, and one of its input leads was therefore grounded. This would ordinarily cause the inverting output of gate 6669 to remain positive but since gate 6668 was enabled and its output is connected together with gate 6669 the negative-going net potential influence resets flip-flop 6672, as stated. Thus, a total status code of "5" is stored in flip-flops 6670–6672 to indicate a good message.

As previously described, gate 6673 coupled a ready-for-readout signal to the group readout control at a time just prior to the storage of status signals in flip-flops 6670–6672. This ready-for-readout signal indicates to the group readout control that message storage has been completed. Now, if the store is selected for readout, a positive signal is received from the group readout control and applied to enabling inputs of three transistor-diode gates 6677–6679. This signal enables these gates to sample the ZERO outputs of the three status storing flip-flop circuits. If any of those flip-flop circuits is reset, its positive ZERO output fully enables the corresponding one of the status readout gates 6677–6679. Output signals are coupled to the status circuits of the group readout control from gates 6677–6679 to indicate the status code.

The same store select signal from the group readout control also is applied to enabling inputs of transistor-diode gates 6680 and 6681. Gate 6680 is at that time enabled if it receives positive ZERO outputs to indicate that flip-flops 6670 and 6671 have been reset and also receives a positive ONE output from flip-flop 6672 indicating that this flip-flop remains in its set condition. This combination of signals indicates a status code of "6" which means that an all-mark message is in the store. Such a message may be read out of the store, although other circuits later prevent it from being transmitted to the receiving data processor; and the ground output from gate 6680 enables a gate 6682 in the set input circuit of a flip-flop 6683. Clock pulses LA 1500 are applied to the opening input of gate 6682 from a blocking oscillator 6684 which is triggered by those clock pulses when its input gate 6686 is opened by the store select signal. At readout program time LOT 22 the set gate of flip-flop 6683 is enabled and couples the ground output signal from gate 6682 to the set input of the flip-flop to cause it to change state. This action applies a complementary output signal to the group readout control, indicating that the stored message is in satisfactory condition for readout.

In a similar manner gate 6681 is enabled by the store select signal and by output signals from status store flip-flops 6670-6672 indicating that a status code of "4" or "5" is stored. When these conditions occur at the same time gate 6681 is enabled and causes flip-flop 6683 to be set as previously described in connection with gate 6680. When either gate 6680 or 6681 is enabled the resulting ground output disables a transistor-diode gate 6687 to couple a positive signal to the report encoder indicating that the store is ready for readout and that on the route to which it is connected reception was satisfactory.

Another gate 6688 may be enabled by outputs from status store flip-flops 6670–6672, indicating that a status code of "3" has been stored, i.e., that the TIP check failed. This causes gate 6688 to enable a gate 6689 for coupling LA 1500 clock pulses from blocking oscillator 6684 to set flip-flop 6683.

At the end of the readout operation readout program timing transistion LOT 89–90 enables the set gates of all of the store flip-flops 6670–6672, and these flip-flops are then set by LA 1500 clock pulses from blocking oscillator 6684. The same program timing signal also enables the reset gate of flip-flop 6683 which is reset in a like manner. Gate 6673 is now enabled once more by the positive "1" outputs from the three status store flip-flops to indicate that the store is ready for readout once more.

*Receiver SEC—Readout programmer and control—FIG. 28*

The programmer and control of FIG. 28 receive ground signals from either the group readout control in common output controls 607 or from the terminal readout circuit 700. These signals indicate to the programmer and logic that a store in the SEC cabinet has been selected for readout and that a readout program should begin. Accordingly, the programmer operates to produce program output signals on leads designated "LOT—" wherein numerals are inserted in the blank to designate a certain time period in locally controlled readout timing programs. Local clock 108, which is reproduced in FIG. 28, provides clock signals at three different frequencies for use in connection with readout operations. These are LA 750, LA 1500, and LA 3000.

A flip-flop 660 is normally reset prior to the appearance of a store-select signal and its ground ONE output couples clock pulses LA 1500 through an AND gate 661 to trigger a blocking oscillator 662 for supplying repeated reset pulses to programmer counters 663. These counters once again comprise the arrangement of three ring counters of different lengths that may be individually advanced by clock pulses and which are associated with logic circuits for producing desired output program signals to various parts of the SEC cabinet. Such programmer counters and logic were previously discussed in connection with the transmitter readout programmer. If desired, in the case of programmer counter 663, as in the case of other similar counting and logic arrangements, it may be desirable in some applications to provide additional logic circuits such as those represented by block 665 for detecting the loss of the singular data bit such as a single ONE, which is circulated in each of the ring counters or to detect other conditions that may be of interest in particular applications. The output signals of such logical detectors 665 may then be sent back to the reset input gate 670 of flip-flop 660 for causing the programmer counters to be reset.

When a store is selected, one of the set gates 664 or 666 of flip-flop 660 is enabled and couples an output pulse from blocking oscillator 662 to set flip-flop 660. The ground ZERO output of flip-flop 660 now enables AND gate 667 to pass clock pulses LA 1500 to a blocking oscillator 668 for advancing counters 663. The output of blocking oscillator 668 is also coupled back to open AND gates 669 and 670 for resetting flip-flop 660 upon the appearance of a readout program time LOT 180 or if an improper count condition should be detected by the circuits 665 and a resulting ground signal applied to enable gate 670.

*Receiver output equipment parity check—FIG. 29*

During each store readout operation of the receiver station, inverted data from the store is applied to an enabling input of a transistor-diode gate 669 for application to a parity counter flip-flop 670 to determine whether or not the message still includes odd ONE parity in each of the nine 7-bit groups of the data block. However, this check is perfomed only if the input equipment parity check performed in connection with the receiver error control circuits illustrated in FIG. 25 had satisfactory outcome. A failure of input equipment parity check is indicated by a positive signal applied to a gate 671 from the circuits of FIG. 25 through the group readout control. Such positive signal disables a gate 671 to prevent LA 1500 clock pulses from reaching the set input on a flip-flop circuit 672. In addition, a ground signal from the group readout control if either simple parity or TIP checks fail can cause flip-flop 672 to be reset and can also disable gate 669 so this parity checking circuit is inoperative.

Assuming a satisfactory input equipment parity check and a satisfactory TIP check, gate 669 is enabled to pass data. Gate 671 is also enabled and causes flip-flop 672 to be set at readout time LOT 26 thereby enabling gates 674 and 676. The inverted data input to gate 669 disables that gate for each data ONE and thereby fully enables gate 674 which in turn disables another gate 675. Gate 675 produces positive output signals in response to a mark input applied to gate 669 so that each mark from gate 675 enables a further gate 665 and blocks AND gate 677.

It will thus be observed that a mark bit is also ground in the outputs of gates 674 and 665 while a space bit is always ground in the output of gate 675 and plus in the output of gate 665. This is significant because a ground signal from the first stage of the 7-stage ring counter in the readout programmer disables gate 665 each time it appears and permits the gate to be enabled at other times. This same ring counter ground signal causes AND gates 677 and 679 to be opened for sampling the outputs of gates 674 and 675 each time it appears and enables a gate 680 to couple in LA 1500 clock pulses as sampling time signals.

Gates 677 and 679 are coupled directly to the set and reset inputs of flip-flop 670 and thus control the flip-flop operation when they are enabled during every seventh bit by the mentioned program counter ground. If a mark is in the parity check circuit at that time, flip-flop 670 is forced to set, and a space forces it to be reset. This arrangement provides assurance that flip-flop 670 starts out each of the 7-bit checking intervals in the proper condition to actuate an alarm if an even number of marks is counted.

During each checking interval gates 677, 679 and 680 are disabled, and gate 665 is enabled as previously mentioned. Marks appear as grounds in the output of gate 665 and enable gate 681 to pass LA 1500 clock pulses to gates 682 and 683 which are arranged in a complementing input connection for flip-flop 670. If at the end of a checking interval flip-flop 670 resets in the reset condition, gate 676 is enabled and its ground output enables AND gate 684. The latter gate is opened at this time by the same programmer ground disabling gate 665, and alarm 685 is actuated.

*Receiver SEC—Group readout control (GROC)—FIGS. 30A and B*

Group readout control circuits coordinate the activities of readout operations from the three stores in each receiver SEC cabinet. These control circuits are always used as long at at least one SEC cabinet is employed and they are to be distinguished from the terminal readout controls illustrated in FIGS. 31A and B which are employed during diversity operations for coordinating the activities of several receiver SEC cabinets.

Complementary store-ready signals from the respective stores in the SEC cabinet are received by flip-flop circuits 686, 687 and 688. These signals are coupled to those flip-flops from each store through set and reset AND gates 689. The store-ready signal from one store causes the corresponding flip-flop to be set and apply a positive ONE output signal to the terminal readout control if such a control is used. In addition, the positive ONE output of the set flip-flop is applied to enable partially one of the AND transistor-diode gates 690. Each of the gates 690 receives a further positive enabling signal from the terminal readout control if that control is not to be used. However, gates 690 are inhibited if the terminal readout control is being used. The reason for this action is that when the terminal readout control is being used it must receive the store-ready signals and it subsequently makes its own store selection. However, when the terminal readout control is not used gates 690 are enabled and the group readout control performs the store selection operation.

Assuming that store selection is to be performed in the group readout control, one of the gates 690 receives an enabling signal from the terminal readout control and from one of the flip-flops 686–688. Each of the gates 690 also receives an enabling output signal from the other two of the gates 690 to perform an interlocking function so that if any one of the gates is enabled these cross-coupling leads to the inputs of the other gates disable the other two. Thus, only one store may be selected for readout at any one time. Each of the gates 690 has its output further coupled to an input of three additional transistor-diode gates 691. Gates 691 also receive permanent enabling signals from the terminal readout control if that control is not being used. When one of the gates 691 is disabled by a gate 690, it applies a complementary output signal from its two oppositely phased output connections back to the store status circuit for selecting a ready store and enabling readout from that store.

The output of the enabled transistor-diode gate 690 is also applied to disable a further transistor-diode gate 692 which then applies a ground signal from its in-phase output to the readout program counters for initiating the readout program.

The inverted output of the selected gate 691 is further coupled as a positive enabling signal to one of the data gates 693 in FIG. 30. Each of the gates 693 receives a further enabling input in the form of data ONE signals from the respective data stores. A final enabling input is derived from the positive ONE output of a flip-flop circuit 694 which is set by an LA 1500 clock pulse immediately following readout program time LOT 23. A transistor-diode gate 696 which is disabled any time that a ground enabling signal from the store status is applied to a store to enable readout. If no store is enabled for readout, the gate 696 is enabled, and its ground output inhibits the setting of flip-flop 694 at time LOT 23.

When one of the gates 693 is enabled by all of the aforementioned signals, it produces the data at its inverting and in-phase output connections. All of the inverting outputs of gates 693 are connected to one another and coupled to the data comparing logic of the terminal readout control. All of the in-phase output connections from gates 693 are connected together and applied as enabling inputs to transistor-diode gates 697 and 698 for coupling data signals to the signal converter and address signals to the report encoder, respectively. Both of these gates also receive an enabling input from the group preference flip-flop of the terminal readout control when that control is used. The preference signal is the result of a status signal comparison in the terminal readout control which enables that control to select the one receiver SEC cabinet which is best suited for readout to the signal converter and subsequently to the receiving data processor terminal. At readout time LOT 03 the group preference signal is also coupled through another transistor-diode gate 699 as a positive-going start bit which is applied to the report encoder.

The program time LOT 23 enabling signal at the ONE output of flip-flop 694 is also applied as an enabling input for gate 698. However, at readout time LOT 26 an additional flip-flop 6601 is reset, and its ground ONE output disables gate 698 while its positive ZERO output enables gate 697. The purpose of this arrangement is to couple the three address bits between readout times LOT 23 and LOT 26 through gate 698 to the report encoder, while also preventing the readout of the address to the signal converter.

The end of the data word is read out at program time LOT 89, and at that time the corresponding program signal is applied to reset flip-flop 694 and thereby apply a ground ONE output to transistor-diode gates 693 and 698 for inhibiting their further operation. Basic operations of selecting a store and reading out its contents have been described. The status evaluation which influences readout in the group readout control will now be described.

Each group readout control also receives from the store status circuits of each receiver store the weighted status signals which indicate the quality of the message that is in the receiver store. Transistor-diode gate 6602 receives the three "1" status leads from each of the stores. In like manner gates 6603 and 6604 receive the "2" and "4" status leads from the three store status circuits. The weighted status signals are coupled from the inverting outputs of gates 6602–6604 on to the terminal readout control. Inverting and in-phase outputs from these gates are applied to the input connections of three additional transistor-diode gates 6606–6608 which reconvert those weighted signals to single signals representing particular ones of the possible faults for use in controlling the group readout control circuits.

At program time LOT 03 a positive program signal is applied to gate 6607 to enable that gate and couple a ground enabling signal to the set input of a flip-flop circuit 6609 to indicate the storage of an all-mark message. The next LA 1500 clock pulse sets that flip-flop, thereby generating a ground ZERO output which is utilized as a disabling signal for the transistor-diode gate 697 for preventing the coupling of the all-mark data to the signal converter. At readout time LOT 89 flip-flop 6609 is reset, and its positive ZERO output is available for enabling gate 697 for the next message.

The ZERO output of flip-flop 6609 is also applied to an input of transistor-diode gate 6610 to disable this gate in the event that flip-flop 6609 is set at readout time LOT 03. This gate also receives enabling input signals from the group preference circuit of the terminal readout control when the SEC cabinet is selected for readout, and it receives a further enabling signal from the ONE output of flip-flop 694 during actual readout of the message following time LOT 23. At readout time LOT 25, i.e., immediately following the address, gate 6610 is disabled by readout time signal LOT 25 and applies a positive going output signal to the terminal readout control during readout time LOT 25 which serves as the start signal for controlling operations in the terminal readout control. Another gate 6611, which is similarly enabled by the ONE output of flip-flop 694 and by the group preference signal, is further enabled by the output of gate 6606 if a failure of triple-interleaved parity was detected. Another input lead on gate 6611 applies readout timing signal LOT 26 to disable this gate during that time interval for applying a second start pulse to the terminal readout control circuits, thereby indicating by means of the two start pulses in readout times LOT 25 and 26 that the message which is being read out failed on the TIP comparison. This latter function would not normally be used unless the system were operating in a mode wherein every data block is automatically repeated more than once independently of report system control.

If an input equipment parity check failure was detected, gate 6608 is disabled at readout time LOT 26 and applies a one-bit positive signal to the output equipment parity checking circuit for inhibiting its operation.

In summary, with respect to the group readout control, if a message is good its receiver store may be selected for readout. When selected, a start signal is sent to the report encoder and to the terminal readout control. In addition, the address is transmitted to the report encoder and the data, less address and TIP word, is transmitted to the signal converter. Also when the terminal readout control is used the group readout control sends appropriate control signals on to the terminal readout control for use by the latter in performing its coordinating functions.

*Receiver—Terminal readout control—FIGS. 31A, B and C*

The over-all function of the terminal readout control is to coordinate the activities of the various receiver storage and error-control cabinets which are included in the receiving station. These circuits work closely with the group readout control. For convenience of reference it may be desirable to arrange the four sheets of FIGS. 30 and 31 as shown in FIG. 31C to form a rectangle with FIG. 30A in the upper left-hand corner and the other figures arranged in clockwise order as FIG. 31A, FIG. 31B and FIG. 30B.

Three transistor-diode gates 702–704 receive store-ready signals from the individual stores of each of the working SEC cabinets. Each gate receives an input from corresponding stores in the two cabinets. The gates are further provided with interlocking cross-coupling connections so that if any one of the gates is enabled it automatically disables the other two. When one gate is enabled its ground output signal is coupled back to the corresponding stores in each of the SEC cabinets. The same signal is also applied to disable a transistor-diode gate 706. The in-phase output of gate 706 is coupled to the readout programmer counters in FIG. 28 as a signal for starting the readout program. Data from the preferred SEC cabinet passes straight through the terminal readout control on leads designated 707 and 708 to the signal converter. However, data ONEs from both storage and error control cabinets are applied to data bit comparing logic 709 in FIG. 31A which will be subsequently described. This data bit comparison is carried on under the control of status evaluating logic which will now be described.

The purpose of the status evaluating circuits to be described is to select from the two working SECs the store which contains the better version of the particular data block that is being considered. For this purpose, the "4," "2," and "1" weighted status leads from one of the SEC status circuits, let us say for SEC 601, are applied to transistor-diode gates 710, 711, and 712, respectively. In like manner, the "4," "2" and "1" weighted status signals from the SEC cabinet 603 are applied to three more transistor-diode gates which are indicated by corresponding primed reference characters. In the subsequent description of these status evaluating circuits it will be carried forward by assuming an illustrative example in which SEC cabinets are characterized by status indications of "4" and "2," respectively. Thereafter, the reader can easily work out any other combination desired. The "4" status indicates simple parity failure, and the "2" status indicates address mismatch.

Each of the status input signals is a positive signal on the lead concerned, and the example is illustrated by means of appropriate plus and minus signs on the drawing to represent positive and ground voltages. When gate 710 is enabled on a status code of "4" its ground output is applied to disable gate 712. However, its positive output is applied as in an enabling input to another transistor-diode gate 713 and to two cross-coupling transistor-diode gates 714 and 716. Since neither of the other two status leads "2" or "1" is enabled, i.e., if both have ground potentials thereon, gate 711 is disabled, and gate 712 also is disabled. The positive output of gate 711 is applied to enable gate 713 and gate 716. The negative-going output is applied as a further disabling input for gate 712. The ground on the status "1" lead is applied as a disabling signal to gate 712 and also to gate 714. At this point it can be seen that cross-coupling gate 716 is fully enabled and applies a ground disabling signal to gate 712'. In addition, the positive output of gate 716 is applied to input connections of data bit comparing logic 709. The positive output of gate 714 is applied as an enabling input to gate 713.

Now let us consider a status code of "2" on the status leads from SEC cabinet 603. In this condition a positive voltage on the status "2" lead enables gate 711' and ground potentials on the status "1" and "4" leads are applied as disabling signals to gates 714' and 710'. The ground potential from status lead "1" is also applied as a disabling signal to gate 712'. Gate 710' is disabled by its ground input signal from store status lead "4" and applies a corresponding plus signal to enable gate 712' and a ground signal to disable gates 713' and 716'. Gates 714' and 716' are both disabled. Consequently, the plus output signal from gate 714' is coupled as an enabling input of gate 713 in status circuit for SEC cabinet 601. Similarly, the plus output from gate 716' is applied as an enabling signal to gate 712 in status circuit for SEC cabinet 601. The ground output from 716' is applied as a disabling input to data bit comparing logic circuits 709.

It is now clear that gates 712' and 713' in status circuit for SEC cabinet 603 are both disabled and consequently apply a positive output signal to the set gate of a preference flip-flop circuit 717. However, gate 713 is fully enabled and accordingly applies a negative output signal to the reset gate of flip-flop 717, enabling that gate to couple clock pulses LB 1500 to reset the flip-flop and indicate a preference for SEC cabinet 601 by coupling a positive ZERO output to gates 697 and 698 in the group readout control of SEC cabinet 601.

Since gate 716' provides a disabling signal to the input of logic comparing circuit 709, the input gates 718 and 719 in that circuit are disabled and no bit-by-bit comparison of the words in the stores of the two SEC cabinets is carried out. The reason for this is that the "4" status of SEC cabinet 601 indicates that for that cabinet there was only a failure of equipment parity to check and that other checks were completed satisfactorily. Accordingly, that message is of sufficient quality to permit readout. On the other hand, the "2" status of SEC cabinet 603 indicates an address check failure which suggests that different messages may be found in the corresponding stores of the two cabinets. Accordingly, no useful purpose could be served by a data bit comparison, and for this reason the comparison is inhibited by the ground output of gate 716'.

If both SEC cabinets exhibit a status code of at least "4," the action of flip-flop 717 is immaterial. However, the output signals from gates 716 and 716' are both plus and gates 718 and 719 in comparing logic 709 are enabled. A flip-flop 720 in comparing logic 709 is normally set and provides a positive ONE output which enables gates 718 and 719 for the comparison of data. Now data ONE outputs from the group readout controls of the two working SECs are applied on leads 721 and 722 to the gates 718 and 719.

Gates 718 and 719 are enabled or disabled by incoming data and such action takes place in synchronism if the data from the two SECs is in step. Accordingly, these gates provide complementary output signals which are coupled to a bit-by-bit logic comparing circuit 723 similar to those herein previously described. If a disagreement is detected between the data signals applied to gates 718 and 719 a ground output from comparing circuit 723 resets a flip-flop circuit 724. The positive ZERO output of this flip-flop supplies one enabling signal for a gate 726 which, when fully enabled, can activate a data comparison alarm 725. Another enabling signal for this gate is provided by the positive ONE output of flip-flop 720. At the end of the readout program a final positive enabling signal is provided from the readout programmer to enable gate 726 fully and indicate the alarm condition which is stored in flip-flop 724.

In addition, the ground ONE output of flip-flop 724 enables AND gate 727 which couples LA 1500 clock pulses to the reset gate of flip-flop 720. This reset gate is opened by the readout programmer control for one time slot after the address has been read out of the store. Consequently, flip-flop 720 is reset immediately after the address has been read out, and its positive ZERO output is applied to enable two transistor-diode gates 728 and 729. The ground ONE output of flip-flop 720 also closes gates 718, 719, and 726 and permits a clock pulse LA 1500 to set flip-flop 724. Thus, if addresses do not compare, no further comparison takes place.

Gates 728 and 729 are further enabled by positive signals on the start leads 730 and 731 from each of the working SEC readout program controls. However a start pulse on those leads inhibits gates 728 and 729. The ONE and ZERO outputs from group preference flip-flop 717 are also applied to gates 728 and 729 and further enable the one of those gates which is receiving a start signal from the preferred SEC cabinet.

Accordingly, upon the detection of a mismatch between the data blocks from the two SEC cabinets, one of the gates 728 or 729 which serves the preferred SEC cabinet is enabled; and its in-phase positive output is applied on one of the leads 732 or 733 for inhibiting the commutator of the SEC cabinet which is not preferred. This action assumes that the commutators of the two SECs had somehow dropped out of step, and the inhibit signals prevent the commutator which is not preferred from stepping ahead at the end of the readout program.

It is possible to employ the output of the enabled one of gates 728 or 729 for setting flip-flop 720 and restoring data bit comparing logic 709 to its initial condition. However, in some applications it has been found to be desirable to prevent the immediate restoration of logic circuits 709 to their initial conditions and to delay the operation of preference flip-flop 717 for a short time after a word comparison that produced a mismatch. For this reason a terminal readout delay circuit 736 may be provided and receives the inhibiting output connections from gates 728 and 729 as input connections for a transistor-diode gate 737. The particular delay circuit 736 which is disclosed inhibits the operation of preference flip-flop 717 for approximately five words, or data blocks; and it also holds up the resetting of comparing logic 709 for approximately four time slots.

In the absence of an inhibit signal gate 737 is enabled and its in-phase output connection is applied to the input of another transistor-diode gate 738. A binary counter 739 measures the approximate delay interval during which preference flip-flop 717 is to be inhibited. Since a delay of about five words is desired a counter of appropriate size is employed. Counter 739 begins operation with all stages in the reset condition. The positive ZERO output voltages from the first two stages of the counter are applied as inputs to gate 738. ZERO outputs of the remaining counter stages are applied as inputs to additional transistor-diode AND logic represented by the transistor-diode gate 740, and the in-phase output from gate 740 is also applied to the input of gate 738.

With counter 739 in its reset condition, gates 738 and 740 are fully enabled, assuming, of course, that gate 737 is also enabled. When one of the gates 728 or 729 is enabled to provide an inhibit signal, the inverting output of that gate disables gate 737 which, in turn disables gate 738. The latter gate provides a ground output from its in-phase connection to AND gate 741 for passing LA 1500 clock pulses to counter 739 for advancing the counter. The aforementioned output connections from the first two stages of counter 739 provide additional inhibits to gate 738. The fourth advance pulse received by counter 739 operates the third counter stage to its set condition in the well-known manner and thereby disables gate 740. At this time the in-phase output connection from gate 740 is applied as a still further inhibiting input to gate 738, and it is also applied to the set input gate of flip-flop 720 in comparing logic 709 for passing LA 1500 clock pulses thereto for resetting the flip-flop. Now the ground ZERO output of flip-flop 720 disables both of the gates 728 and 729 and the positive ONE output of the flip-flop enables gates 726, 718, and 719 and blocks the coupling of further LA 1500 clock pulses to the set input of flip-flop 724. The data comparing logic 709 is now in condition to receive additional data and control signals.

Returning to gate 740 in terminal readout delay circuit 736, the inverting output of gate 740 is now in the fourth bit, positive and is applied to enable two additional transistor-diode gates 742 and 743. The ground voltage outputs of these latter two gates are applied to the commutators of both working SEC cabinets to enable their advance.

From gate 738 the positive in-phase output of the disabled gate is coupled to input connections of two transistor-diode gates 744 and 746. The output of each gate is applied to one of the outputs of preference flip-flop 717, and the output of each gate is also cross-coupled to the input of the other gate. Thus, if flip-flop 717 is in its set condition its positive ONE output enables gate 744, and the ground output from gate 744 performs two functions. It disables gate 746, and it also clamps the ZERO output of flip-flop 717 to ground. This latter connection, of course, has the further effect that it clamps the set input of flip-flop 717 to ground, and it prevents any change in the condition of preference flip-flop 717 as long as gate 738 is disabled.

Gates 738 and 740 remain disabled until counter 739 has counted around its complete cycle and returns to its initial reset condition. At that time gate 740 is enabled and its positive in-phase output partially enables gate 738. Since gate 737 was previously enabled by the setting of flip-flop 720 to disable gates 728 and 729, gate 737 now provides a positive output for further enabling gate 738. Two additional enabling inputs to gate 738 from counter 739 complete its complement of input signals and cause gate 738 to be fully enabled. Now the positive in-phase output of gate 738 blocks gate 741 to prevent the application of further advance pulses to counter 739. In addition, the inverted output of gate 738 is applied as a ground signal to gates 744 and 746, thereby disabling these gates and permitting preference flip-flop 717 to operate once more under the control of the status evaluating circuits in FIG. 31B. In addition, the inverted output of the now enabled gate 740 is applied as a ground signal for disabling gates 742 and 743 and thereby releasing the enabling signals which were applied to the two commutators of the working SEC cabinets. This latter action releases those commutators from control of the terminal readout delay 736 and permits their continued operation in the usual fashion previously described.

*Receiver—Signal converter—FIG. 32*

As previously described in connection with FIG. 2, the signal converter is designed to receive start and data signals in rectangular-pulse form from the terminal readout control circuit and to receive locally generated clock signals. These inputs are made to cooperate and produce at the signal converter output, in three separate output circuits, sinusoidal pulse start, data, and timing signals, respectively.

Clock pulses LA 1500 and LB 1500 are separately applied to the set and reset inputs of a flip-flop circuit 149, and clock signals LB 3000 are applied to the enabling inputs of both the set and the reset gates for this flip-flop. With this arrangement, each cycle of the LA 1500 clock pulses sets flip-flop 149; and each cycle of LB 1500 clock pulses resets the flip-flop. Accordingly, a 1500-cycle rectangular wave appears in the output of flip-flop 149 displaced ninety degrees in phase with respect to the input 1500 cycles per second clock pulses. This wave is amplified by an amplifier 150 and coupled through a 1500-cycle bandpass filter 151 so that a sinusoidal 1500-cycle sine wave is applied to the input of a dipulse modulator 152. Filter 151 displaces the wave ninety degrees again. The two displacements, one digital in flip-flop 149 and the other analog as the result of filter design, produce a sine wave at the input to the dipulse modulator in time phase with the gating control inputs at 1500 cycles per second.

Rectangular start pulses from the selected SEC are applied as enabling inputs to transistor-diode gates 153 and 154. These pulses are immediately transmitted as ground signals by gate 153 to dipulse modulator 152. Data signals from the same SEC cabinet are applied as a further enabling signal to gate 154 and as a single enabling signal to another transistor-diode gate 156. The latter gate couples the data as ground signals, i.e., in inverted form, to the dipulse modulator 152. In addition, any time a start pulse and a data pulse are both absent gate 154 is enabled and couples a ground signal to dipulse modulator 152.

The signals from gates 153–156 may be utilized in modulator 152 for operating gating devices to couple the 1500-cycle sine wave signals from filter 151 to the start, data, and timing output circuits as required. One such modulator which was found to be particularly satisfactory for this data system is disclosed and described in detail in the previously mentioned application of O. F. Gerkensmeier. The Gerkensmeier pulse modulator has the desirable feature that the gating of sinusoidal signals is accomplished rapidly while at the same time maintaining proper terminating impedances at the various modulator ports.

*Report encoder and control—FIG. 33*

The purpose of the report encoder and control circuits is to assemble a report word for return to the transmitting station to indicate whether or not the last-received block of data was satisfactorily received. It further indicates whether or not reception was satisfactory on the diverse routes that may have been employed for sending the reported data block to the receiving station. Transmitter store address codes are received from gate 698 in the group readout control circuits and appear at the enabling input of AND gate 804 in FIG. 33. Status signals from the gates 6687 in the store status circuits of both working SECs appear at gates 806 and 807 of FIG. 33. Other signals received by report encoder and control circuits include clock and program signals from the appropriate circuits of the receiving station as previously described.

In the output signal category, the report encoder and control produces a ready-start signal at a transistor-diode gate 808, and this signal is coupled to the report modulator after passing through the report voters, as previously described. Also supplied from a report encoder and control is the actual report message which appears at transistor-diode gate 809 along with a start signal. The report and start are also transmitted to the report modulators through the report voters.

Each report message is made up of a basic report word comprising three address bits and two status bits for a system having two diverse transmission routes. These make up a five-bit word which is transmitted to the transmitting station seven times after a ready-start code has been sent out. The manner of operation of the report encoder and control will be described in connection with the individual operations which take place as the program of operation proceeds.

Figure 30B:
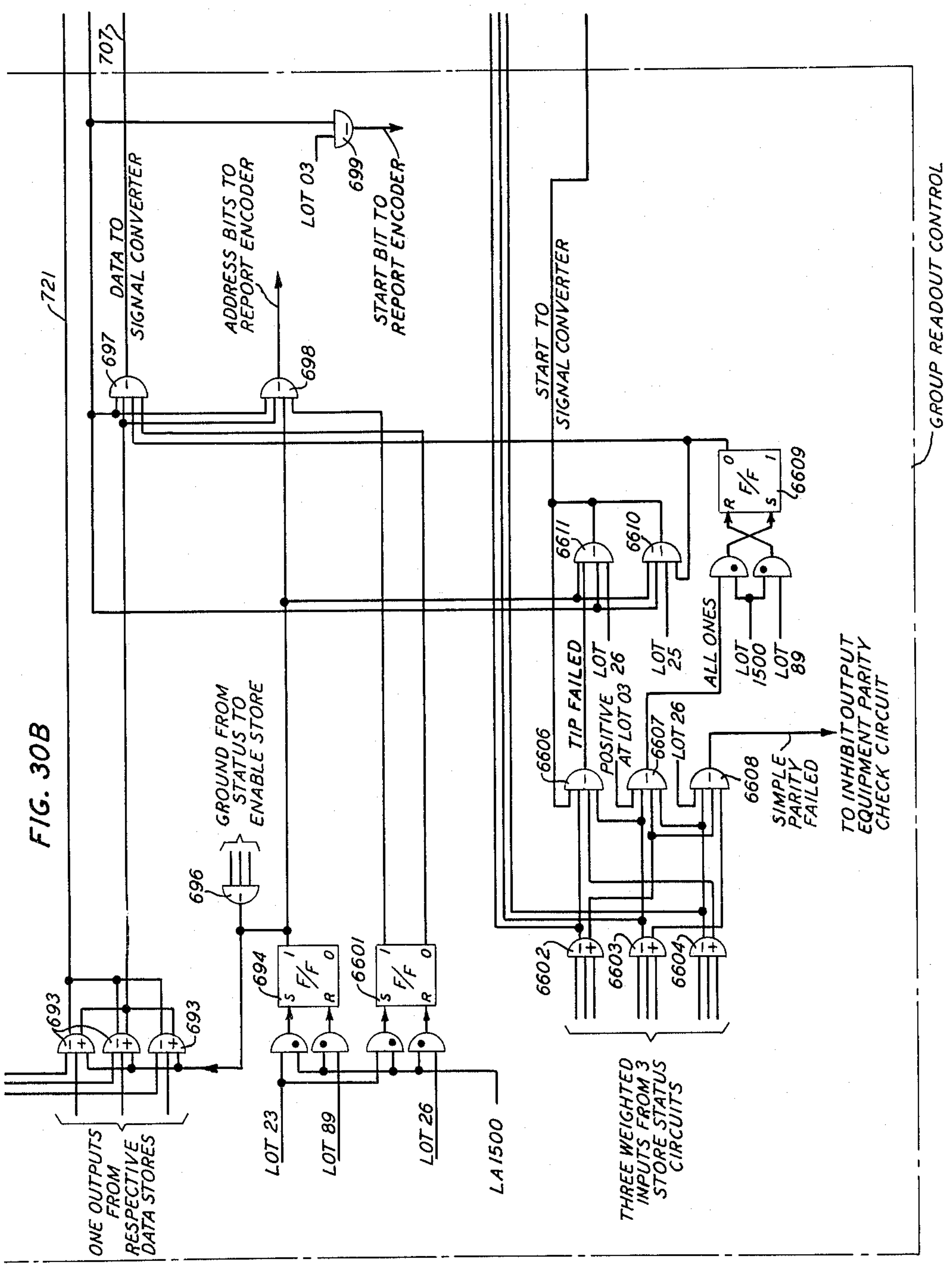
Figures 31B, 31C:
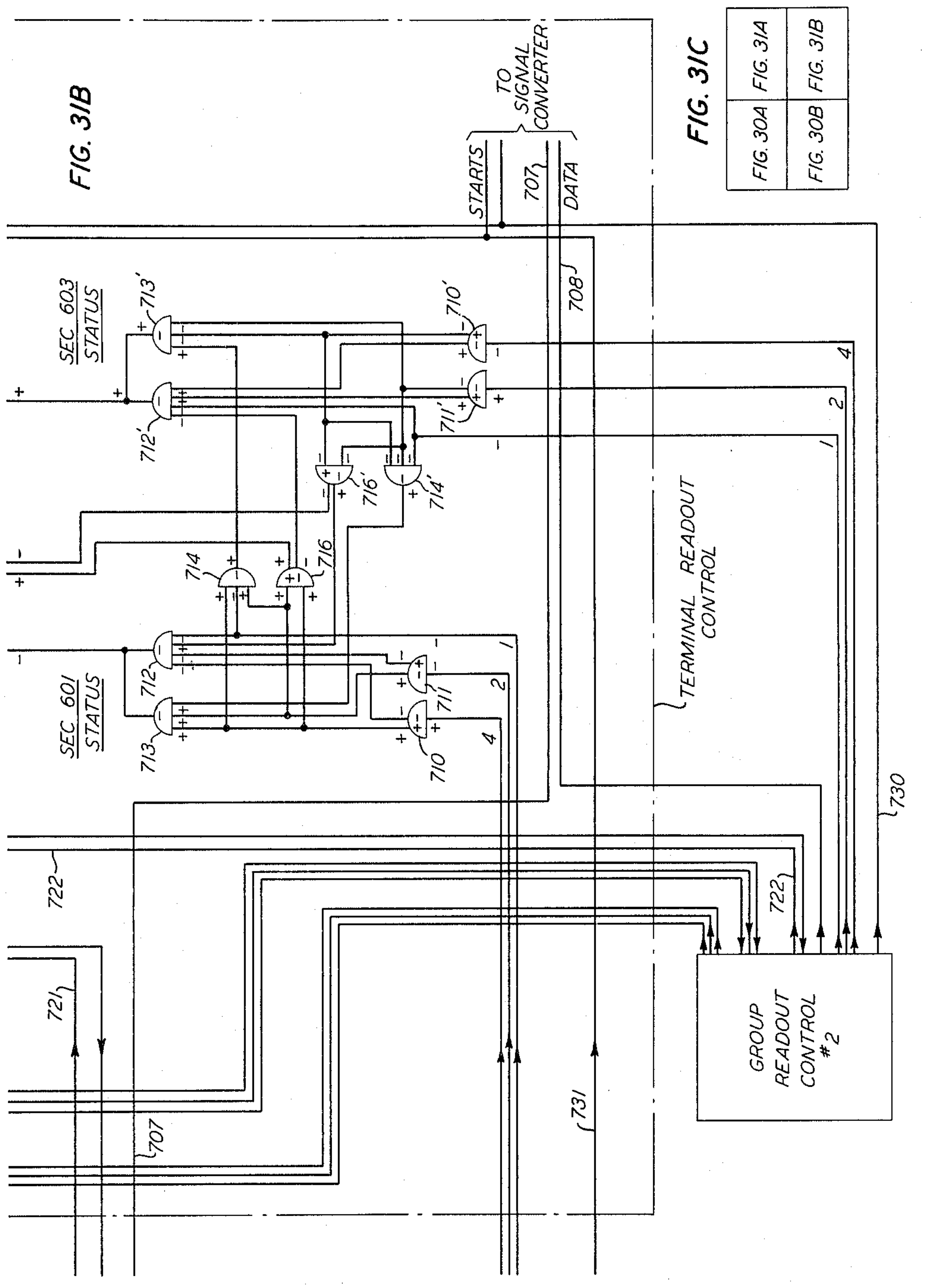

First of all, a report start signal is received from gate 699 in FIG. 30B and enables the set gate of a flip-flop circuit 810 to pass LA 1500 clock pulses for setting the flip-flop. The ground ZERO output of this flip-flop enables a gate 811 for coupling the same clock pulses to drive a blocking oscillator 812 which supplies advance pulses to a programming binary counter 813. Meanwhile the positive ONE output of flip-flop 810 closes a gate 841 to prevent the flow of LA 1500 clock pulses for triggering a blocking oscillator 842. The latter oscillator provides reset pulses on leads RST for preparing the encoder for a new report message.

Counter 813 is provided with count-extracting logic in the usual manner for supplying interval count signals on leads which are designated by the word "count" followed by numerals indicating the number of 1500 cycles per second clock pulses which have been counted since the beginning of the report encoder program. In addition, the first stage of the counter 813 has one output thereof extracted to supply 750 cycles per second clock pulses for use in readout operations for the report encoder and control. LA 1500 clock pulses are also supplied through program counter 813 to control readin operations of the report encoder and control; and these clock signals are indicated, where used, by leads designated "LA 1500 via control."

At count 4 the 1500-cycle clock signals from the programmer set the ready flip-flop 814 and provide an enabling signal to gate 808. At count 12 the reset gate of flip flop 814 is enabled and the flip-flop is similarly reset by the local 1500-cycle clock pulses to disable gate 808. This count interval of eight bits occurs at the 1500 cycles per second rate and corresponds, in elapsed time, to a four-bit output signal from gate 808 at the 750-cycle readout rate for the report encoder, as will be described. A ready-start failure alarm 816 may be arranged in any suitable manner to indicate the failure of flip-flop 814 to set after a program for the encoder has begun.

Also at count 12, two AND gates 817 and 818 are enabled by the count signal 12 to pass LA 1500 clock pulses from gates 806 and 807 if those gates have been previously enabled by satisfactory status signals from the store status circuits of the working SECs. Ground pulse outputs from gates 817 and 818 set flip-flops 819 and 820, respectively. Three additional flip-flop circuits 821, 822 and 823 complete a five-stage encoder shift register. It will be noted, as the description proceeds, that this shift register has its output coupled back on to its input so that information inserted in the register circulates continuously as the register is operated.

Also at count 12, AND gate 824 is enabled to pass a 1500-cycle clock pulse for setting the report flip-flop circuit 826. The setting of flip-flop 826 marks the beginning of four bits of start signal represented by the ground ZERO output from flip-flop 826 which disables gate 809 for that interval. Count 20 enables a gate 827 to couple 1500-cycle clock pulses to the reset input of flip-flop 826 for ending the start signal. Here again, it will be observed that there is an eight-bit interval between counts 12 and 20, but they are measured by 1500-cycle clock pulses so that the interval duration at the encoder readout rate is only four bits.

At count 20, AND gate 828 in the set input circuit of register flip-flop 821 is enabled to be ready for receiving the first address bit from gate 804 when the readout operation begins at the receiver SEC.

Count 21 similarly enables another gate 829 so that the second address bit is caused to set flip-flop 822 if it should be a ground bit.

At count 22 a third gate 830 is also enabled for coupling the third bit of the address to the set input of flip-flop 823 in the encoder shift register. Further, at count 22 the set gate of a flip-flop 831 is enabled to receive the output of one of the AND gates 832 or 833. These gates are opened by 1500-cycle clock pulses from programmer counter 813 for sampling the ZERO output conditions of register stages 819 and 820 wherein the status signals were stored. If neither of the flip-flops 819 and 820 is found to be in its set condition with a ground ZERO output at count 22, it is known that the status of reception on both routes connecting transmitting and receiving sation was bad, and gates 832 and 833 are disabled so that flip-flop 831 is not set. In this case only the ready-start signal is transmitted as will be described.

Assuming, however, that one of the gates 832 or 833 is enabled, indicating that the status of reception is good on at least one of the lines, flip-flop 831 is set. The ground ZERO output from the flip-flop enables a gate 834 for coupling 750-cycle advance pulses from program counter 813 to a blocking oscillator 836 for supplying shift signals to the complementing input connections of each of the shift register flip-flop circuits. These shift signals move the five-bit report message around the register stages 819–823 continuously until report encoder program count 93 when flip-flop 831 is reset to cut off the supply of shift pulses to blocking oscillator 836.

As the report circulates through the register, a pair of sampling gates 837 and 838 are enabled by the shift pulses and couple whatever signals appear in the output of stage 821 to the set and reset inputs of flip-flop 826. The latter flip-flop operates continuously in response to these signals for enabling or disabling gate 809 and the complementary output signals from that gate comprise the rectangular pulse data which is coupled through the voters to the report modulator. It will be noted that the time interval of operation for the shift register flip-flops 819–823 extended from count 22 to count 93 which comprises an interval of thirty-five data bits at the readout rate of 750 cycles per second. This constitutes, as mentioned before, a report message comprising the basic report word of five bits repeated seven times after a ready-start code has been transmitted.

Assuming now the opposite condition that at time count 22 neither of the status flip-flops 819 and 820 in the shift register was in its set condition, flip-flop 831 is not set. Consequently, its ground ONE output enables a gate 839 to couple 1500-cycle clock pulses to the opening input of another gate 840. At program count 24 gate 840 is enabled and flip-flop 826 is reset. Flip-flop 826 remains in this condition with a positive ZERO output enabling gate 809 until, at count 93, the program counter output resets flip-flop 810 to close gate 811 and cut off the supply of LA 1500 clock pulses to the report encoder and control circuits. Thus, an indication of bad status on both transmission routes causes an all ZERO report to be transmitted after the ready-start code.

As noted before, at count 93 flip-flop 810 is reset. Now the ground ONE output of the flip-flop enables gate 841 to pass LA 1500 clock pulses to blocking oscillator 842. Oscillator output pulses reset the encoder, as previously mentioned, thereby restoring the report encoder and control to its initial condition for awaiting further report messages.

*Report decoder—FIG. 34*

The report decoder receives from the report demodulator data, start, and timing signals. These signals are utilized to produce an indication of the status of reception on each transmission line for data from the transmitter station to the receiving station. In addition, the report decoder produces a single-pulse enabling signal to the report recorder of the store having a data block which is the subject of the report being received.

A parity check is also performed in the report decoder; and, in addition, the report decoder decides whether or not a correct report has been received. This decision is made by voting on each bit of the basic report word. If the report bit in each bit position of the basic word is repeated at least five out of the seven times that it is received, it is then assumed that the word represented by the repeated bits is the correct word and may be utilized as the true report.

Decoder operation is initiated by a complementary start signal applied to the set and reset gates of a flip-flop circuit 936. That flip-flop is set and then reset in that order by the next two clock pulses DAs 750. When flip-flop 936 sets, its ground ZERO output enables AND gate 937 to pass DAs 750 clock pulses to a blocking oscillator 938. A single output pulse from oscillator 938 is utilized as the reset signal for the report decoder and is employed as such on all leads directly connected to this oscillator output and on other leads which have the designation "reset." The resetting of flip-flop 936 at the end of the report demodulator start pulse produces a ground ONE output that enables AND gate 939 to couple clock pulses to another blocking oscillator 940 which supplies timing signals to other parts of the decoder.

Report data is applied on the ONE and ZERO input leads of a report parity checking circuit 941. Positive signals on one of these leads enable one of the gates 942 or 943 in the parity checking circuit. These gates are further enabled by the positive ZERO output of flip-flop 936 and by a positive voltage from a counter 958 prior to which a pulse appears at the end of each report message. Thus gates 942 and 943 are respectively enabled by positive ONE and ZERO signals on their respective input leads. When enabled, each gate further enables one of the AND gates 944 or 946 for coupling DAs 750 clock pulses to the complementary input connections of single stage binary counting flip-flop circuits 947 and 948. The flip-flops operate as odd-even counters for ONEs and ZEROs, respectively, because the report word does not include a parity checking bit. The ZERO output of each flip-flop is applied to enable the reset gate of one of the two memory flip-flop circuits 949 or 950, respectively.

Flip-flops 949 and 950 are initially placed in their set condition by a ground ZERO output from flip-flop 936 at the outset of the report word. Each of the reset gates of flip-flops 949 and 950 is enabled at the ONE count output of a five-stage ring counter 951 which acts as a programmer for the report decoder. Counter 951 is driven by DAs 750 clock pulses supplied by the output of blocking oscillator 940. Accordingly, each time counter 951 operates through a complete cycle of operation and returns to its initial count, flip-flops 949 and 950 have their reset gates enabled to examine the ZERO output conditions of flip-flops 947 and 948.

If during a first five-bit portion of the report message, it appears that the message should be characterized by odd-ONE parity, flip-flop 947 is set at the end of the five bits. Flip-flop 948 remains reset. Thus, at count ONE of programmer counter 951 flip-flop 949 is reset by the ground ZERO output of flip-flop 947. If all subsequent repetitions of the report basic word are the same and their parity condition does not change, flip-flops 949 and 950 should not change their conditions. At the end of the message an output transistor-diode gate 952 which receives the ZERO outputs of flip-flops 949 and 950 would be inhibited by the output of one of these flip-flops.

However, if the parity condition of one of the later repetitions of the report word changes from odd-ONE to odd-ZERO, flip-flop 948 is set by that particular repetition of the report word. Its ground ZERO output resets flip-flop 950. In this case when gate 952 is enabled at count 40 at the end of the report message it finds both of the flip-flops 949 and 950 in their reset conditions, and gate 952 is fully enabled. The ground output from gate 952 then actuates a report parity alarm 945. Positive output signals from gate 952, when parity is correct, are applied to the message rate indicator illustrated in FIG. 1.

The remaining circuits shown in FIG. 34 are devoted to the task of counting the number of ZEROs which appear in each bit position of the basic report word during the seven repetitions of the word in the report message. The counting is carried out by five three-stage binary counters 953–957. An additional three-stage binary counter 958 is provided to measure the length of the report message and sample the outputs of the other five three-stage counters at the end of the message.

Ground ZERO output signals from the output of gate 943 in parity checking circuit 941 are applied to enable AND gate 959 for coupling DAs 750 clock pulses to drive a blocking oscillator 960. Each time a ZERO occurs in the report message, blocking oscillator 960 applies a ground pulse to the opening input of all five of the AND gates 961. The latter gates are enabled in sequence by the outputs of programmer ring counter 951 so that during each of the five successive bit intervals in the basic report word the output of blocking oscillator 960 will be successively coupled to counters 953 through 957 in that order. This action is carried on repeatedly, and each time the count five output of counter 951 goes to ground it enables AND gate 962 for coupling DAs 750 clock pulses to advance counter 958. When counter 958 has measured off eight five-bit intervals, this counter then applies a positive enabling output signal to each of the five report decoding gates 963 and to the two status gates 964 and 966. The count 40 (ground ZERO) output from counter 958 is also applied to disable gates 942, 943, and 952 in the parity checking circuit 941 thereby preventing any possible parity alarm for the five bit time slots following the regular seven repetitions of the report word.

Counters 953–955 count ZEROs in each of the address bit positions in the report message. Each of these address counters also includes logic for deriving a positive output signal if the counter is in the count three or count four condition. These counter output signals are applied as enabling inputs to a transistor-diode gate 967. Gate 967 is fully enabled whenever there are no address bit counters in the count three or count four condition. However, if any one of the address bit counters 953–955 resides in either the count three or the count four condition, gate 967 is disabled; and its in-phase output which is then at ground is applied to disable all of the address decoding gates 963 as well as the status gates 964 and 966. If at the time of the count 40 from counter 958 the transistor-diode gate 967 is fully enabled its positive in-phase, output signal also enables the gates 963, 964, and 966; and each of those gates may then produce an output signal which is a function of its other input connections.

These other input connections for gates 963 comprise connections to the various ONE and ZERO outputs of the last stages of the address bit counters 953–955. Accordingly, for correct counts of the address bits one of the gates 963 is fully enabled by the binary coded combination of output signals which its input leads derive from counters 953–955. Each gate has its output coupled to one of the SEC cabinet stores as indicated by the legends adjacent those leads.

Similarly, the outputs of status gates 956 and 957 are applied through gates 964 and 966 to status indicators 968. The coupling is here much simpler because status gates 966 and 968 are not activated unless a four count or more is indicated by their respective counters.

*Report decoder group transfer—FIG. 35*

The report decoder group transfer switches spare receiving station equipment back and forth between working receiving station equipment and performs various signal checks to detect equipment malfunctions. A switch from one set of working equipment to the other is accomplished after every eight data messages and a message counter is provided to measure that interval. The counter output is also employed to control the selection of clock timing signals for use in the decoder group transfer. Circuits are provided for comparing the outputs from the spare and working demodulators and for comparing the spare and working report decoder outputs. In addition, ground and open circuit detecting arrangements are included for continuously monitoring each output from the spare and working decoders.

A start pulse from the ground ZERO output of spare decoder flip-flop 936 enables the set input of a flip-flop circuit 969 for coupling DBs 750 clock pulses to set the flip-flop. At the end of a data message count 40, a ground output from the spare decoder counter 958 opens the reset gate of flip-flop 969 to couple another clock pulse GD for resetting the flip-flop. In a similar manner the ZERO and ONE outputs of flip-flop 969 set and reset a flip-flop 970. The ground ONE output of flip-flop 970 in its reset condition drives a three stage binary counter 971 for couning off the eight message interval.

A flip-flop circuit 972 is driven by the output of counter 971 for actuating a transmission gate 973 which performs the actual switching of the spare demodulator input back and forth between report lines A and B. Gate 973 is of the same type employed in receiver line switching circuit 501.

Ground ONE and ZERO outputs from flip-flop 972 also enable input gates for two blocking oscillators 974 and 975. These oscillator input gates are opened by ground signals from a pair of AND gates 976 which apply DBs 750 clock pulses to the blocking oscillator input which is enabled by flip-flop 972 during each time interval that flip-flop 969 is set. In other words, gates 976 are enabled for the transmission of clock pulses during each report message and apply these clock pulses to drive the one of the blocking oscillators 974 and 975 which is selected by flip-flop 972. The output of oscillator 975 represents the GA clock timing utilized in the report decoder and the output of oscillator 974 represents the GB timing.

Pulses in the output of each of the oscillators 974 and 975 also open permanently enabled AND gates in the reset input of a monostable flip-flop circuit 976 which is thereby transferred to its unstable state for a time interval such as 100 microseconds. The ground ZERO output of monostable 976, while returning to its stable set condition, momentarily opens another permanently enabled gate in the input of an additional blocking oscillator 977 which provides GD clock timing pulses. The latter timing pulses are similar to the GA and GB clock timing pulses, but are delayed by 100 microseconds with respect to the one of the GA or GB timing pulses which are driving monostable circuit 976.

Considering now the circuits for comparing report decoder output signals, the report decoder group transfer of FIG. 35 receives a lead from the output of each of the five decoder gates 963 in the spare decoder and in each of the working decoders. Each of these leads from a working decoder is coupled to the report recorders in the transmitting SEC cabinets through an OR circuit. In order to simplify the drawings, circuit connections for a single one of the five output leads from each of the working and spare decoders are shown since each of the other four leads from each decoder is treated in an identical manner. Leads 978 and 979 represent such outputs from the decoders for lines A and B, respectively, and are coupled through OR gate diodes 980 and 981, respectively, to an output lead 982 which goes to one transmitter store corresponding to the one decoder output lead. In addition, each of the leads 978 and 979 enables one of the AND gates 983 and 984 for coupling GA and GB clock timing pulses, respectively, to a complementing input connection for a flip-flop circuit 985. In a similar manner one lead 986 from a spare decoder gate 963 enables AND gate 987 for coupling GD clock timing pulses to the same complementing input connection.

Flip-flop circuit 985 is normally placed in its reset condition by a DBs 750 clock pulse applied through AND gate 988 when that gate is enabled by the ground ONE output of flip-flop 969 at the beginning of each report message. Now, if flip-flop 972 is in its reset condition the decoder for line A is being compared with the spare decoder and an acknowledge signal from the line A decoder enables gate 983 to pass a GA timing pulse for setting flip-flop 985. If it is assumed that a similar signal appears in the corresponding spare decoder gate 963, gate 987 is also enabled and passes a GD clock pulse 100 microseconds after the GA clock pulse thereby resetting flip-flop 985. The ground ZERO output of flip-flop 985 in its set condition enables AND gate 989 in the input of a report comparison alarm 990. However, that gate can be opened only by the DBs 750 clock pulse which follows the GA clock pulse that originally set flip-flop 985. Accordingly, if the spare and working decoder circuits are in step and include corresponding report signals, the GD clock pulse resets flip-flop 985 before the DBs 750 clock pulse can be passed through gate 989 to actuate alarm 990. Of course, if the signals on leads 978 and 986 do not agree, one of them will cause flip-flop 985 to be set and it will not thereafter be reset in time to prevent the actuation of alarm 990. The report comparison circuit 965, which was just described, operates in a similar manner with respect to a comparison of the line B decoder with the spare decoder when flip-flop 972 is in its set condition.

Report data output signals from the working and spare demodulator outputs are compared in a comparator 965' which is essentially the same as comparator 965 for producing an alarm if a disagreement is detected between the output of the spare demodulator and the output of the working demodulator with which the spare is operating.

It is also at times advantageous to have an alarm in the event that a permanent ground signal should be present on lead 982 which couples the OR circuit output to a report recorder in the SEC cabinet. For this purpose, a persisting-ground detecting arrangement 991 is provided and observes signals on lead 982 for a time interval of two bits immediately following each report message. If at the end of a report message a ground is present on lead 982, a gate 992 is enabled and couples a DBs 750 clock pulse to the complementing input of a flip-flop circuit 993, which is thereby placed in its set condition. The positive ONE output of this flip-flop then inhibits the operation of a permanent ground alarm 994. Following the end of the message a start pulse for the new report message sets flip-flop 969, as previously described, and also enables a set gate of flip-flop 995 in the ground detecting circuit 991. The latter flip-flop is then set by the next DBs 750 clock pulse, and the ground ZERO output of the flip-flop enables AND gate 996 in the input of alarm circuit 994.

The second DBs 750 clock pulse following the start pulse sets flip-flop 970, as previously described, and the ground ZERO output of flip-flop 970 enables the reset gates of flip-flops 993 and 995. A third DBs 750 clock pulse resets flip-flop 995 and also resets flip-flop 993 if the ground is still present on lead 982. This action opens gate 996 for actuating alarm 994, since the initial transition of flip-flop 993 to its reset condition occurs rapidly enough to open gate 996 while a positive enabling potential is still present at the ZERO output of flip-flop 995 which is in the process of changing to its reset condition.

Another circuit is provided for detecting a permanent open circuit condition which would be evidenced by the potential on lead 982. This circuit is designated 997 and includes a flip-flop circuit 998 which is normally reset by the first DBs 750 clock pulse following the appearance of a ground at the ONE output of flip-flop 969 at the end of a report message. A ground appearing at the output of a decoder gate 963 causes flip-flop 985 to be set, as previously described in connection with comparator circuit 965. At that time, the ground ZERO output of the flip-flop is applied to input connections of AND gates 9901 and 9902. This ground appears long enough to enable AND gate 9902 to check for a corresponding ground on lead 982. If the corresponding ground is present, gate 9902 is opened and its output is applied in multiple with the output of gate 9901 to the complementing input of flip-flop 998 to set that flip-flop. One hundred microseconds later clock pulse GD opens gate 9901 if the ground ZERO output is still present at flip-flop 985 and causes flip-flop 998 to be immediately reset. This action inhibits AND gate 9903 in the ZERO output of flip-flop 998 and prevents the operation of an alarm 9904.

If gate 9902 does not find on lead 982 a ground which corresponds to the ground ZERO output of flip-flop 985, this gate remains closed and the GD clock pulse occurring 100 microseconds later sets flip-flop 998 for applying the next DBs 750 clock pulse to actuate alarm 9904.

*Idle-busy unit—FIG. 36*

The purpose of this unit, which is the idle-busy unit 906 shown in FIG. 1, is to provide a 1500-cycle message-request tone to the sending data processing terminal 100 whenever it is determined that two of the transmitter SEC cabinets have received acknowledge signals and are prepared for new data. This message-request tone is called the idle-busy signal because its presence indicates an idle condition for a transmitter store, and its absence indicates that all stores are busy with previously accepted messages. The circuit also includes a monitoring unit 907 which is arranged to observe the output of the idle-busy unit and provide an alarm if the tone does not attain a sufficient level in a predetermined time interval after a tone request signal is received or to give an alarm if the tone persists at an excessively high level after the tone request signal has ended.

Complementary idle-busy request signals are received from the three transmitter SEC cabinets on the input lead pairs bearing the transmitter SEC reference characters. From each SEC one output lead, which would be at ground when an idle-busy tone is requested, is connected to one of the inputs of a first voter 908 on the set side of a flip-flop circuit 909. Leads from the SECs in each pair, which would be at ground when no idle-busy tone is requested, are applied to the three inputs of a second voter 910. Each of the voters 908 and 910 is a two-out-of-three voter of the type disclosed in FIG. 11B and designated "voter 204." Consequently, they will not be described in detail. It will be enough at this point to indicate that if two out of three of the SEC cabinets indicate that a message-request signal is to be sent out, voter 908 causes flip-flop circuit 909 to be set. Likewise, if two out of three of the cabinets indicate that no idle-busy tone should be transmitted, voter 910 resets flip-flop 909.

Taking first the case in which flip-flop 909 is set to request an idle-busy tone, the ground ZERO output from the flip-flop is applied to the enabling inputs of both the set and the reset gates of a flip-flop circuit 911 in signal unit 905. The set gate is opened by clock pulses LA 1500 while the reset gate is opened by clock pulses LB 1500. Thus, flip-flop 911 is continuously operated back and forth between its two conducting conditions to drive a push-pull transistor amplifier 912. The outputs from the collector electrodes of the two transistors in this amplifier are transformer coupled in the usual push-pull manner to a bandpass filter 913 which extracts a sinusoidal 1500-cycle per second output wave from the 1500-cycle per second square wave produced by the amplifier. The sinusoidal wave is applied through a pad 914 to loop transfer 101 and a transmission line to the sending data processor 100. The output of filter 913 is also applied to an input of monitoring unit 907. In unit 907 positive-going 1500-cycle oscillation portions are rectified and passed through a low-pass smoothing filter 916 and applied to an amplitude-selecting circuit 917.

A first NPN transistor 918 in the selecting circuit 917 has its collector-emitter circuit connected between a source 919 of positive potential and a grounded terminal of that source. The base-emitter circuit of transistor 918 is connected between a source 915 of negative potential and a grounded terminal of that source. Transistor 918 is in the grounded emitter configuration. Consequently, when voltages from low-pass filter 916 are applied to the base electrode of transistor 918, and they exceed a predetermined amplitude level fixed by the source 915 of negative potential, transistor 918 is biased into conduction; and its collector electrode is thereby clamped at essentially ground potential.

Another NPN transistor 920, in the selector circuit 917, is also arranged in the common emitter configuration with its collector and emitter electrodes connected between the terminals of the positive source 919 and ground and with its collector-base circuit connected across a resistor 921 which is in series in the collector circuit of transistor 918. The base electrode of transistor 920 is also connected through a resistor 925 to negative source terminal 915. Thus, if transistor 918 is conducting, transistor 920 is biased to a nonconducting condition. However, if transistor 918 is OFF, transistor 920 is then biased into conduction and pulls its collector electrode to ground potential.

If the tone at the output of pad 914 has an average magnitude exceeding the aforementioned predetermined level, transistor 918 conducts and a ground signal from its collector electrode enables AND gate 922 while transistor 920 is biased OFF. The positive potential at the collector of transistor 920 blocks another AND gate 923. If the conducting conditions of transistors 918 and 920 are reversed gate 922 is blocked and gate 923 is enabled.

At the time that flip-flop 909 requested idle-busy tone its ground ZERO output was also employed to open a permanently enabled gate 924 for triggering a monostable circuit 926 to its set condition for measuring the predetermined time interval by which idle-busy tone must be brought within prescribed amplitude limits. When monostable 926 resets, its ground ONE output attempts to open gates 922 and 923. As previously indicated, gate 922 was enabled by the output of transistor 918 so it is now opened to indicate that the tone from pad 914 had a magnitude in excess of the predetermined level. Accordingly, the ground output of gate 922 is applied to open a set gate 931 for a flip-flop circuit 927. However, the positive ONE output of flip-flop 909 blocks the gate 931 and thereby prevents the output of gate 922 from setting flip-flop 927.

If the tone had not exceeded the predetermined magnitude, transistor 920 would be conducting, as previously described; and gate 923 would be opened to enable another set gate 932 for flip-flop 927. Gate 932 had been enabled by the ground ZERO output of flip-flop 909 so flip-flop 927 is operated to its set condition, and an alarm and control circuit 928 is actuated. In order to retime alarm circuit 928 it is now necessary for an attendant to operate a switch 929 for enabling the reset gate of flip-flop gate 927 to couple a clock pulse LA 1500 to the reset input of the flip-flop.

When the idle-busy request signal from the SEC cabinets is terminated, flip-flop 909 is reset; and its ground ONE output now opens a permanently enabled diode gate 930 for actuating monostable 926 once more. In addition, the positive ZERO output of flip-flop 909 blocks the set and reset gates of flip-flop 911 to terminate the application of clock pulses to that flip-flop and thus stop the production of the idle-busy tone. The ground ONE of flip-flop 909 also enables set gate 931 of flip-flop 927. Now monitoring unit 907 provides a signal which indicates whether or not the idle-busy tone diminishes to a level below the predetermined level within the time interval set by monostable 926. When the monostable 926 resets, gates 922 and 923 are permitted to open. This time, if the tone exceeds the predetermined magnitude, gate 922 is enabled and opens the previously enabled set gate of flip-flop 927 for sounding an alarm because tone is present when it is not wanted. However, if the tone did not exceed the fixed magnitude, gate 923 is enabled; and its ground signal is applied to set gate 932 of flip-flop 927. This gate is blocked by the positive ZERO output of flip-flop 909 and no alarm is sounded.

What is claimed is:

1. A digital data transmission system for communicating between a transmitting station and a receiving station, said system comprising a source of data arranged in blocks to be transmitted, a plurality of data block stores in said transmitting station, commutator means coupling successive blocks of data from said source to said stores in a predetermined sequence, means transmitting data signals to said receiving station, said commutator means also coupling blocks of data from said stores to said transmitting means in a second predetermined sequence having the same sequential order as said first sequence but having a noncoincident phase relationship therewith, means associated with each of said stores and operative while data is being coupled out of such store simultaneously re-entering the same data in the same store in its original order, error checking means in said receiving station examining each block of data received from said transmitting means, means returning a report signal to said transmitting station in response to the output of said error checking means, and said commutating means including means responsive to said report signal enabling a corresponding one of said data stores to receive a new data block.

2. A data transmission system comprising a transmitter, a reciver, plural data stores in said transmitter, each of said stores having a different address designation, means reading blocks of data into said stores, the last-mentioned means including means inserting in each store with data stored therein the data representation of the store address, means reading blocks of data out of said stores for transmission with their respective transmitter store address representations, plural stores in said receiver, means coupling data blocks and addresses read out of said transmitter stores to individual ones of said receiver stores, means checking the accuracy of said data blocks and providing signals indicating satisfactory or unsatisfactory reception, a shift register, logic circuits responsive to said satisfactory reception signals and the transmitter store address of a received data block for shifting the address associated with such data block into said register, and means transmitting a report message including said address from said register to the originating transmitter store as a report of satisfactory reception.

3. A data transmission system in accordance with claim 2 in which said means coupling data from said transmitter stores to said receiver stores comprises at least two separate transmission circuits connected therebetween, said receiver including separate sets of said plural stores and of said accuracy checking means receiving the output of each of said transmission circuits, means in said receiver responsive to the outputs of said checking means in each of said sets and producing separate status signals therefor to indicate whether or not reception was satisfactory on each of said transmission circuits, and said logic means including means shifting the address from one receiver store into said register, and means shifting all of said status signals into said register.

4. A data transmission system in accordance with claim 2 in which said means reading data out of said transmitter stores comprises in addition means re-entering such data in the same store at the same time that it is being read out thereof, and said means reading data into said stores includes logical selecting means associated with each store and responsive to said report for such store for enabling or inhibiting the readin of data thereto in response to good or bad reception reports, respectively.

5. A data transmission system in accordance with claim 2 in which each of said data blocks is longer than the report message stored in said register by at least a factor of $n$, said receiver includes program counting means controlling said register for repeatedly transmitting said report message up to $n$ times, and said transmitter includes means checking the accuracy of received report messages by observing whether or not a predetermined portion of the $n$ repetitions of each part of said message are in agreement with one another.

6. A data transmission system comprising means transmitting data signals in groups of a predetermined length, means at a remote location receiving said data signals, said receiving means including means examining each of said groups for errors, a report encoder responsive to the output of said examining means and producing a report data word for each of said data signal groups, each of said groups being longer than said word by a factor of at least $n$, means transmitting said word back to said data signal transmitting means in a report message comprising $n$ repetitions of said word, and a report voter in said data signal transmitting means separately examining the $n$ repetitions of each bit of said word, said voting means being adapted to produce a predetermined signal response if at least $m$ of said $n$ repetitions are in agreement.

7. The data transmission system in accordance with claim 6, in which said report voter comprises plural voting means equal in number to the bits in said report word, means directing data in each bit position of said word to a different one of said voting means, and each of said voting means being adapted to produce a predetermined signal response if at least $m$ of said $n$ bit repetitions are in agreement.

8. The data transmitting system in accordance with claim 6, in which said data signal transmitting means comprises means receiving said data groups from a data procesisng terminal, plural data stores identified by individual addresses, commutating means steering said groups to respective stores in a cyclic succession, an input gate for each of said stores responsive to said commutating means and to said report voter signal for coupling a data group into such store, means responsive to said commutating means and to the entry of a data group into one of said stores for also entering with such group a coded representation of the address of said one store, readout means responsive to said commutating means coupling said group and its associated address to said receiving means, said report encoder including means incorporating said address in said report, and said report voter including means responsive to said address enabling the input gate of said one store.

9. In a data transmission system, a transmitting station, a plurality of data block stores each having an individual address, means supplying blocks of data for readin to said stores, logic circuits inserting in each store ahead of each data block a representation of the address of said store, a receiving station, a plurality of receiver stores in said receiving station, means coupling said data blocks and their respective transmitter store address representations to said receiving station, means in said receiving station coupling said data blocks and addresses to any one of said receiver stores, and means at each receiver store checking the storing accuracy of the transmitter store address, said checking means including an auxiliary store, first means sampling said address representation at the input to said receiver store and entering resulting samples in said auxiliary store, second means for sampling said address representations after placement in said receiver store, and means comparing samples obtained by said second sampling means with samples in said auxiliary store.

10. In a data transmission system, transmitting means, plural transmission circuits having different total route delays for data messages, plural receiving equipments each receiving data from said transmitting means by means of a different one of said circuits, each of said receiving equipments including buffer storage equalizing for differential route delays, a set of spare receiving equipment which is essentially the same as each of said plural receiving equipments, switching means for connecting the input of said spare equipment in multiple with the input of different ones of said plural receiving equipments for predetermined data message intervals, means counting the number of data messages received by said spare equipment through said switching means, means actuating said switching means in response to a predetermined count of said counting means, and means comparing characteristic signals of said spare and the one of said plural receiving equipments with which it is connected.

11. The data transmission system in accordance with claim 10 in which said transmitting means includes plural sets of transmitting equipment equal in number to said transmission circuits plus at least one, plural majority voters equal in number to said transmission circuits and each having its output connected to a different one of such circuits, and means applying the outputs of all of said sets of transmitting equipment to each of said voters.

12. The data transmission system in accordance with claim 10 in which said counting means includes an auxiliary message counter responsive to an output of said counting means for counting messages immediately upon the attainment of said predetermined count, and means responsive to an output of said auxiliary counter delaying the further operation of said counting means.

13. The data transmission system in accordance with claim 10 in which said comparing means comprises means comparing corresponding bits of data in said spare equipment and in the receiving equipment to which it is connected.

14. A data transmission system for communicating between two data processing terminals and comprising a transmitting station receiving data and timing signals from a first one of said processing terminals at a first bit rate; said transmitting station comprising means generating a first clock signal at said first rate in response to said timing signals, data store means, first transmitter programming means responsive to said first clock signals for entering data in said store means, a transmitter clock signal generator producing second clock signals at a rate which is different from said first rate, second transmitter programming means responsive to said second clock signals for removing data from said store means, means successively enabling the operations of said first and second programming means with respect to said store means, and means responsive to said second clock signals for frequency-shift modulating data removed from said store by said second programming means; a receiving station; means coupling only said frequency-shift data to said receiving station; and said receiving station comprising a frequency-shift demodulator, a free-running oscillatory circuit producing oscillations at approximately the frequency of said second clock signals, means synchronizing the output of said receiving station oscillatory circuit with the zero voltage axis crossings of said frequency-shift wave, receiver data store means, first receiver programming means responsive to the synchronized output of said oscillatory circuit for entering data in said receiver store means, a receiver clock source generating third clock signals at a frequency which is diffeernt from the frequency of the synchronized output from said oscillatory circuit, second receiver programming means responsive to said third clock signals for coupling data from said receiver store means to a second one of said data processing terminals, and means successively enabling the operations of said first and second receiver programming means with respect to said receiver store means.

15. A data transmission system comprising transmitting means receiving for transmission blocks of data made up of ONE and ZERO data bits, a receiving station, at least two sets of receiving equipment at said station, at least two diverse transmission routes coupling the output of said transmitting means to said sets of receiving equipment respectively, each of said sets of receiving equipment including plural data block stores and a commutator steering successive blocks of data into different ones of said stores in a cyclic succession, means generating a store-ready signal in response to the storing of a block of data in each of said stores, a coincidence circuit detecting store-ready signals from corresponding stores in said sets of receiving equipment, a circuit applying a readout selection signal to said corresponding stores, means comparing data bits of the data block readout of said corresponding stores, and means responsive to the output of said comparing means upon detecting a bit mismatch for inhibiting the operation of one of said commutators.

16. A data transmission system for communicating between plural data processing terminals and comprising a data transmitter receiving from a first one of said terminals data signals and timing signals, said data signals including data bits of at least two different types, said bits occurring at the same rate as said timing signals, means in said transmitter frequency modulating said data signals so that each different bit type is represented by a burst of oscillations of a different frequency, all of said oscillations being asynchronous with respect to said timing signals and non-harmonically related thereto, a data receiver, means conveying from said transmitter to said receiver only said frequency modulated data signals, digital means responsive to changes in period lengths of said oscillations demodulating said frequency modulated data signals, an oscillator at said receiver and producing clock oscillations at approximately the frequency of said timing signals, a synchronizing circuit adjusting the phase of said clock oscillations in response to a predetermined characteristic of demodulated signals from said digital means, and means coupling said demodulated signals and the phase-adjusted output of said oscillator to a second one of said processing terminals.

17. A digital data transmission system for communicating between a transmitting station and a receiving station, said system comprising a source of data signals to be transmitted, said signals comprising groups of electric pulses arranged in a predetermined code according to certain pulse train characteristics, means translating said pulse train characteristics into a frequency modulated signal wave, means transmitting said frequency modulated wave to said receiving station, and a digital demodulator in said receiving station reconstructing said groups of electric pulses in response to said frequency modulated wave.

18. The digital data transmission system in accordance with claim 17, in which said digital demodulator comprises a frequency counter generating count signals having a magnitude corresponding to the lengths of time intervals between zero voltage axis crossings of said frequency modulated wave, and means responsive to said count signals generating a pulse train with the same characteristics as the first-mentioned pulse train.

19. The data transmission system in accordance with claim 17, in which said means transmitting data to said receiving station comprises a transmission path subject to a signal-interfering noise level in excess of the level permissible for intelligible voice communication.

20. In a data transmission system, means supplying data at a first bit rate, means generating first clock timing signals at said first rate the magnitude of said first rate being under the control of said supplying means, data store means, a local clock signal source generating second clock signals at a rate which is different from said first rate, and logical programming means adapted for entering data in said store means in a predetermined bit sequence under control of said first timing signals and subsequently removing data from said store means in the same bit sequence under control of said second clock signals.

21. The data transmission system in accordance with claim 20, in which said means supplying data comprises a data processing terminal supplying separately data signals and timing signals, and said means generating said first clock signals is responsive to said timing signals.

22. The data transmission system in accordance with claim 20, in which said data comprises a frequency-shift data signal wave, and said means generating said first clock signals comprises a free-running oscillatory circuit producing oscillations at approximately said first rate, and means synchronizing the output of said oscillatory circuit with zero voltage axis crossings of said frequency shift wave.

23. A data transmission system comprising a transmitting station with at least two sets of transmission equipment working in parallel, a set of spare transmission equipment which is essentially the same as said working sets and which works continuously in parallel therewith, a receiving station comprising at least two sets of working receiving equipment, a plurality of transmission circuits each connecting the output of at least one of said sets of working transmitter equipment to a different one of said sets of receiving equipment, a set of spare receiving equipment which is essentially the same as said sets of working receiving equipment, and means switching said spare receiving equipment at predetermined intervals to operate in parallel with different ones of said sets of working receiving equipment in accordance with a predetermined sequence.

24. The data transmission system in accordance with claim 23, in which each of said working and spare sets of receiving equipment includes a demodulator and error checking means, and said receiving station also comprises means comparing demodulated data and the output of said checking means in one of said plural receiving equipments with corresponding demodulated data and error checking means outputs in another one of said plural receiving equipments, and logic circuits selecting the better data for utilization.

25. The data transmission system in accordance with claim 23, in which each of said sets of transmitter equipment includes plural data stores and commutating means enabling said stores in sequence to read in and to read out, and said transmitting station comprises in addition a voter having input circuits connected to be activated upon the completion of a cycle of operation of each of said commutating means, and means responsive to the output of said voter upon agreement of a predetermined proportion of said commutating means resetting all of said commutating means to corresponding points in their operating cycles.

26. The data transmission system in accordance with claim 23, which comprises in addition at least two voters, means applying the outputs of all of said working and spare sets of transmission equipment to input circuits of all of said voters, and means coupling the output of each of said voters to a different one of said transmission circuits.

27. In a data transmitting system, a data processing station comprising plural data processing equipments each including plural data stores and commutating means operating each of said stores in a predetermined sequence for processing data, each of said commutating means operating in a cyclic fashion, a voting circuit having plural input connections and a single output connection, means responsive to the completion of the cycle of each of said commutating means activating a different input of said voter, said voter generating a reset signal in its output circuit in response to the activation of its input connections by a majority of said commutating means, and means applying said reset signal to synchronize said commutating means with one another.

28. In a data transmission system, a transmitting station comprising means examining a group of data signals and producing a first error detecting code word in accordance with the data structure of said group, a receiving station, means transmitting to said receiving station said group followed by said code word, means in said receiving station examining said group and producing a second error detecting code word, means comparing said first and second code words on a bit-by-bit basis to produce a signal indicative of group reception accuracy, and means responsive to said signal returning a report to said transmitting station.

29. The data transmission system in accordance with claim 28, in which each of said data examining means comprises plural ring counters having different numbers of stages, means separately driving said counters at the bit rate of said data group, plural coincidence gates equal in number to the total number of said stages, each of said gates having an input connection from the output of a different one of said stages, means coupling the bits of said data group to the inputs of all of said coincidence gates in multiple, plural bistable circuits, each of said bistable circuits having a complementing input connection coupled to the output of a different one of said coincidence gates, and means deriving said code word from the outputs of said bistable circuits.

30. A data transmission system comprising a transmitting station preparing data for transmission, a receiving station deriving data signals from received signals, a transmission circuit interconnecting said two stations for the passage of data-containing signals therebetween, said transmitting station comprising *n* data block stores, each of said stores having an input circuit and an output circuit, commutating means sequentially connecting different ones of said store input and output circuits to receive data and to read out data for transmission, respectively, means coupling each of said store output circuits to said transmission circuit and means visually monitoring the operation of said system from a single observation point, the last-mentioned means comprising means displaying traces of electric signal variations and having first and second trace deflection input circuits, separate circuit connections from said commutating means to each of said deflection input connections for producing separate stair-step traces as a result of the separate connections to each of said trace deflection input circuits, means further connecting each store input circuit to said first trace deflection input circuit for superimposing store input potential variations on the respective steps of one of said traces, and means connecting each store output connection to said second deflection input circuit for superimposing store output voltage variations on the respective steps of the other trace.

31. A data transmission system in accordance with claim 30, in which said receiving station includes means performing a data accuracy check on data blocks received from each of said stores, and means returning to said transmitting station a report of said data check, and said transmitting station comprises means enabling or disabling the input of a store in response to the nature of said report for such store.

32. A data transmission system for communicating between sending and receiving data processing terminals, said system comprising a transmitting station including means receiving blocks of data from said sending terminal, plural data block stores, a commutator partially enabling the inputs of said stores in sequence to permit readin thereto when completely enabled, and said commutator also enabling readout from said stores in sequence for transmission; a receiving station; means coupling data from said stores in said transmitting station to said receiving station; said receiving station comprising means coupled to said data coupling means and performing an accuracy check on said data for each store, means further transmitting checked data to said receiving processing terminal and means returning a report to said transmitting station of the nature of said accuracy check; and said transmitting station further comprising means responsive to said report completely enabling readin to a store for which a report of satisfactory reception has been received, and means responsive to such a satisfactory report sending a message request signal to said sending processing terminal.

33. A data transmission system comprising data transmitting means, plural data receiving means each including plural data stores, plural transmission circuits each coupling data from said transmitting means to the data stores in different ones of said receiving means, data checking means in each of said receiving means performing a plurality of tests on data received in said stores, said checking means producing a separate output signal for each test to indicate the outcome of the test, encoding means responsive to said output signals for producing different signal codes indicative of the net quality of data in each of said stores, data utilization means, separate code evaluating logic means for each of said receiving means developing a signal indicating whether or not the corresponding receiving means signal is satisfactory for transmission, means cross-coupling logic means of one of said data receiving means with logic means of at least another one of said receiving means to suppress the least satisfactory logic means output signal, means responsive to outputs of both of said logic means applying a readout-selecting signal to the one of said receiving means having in its store the data of highest quality, and means responsive to said selecting signal coupling data in the last-mentioned store to said utilization means.

34. In a data transmission system programming means, means receiving a digital data message, a plurality of data storage registers, a different store address register associated with each storage register, means shifting a data message from said receiving means into one of said storage registers through its associated address register under the control of said programming means, transmission preparing means, and means coupling said message and its associated address to said preparing means.

35. The data transmission system in accordance with claim 34 which includes means controlled by said programming means and recycling said message to the input of its associated address register simultaneously with the transfer of the same message to said transmission preparing means.

36. The data transmission system in accordance with claim 34 which includes means interrogating all of said storage registers to read out in repetitive sequence for maintaining a continuous flow of data.

37. The data transmission system in accordance with claim 34 in which each of said address registers comprise a plurality of shift register stages equal in number to the number of digits in the binary address of its associated store, first strapped logic means for each of said shift registers and responsive to said programming means for presetting in said shift register stages the address of the associated storage register means prior to the entry of a data message therein, second strapped logic means connected to the last stages of said storage register for reading out the binary complement of the store address, and alarm means actuatable in response to an output of said second strapped logic means.

38. A digital data transmission system for transmitting data signals received from a data processing terminal to a receiving station, said transmission system comprising programming means, means receiving data messages for transmission, plural data stores, means responsive to signals from said programming means for directing data messages from said receiving means to different ones of said stores, means responsive to an output from said programming means for interrogating said stores in repetitive sequence to read out a message for transmission to said receiving station, means obtaining from said receiving station a report message indicating either a good or a bad status of reception of the previous data message, and means responsive to a good status report for a transmitted message conditioning the store containing that message to receive a new data message on the next program cycle.

39. The digital data transmission system in accordance with claim 38 which also includes means responsive to a good status report for the transmission of a data message sending a message-request code to said data processing terminal.

40. The digital data transmission system in accordance with claim 39 in which said code is a tone of predetermined frequency, means to monitor said code sending means and said report obtaining means, and further means responsive to the output of said monitor means to produce an alarm condition when either said code or a good report signal is present without the other.

41. The digital data transmission system in accordance with claim 39 which further comprises means monitoring said code sending means and said data receiving means for producing a signal if said message-request code is not followed within a predetermined time by a message from said processing terminal, means responsive to said signal generating a dummy message, and means applying said dummy message to said receiving means.

42. In a transmission system for data signals comprising various combinations of mark and space data bits, means generating a data word of uncertain parity, means repeatedly transmitting said word, means receiving said data word repetitions, said receiving means including data parity checking means comprising two odd-even bit counters, means separately steering mark data bits to drive one of said counters and space data bits to drive the other of said counters whereby a data word of odd-mark parity produces an output signal from said one counter and a word of odd-space parity produces an output signal from said other counter, two memory devices, means sampling the outputs of said counters at the end of each data word and activating one of said memory devices according to the output of each of said counters, and means sampling the content of said memory devices at the end of a series of repetitions of said word to ascertain whether one or both of said memory devices have been activated by signals from said counters.

43. In a transmission system for data signals comprising mark and space data bits in groups of predetermined length, means generating an error checking code word and comprising a plurality of ring counters of different numbers of stages, means applying pulses at the bit rate of said data signals to drive said counters separately, a plurality of coincidence gates equal in number to the total number of stages of all of said ring counters, each gate having first and second input connections and an output connection, means connecting an output from each stage of said counters to said first input of a different one of said gates, means applying data marks in said signals to said second inputs of said gates in multiple, a plurality of single-stage odd-even counters equal in number to the total number of said gates, means connecting an output of each of said gates to an input of a different one of said counters, means connecting said counters together as a shift register, and means responsive to the end of one of said data signals groups applying said pulses to said shift register as advance pulses.

44. In a data transmission system, means receiving blocks of data made up of ONE and ZERO data bits, plural store means separately storing each block of data in at least two separate places, each of said store means including plural data block stores, each of said store means also having associated therewith a commutator routing successive blocks of said data to different ones of said stores in a cyclic succession, means generating a store-ready signal in response to the storage of a block of data in each of said stores, a coincidence gate receiving said store-ready signals and producing a store selection signal in response to the opening of said gate means, circuits applying said selection signal to initiate readout from corresponding stores in said store means, means comparing successive bits of each data block as it is read out of said corresponding stores, and inhibiting means responsive to the detection of a bit mismatch in said comparing means for preventing the operation of one of said commutators for a predetermined time interval.

45. In a data transmission system, means receiving successive blocks of data, means temporarily storing said blocks of data in individual stores, data checking means performing a plurality of tests to detect different possible characteristics of each data block, said checking means producing separate electric signals in response to the detection of each of said characteristics, means associated with each of said stores and responsive to said separate signals producing a weighted number code representation of the total importance of characteristics detected for a data block in the corresponding store, and means controlling utilization of said data blocks in accordance with said code representations.

46. In a data transmission system for sending data in blocks over different transmission routes to a remote location, duplicate receiving means each receiving each block of said data as transmitted over a different one of said routes, each of said receiving means including data checking circuits having their outputs coupled together to a coded electrical signal indicating the net quality of each of said data blocks as received therein, signal code comparing means coupled to receive the coded signal from each receiving means, data utilization means, and means responsive to the output of said comparing means enabling the readout of data to said utilization means from the one of said receiving means containing the higher quality version of said data block.

47. The data transmission system in accordance with claim 46 in which said readout enabling means comprises data bit comparing means, circuits applying to said comparing means both the version of the data which is being read out and the data version from the receiving means which is not selected for readout, and means generating an alarm in response to a data mismatch detected by said comparing means.

48. A data transmission system comprising a transmitting means including plural data stores for receiving and holding data messages, means reading data messages into said stores, data receiving means, transmitting circuits, non-destructive readout circuits coupling data from said stores to said receiving means via said transmitting circuits, means checking predetermined characteristics of data messages at said receiving means, a word generator responsive to the output of said checking means and producing a data report word of variable composition which is indicative of the accuracy of data transmission over said transmitting circuits, means sending said report word back to said transmitting means a predetermined number of times, two odd-even bit counters separately counting mark and space bits of said report word at said transmitting means whereby a report word of odd-mark parity causes one counter to produce an output signal and a word of odd-space parity causes the other counter to produce an output signal, and AND logic means sampling the counter outputs to detect output signals from more than one.

49. In a data transmission system including an *m*-stage shift register for storing blocks of data of up to *m* data bits, and program control means, means checking the accuracy of operation of said register comprising an *n*-stage shift register, where *n* is much smaller than *m*, means actuated by said program control means advancing one of said blocks of data through said *n*-stage register into said *m*-stage register, an *n*-bit data store, sampling means operative at a predetermined time in the operation of said advancing means sampling data bit indications in said *n*-stage register and storing the samples in said store, data bit comparing means having first input connections to said store, means applying to second input connection of said comparing means samples from said *m*-stage register of the same data bits sampled as they passed through said *n*-stage register, and means actuated by said program control means sampling the output of said comparator upon the completion of the advace of said one block into said *m*-stage register.

50. In a data transmission system programming means; means receiving a digital data message; a plurality of data transmission equipments each including a plurality of data storage registers, a different address register associated with each of said storage registers, and a commutating counter controlling said data and address registers in conjunction with said programming means; means shifting a data message from said receiving means into one of said storage registers in each of said equipments through the address register associated with such storage register under the control of said programming means; a single voting means receiving the full-count output from each of said counters; and connections applying the output of said voting means to reset all of said commutating counters.

51. A digital data transmission system for transmitting data signals received from a data processing terminal to a remote location, said transmission system comprising a programming means, a plurality of transmitter equipments, means receiving data messages from said terminal for transmission, plural data stores in each of said transmitter equipments, means responsive to signals from said programming means coupling each data message from said receiving means to one of the stores in each of said transmitter equipments, a receiving station at said location, means in each of said equipments responsive to an output from said programming means and connecting the stores in such equipment in repetitive sequence to read out a message for transmission to said receiving station, means obtaining from said receiving station a report message indicating whether there was a good or a bad reception of a previous data message means responsive to a good status report for a transmitted message conditioning the stores containing that message to receive a new data message on the next program cycle, majority voting means coupled to said report obtaining means of each of said plural equipments, and means responsive to the output of said voting means for a good reception report sending a message request tone to said data processing terminal.

References Cited by the Examiner

UNITED STATES PATENTS

| | | | |
|---|---|---|---|
| 2,229,089 | 1/1941 | Kinsburg | 340—147 |
| 2,628,346 | 2/1953 | Burkhart | 178—23.1 |
| 2,696,599 | 12/1954 | Holbrook | 178—23.1 |
| 2,706,215 | 4/1955 | Van Duuren | 178—23.1 |
| 2,803,703 | 8/1957 | Sherwin | 178—70 |
| 2,828,362 | 3/1958 | Darwin et al. | 178—23.1 |
| 2,892,888 | 6/1959 | James et al. | 178—23.1 |
| 2,903,514 | 9/1959 | Van Duuren | 178—23.1 |
| 2,977,047 | 3/1961 | Block | 235—153 |
| 2,988,596 | 6/1961 | Van Dalen | 178—23.1 |
| 3,001,018 | 9/1961 | Van Dalen | 178—23.1 |
| 3,034,102 | 5/1962 | Armstrong et al. | 340—146.2 |
| 3,037,191 | 5/1962 | Crosby | 340—172.5 |
| 3,038,145 | 6/1962 | Laurer et al. | 340—172.5 |
| 3,059,221 | 10/1962 | Page et al. | 340—172.5 |
| 3,069,657 | 12/1962 | Green et al. | 340—146.1 |
| 3,075,175 | 1/1963 | Lourie | 340—146.1 |
| 3,139,607 | 6/1964 | Grondin | 340—146.1 X |

ROBERT C. BAILEY, *Primary Examiner.*

MALCOLM A. MORRISON, *Examiner.*

M. P. ALLEN, M. POKOTILOW, *Assistant Examiners.*